United States Patent
Kawamura et al.

(10) Patent No.: US 7,461,196 B2
(45) Date of Patent: Dec. 2, 2008

(54) COMPUTER SYSTEM HAVING AN EXPANSION DEVICE FOR VIRTUALIZING A MIGRATION SOURCE LOGICAL UNIT

(75) Inventors: Shunji Kawamura, Yokohama (JP); Yasutomo Yamamoto, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 11/478,611

(22) Filed: Jul. 3, 2006

(65) Prior Publication Data

US 2007/0271434 A1  Nov. 22, 2007

(30) Foreign Application Priority Data

May 16, 2006  (JP)  ............................. 2006-136869

(51) Int. Cl.
*G06F 13/00* (2006.01)
(52) U.S. Cl. ................ 711/2; 711/6; 711/112; 711/162; 711/165
(58) Field of Classification Search ............... 711/112, 711/161, 162, 165, 2, 6, 203; 714/6
See application file for complete search history.

(56) References Cited

U.S. PATENT DOCUMENTS

| | | | |
|---|---|---|---|
| 7,054,893 B2 * | 5/2006 | Mogi et al. | 707/205 |
| 7,155,593 B2 * | 12/2006 | Kano | 711/165 |
| 2003/0229645 A1 * | 12/2003 | Mogi et al. | 707/102 |
| 2004/0054648 A1 * | 3/2004 | Mogi et al. | 707/1 |
| 2004/0257857 A1 | 12/2004 | Yamamoto et al. | |
| 2006/0143422 A1 * | 6/2006 | Mashima et al. | 711/170 |
| 2006/0277386 A1 * | 12/2006 | Eguchi | 711/170 |
| 2007/0055840 A1 | 3/2007 | Yamamoto et al. | |
| 2007/0067593 A1 | 3/2007 | Satoyama et al. | |
| 2007/0192561 A1 | 8/2007 | Satoyama et al. | |

FOREIGN PATENT DOCUMENTS

JP  2005-011277  1/2005

* cited by examiner

*Primary Examiner*—Hong Kim
(74) *Attorney, Agent, or Firm*—Mattingly, Stanger, Malur & Brundidge, PC

(57) ABSTRACT

A migration destination storage creates an expansion device for virtualizing a migration source logical unit. A host computer accesses an external volume by way of an access path of a migration destination logical unit, a migration destination storage, a migration source storage, and an external volume. After destaging all dirty data accumulated in the disk cache of the migration source storage to the external volume, an expansion device for virtualizing the external volume is mapped to the migration destination logical unit.

20 Claims, 48 Drawing Sheets

COMPUTER SYSTEM HAVING AN EXPANSION DEVICE FOR VIRTUALIZING A MIGRATION SOURCE LOGICAL UNIT

CROSS-REFERENCES TO RELATED APPLICATIONS

This application relates to and claims priority from Japanese Patent Application No. 2006-136869, filed on May 16, 2006, the entire disclosure of which is incorporated herein by reference.

BACKGROUND

The present invention relates to a computer system having a storage system employing storage virtualization technology.

Amidst the rapid advancement of information systems through expansion of internet business and electronic management of procedures, the data volume sent and received by computers is increasing exponentially. In addition to this kind of exponential increase in data volume, the data volume to be stored in storages is also increasing exponentially due to backup of data in disk devices (Disk-to-Disk Backup) and prolonged storage of business activity records (transaction information and emails) of companies required in audits. In connection with this, corporate information systems are seeking the reinforcement of storages in the respective business divisions/respective systems, and the simplification and streamlining in managing the complex IT infrastructure. In particular, expectations are increasing for technology capable of simplifying the management of storages and optimizing the total cost by utilizing the optimal storage according to the value of data.

As a method of reducing management costs of systems having large-scale storages, there is storage virtualization technology disclosed in Japanese Patent Laid-Open Publication No. 2005-011277. Japanese Patent Laid-Open Publication No. 2005-011277 discloses storage virtualization technology (hereinafter also referred to as "external storage connecting technology") which connects a storage system (hereinafter referred to as a "first storage system") connected to a host computer to one or more external storage systems (hereinafter referred to as "second storage systems"), virtualizing a device (hereinafter referred to as an "external device") having a second storage system as though it is a logical device in the first storage system, and providing this to the host computer. When the first storage system receives an I/O request to the logical device from the host computer, it determines whether the device of the access destination corresponds to the external device in the second storage system, or corresponds to a physical device (internal device) such as a disk device mounted on the first storage system, and sorts the I/O request to the appropriate access destination according to the determination result.

As a result of using a storage system employing the external storage connecting technology described in Japanese Patent Laid-Open Publication No. 2005-011277, it is possible to create a system integrating a plurality of storage systems having different attributes such as performance, reliability, price and so on. For instance, it is possible to connect a high cost, high function and highly reliable first storage system using the external storage connecting technology and a low cost, low function and unreliable second storage system, logically hierarchize the storage extents, and optimally dispose data according to the update time of data and value of data. As a result of using the storage system having hierarchized storage extents, it is possible to store, for a long period of time, vast amounts of information such as transaction information and emails arising in the daily business activities with appropriate costs according to the value of each type of information for the purpose of dealing with audits.

Meanwhile, in order to store large capacity data across several ten years exceeding the life of the storage system, it will be necessary to replace the equipment configuring the computer system during the storage period of data. Japanese Patent Laid-Open Publication No. 2005-011277 discloses the copying and migration of data in a logical unit of the migration source storage (hereinafter referred to as a "migration source logical unit") to a logical unit of the migration destination storage (hereinafter referred to as a "migration destination logical unit") in order to replace the first storage system (hereinafter referred to as a "migration source storage") employing the external storage connecting technology with another first storage system (hereinafter referred to as a "migration destination storage").

SUMMARY

Nevertheless, by performing the copy processing from the migration source logical unit to the migration destination logical unit, there is concern that an adverse effect, such as deterioration in throughput, may be inflicted on the I/O processing of devices performed by the migration source storage. In addition, since it is necessary to copy all data in the migration source logical unit to the migration destination logical unit, there is a problem in that much time is required in the device takeover from the migration source storage to the migration destination storage.

Further, due to the complication of the storage hierarchy, in addition to cases where the migration source logical unit and the external device correspond one-on-one, there may be cases where the two do not correspond one-on-one. In particular, even in cases when the migration source logical unit and the external device do not correspond one-on-one, it is desirable to enable data migration in units of logical units as units of the storage extent recognized by the host computer.

Thus, an object of the present invention is to enable the performance of data migration in units of logical units accompanying the change in configuration while suppressing performance deterioration of a storage system in a computer system employing storage virtualization technology.

Another object of the present invention is to enable the sharing of an external volume with a plurality of storage systems in a computer system employing storage virtualization technology.

In order to achieve the foregoing objects, the computer system of the present invention includes a host computer, an external storage system having an external volume, a first storage system having a first expansion device configured by virtualizing the external volume, and a first logical unit configured by virtualizing the first expansion device and recognizable from the host computer, and a second storage system having a second expansion device configured by virtualizing the external volume, and a second logical unit configured by virtualizing the second expansion device and recognizable from the host computer.

Here, for instance, the external storage system controls the exclusive access of either the first or second storage system regarding the respective storage extents configuring the external volume.

The host computer, for example, executes path switching for connecting to a storage system having the access right regarding the respective storage extents configuring the external volume.

The external volume may include a shared extent to be accessed from both the first and second storage systems.

The computer system according to another aspect of the present invention includes a host computer, an external storage system having an external volume, a first storage system having a first expansion device configured by virtualizing the external volume, and a first logical unit configured by virtualizing the first expansion device via an intermediate storage hierarchy so as to become recognizable from the host computer, and a second storage system connectable to the host computer and the external storage system. Upon receiving a command to migrate the first logical unit from the first storage system to the second storage system, the second storage system creates a second expansion device for virtualizing the external volume in the second storage system, creates a third expansion device for virtualizing the first logical unit in the second storage system, defines a path for connecting the first logical unit and the third expansion device, creates a second logical unit configured by virtualizing the third expansion device via an intermediate storage hierarchy in the second storage system so as to become recognizable from the host computer, and sets a path for connecting the second logical unit and the host computer as an alternate path of a path for connecting the first logical unit and the host computer. The host computer, by way of the alternate path, accesses the external volume from the second logical unit via an intermediate storage hierarchy in the second storage system, a path connecting the first and the second storage system, the first logical unit, and an intermediate storage hierarchy in the first storage system. When all data written from the host computer to the second logical unit is written in the external volume, the second storage system releases the relation between the third expansion device and the second logical unit, and associates the second expansion device with the second logical unit.

The first storage system further has a disk cache for temporarily storing data to be read from and written into the first logical volume. Upon receiving a command to migrate the first logical unit from the first storage system to the second storage system, the first storage system sets the operation mode of the first storage system to a cache through mode.

The intermediate storage hierarchy in the first storage system includes a virtual device for virtualizing the first expansion device, and the first logical unit is configured by virtualizing a part of the virtual device.

The first storage system is inhibited from accessing the storage extent corresponding to a part of the virtual device among the storage extents configuring the external volume.

The intermediate storage hierarchy in the first storage system includes a logical device for virtualizing the first expansion device, and the first logical unit is configured by consolidating and virtualizing a plurality of logical devices.

The intermediate storage hierarchy in the first storage system includes a virtual device for virtualizing the expansion device by applying a RAID configuration to the storage extent of the first expansion device, and the first logical unit is configured by virtualizing a part of the virtual device.

The external volume includes a first storage extent for storing user data to be read and written by the host computer, and a second storage extent for storing management information of the first logical unit. The intermediate storage hierarchy in the first storage system includes a logical device for virtualizing the first expansion device. The logical device includes a first storage extent for virtualizing the first storage extent of the external volume, and a second storage extent for virtualizing the second storage extent of the external volume. The first logical unit is configured by virtualizing the first storage extent of the logical device.

The second storage system sets the management information stored in the second storage extent of the external volume as attribute information of the second logical unit.

The computer system of the present invention may further have a function of migrating a plurality of first logical units from the first storage system to the second storage system.

The computer system of the present invention may further have a function of migrating a part of the first logical unit from the first storage system to the second storage system.

In the computer system of the present invention, the first logical unit stores a plurality of file systems, and a part of the logical unit is one or more file systems among the plurality of file systems.

In the computer system of the present invention, the external storage system exclusively accepts the access from the second storage system regarding a storage extent corresponding to a part of the first logical unit among the storage extents configuring the external volume, and exclusively accepts the access from the first storage system regarding a storage extent corresponding to portions excluding a part of the first logical unit among the storage extents configuring the external volume.

In the computer system of the present invention, the host computer executes path switching for connecting to a storage system having an access right regarding the respective storage extents configuring the external volume.

In the computer system of the present invention, the function for encrypting data to be written by the second storage system in the third expansion device is set up as OFF, and the function for encrypting data to be written by the first storage system in the first expansion device is set up as ON.

The computer system of the present invention includes a host computer, an external storage system having an external volume, a plurality of first storage systems having a first expansion device configured by virtualizing the external volume, and a first logical unit configured by virtualizing the first expansion device via an intermediate storage hierarchy so as to become recognizable from the host computer, a second storage system connectable to the host computer and the external storage system, and a management server to be connected to the first and the second storage systems. The management server sets a storage system subject to failure or performance deterioration among the plurality of first storage systems as a migration source storage system, sets the first logical unit of the migration source storage system as a migration source logical unit, and sets the second storage system as a migration destination storage system. The migration destination storage system creates a second expansion device for virtualizing the external volume in the migration destination storage system, creates a third expansion device for virtualizing the migration source logical unit in the migration destination storage system, defines a path for connecting the migration source logical unit and the third expansion device, creates a migration destination logical unit configured by virtualizing the third expansion device via an intermediate storage hierarchy in the migration destination storage system so as to become recognizable from the host computer, and sets a path for connecting the migration destination logical unit and the host computer as an alternate path of a path for connecting the migration source logical unit and the host computer. The host computer, by way of the alternate path, accesses the external volume from the migration destination logical unit via an intermediate storage hierarchy in the migration destination storage system, a path connecting the migration destination storage system and the migration source storage system, the migration source logical unit, and an intermediate storage hierarchy in the migration source storage system. When all data written from the host computer to the migration destination logical unit is written in the external volume, the second storage system releases the relation between the third expansion device and the migration destination logical unit, and associates the second expansion device with the migration destination logical unit.

The computer system of the present invention includes a host computer, an external storage system having an external volume, a first storage system having a first expansion device configured by virtualizing the external volume, and a first logical unit configured by virtualizing the first expansion device via an intermediate storage hierarchy so as to become recognizable from the host computer, and a second storage system having a second expansion device configured by virtualizing the external volume, and a second logical unit configured by virtualizing the second expansion device via an intermediate storage hierarchy so as to become recognizable from the host computer. The first expansion device is configured by virtualizing the second logical unit. A path for connecting the second logical unit and the host computer is set as an alternate path of a path for connecting the first logical unit and the host computer. The host computer access the external volume from the first logical unit via an intermediate storage hierarchy in the first storage system, a path connecting the first and the second storage systems, the second logical unit, and an intermediate storage hierarchy in the second storage system. When all data written from the host computer to the first logical unit is written in the external volume, the host computer accesses the second logical unit by way of the alternate path.

According to the present invention, it is possible to perform data migration in units of logical units accompanying the change in configuration while suppressing performance deterioration of a storage system in a computer system employing storage virtualization technology.

In addition, according to the present invention, it is to possible to share an external volume with a plurality of storage systems in a computer system employing storage virtualization technology.

DETAILED DESCRIPTION

Figure 1:
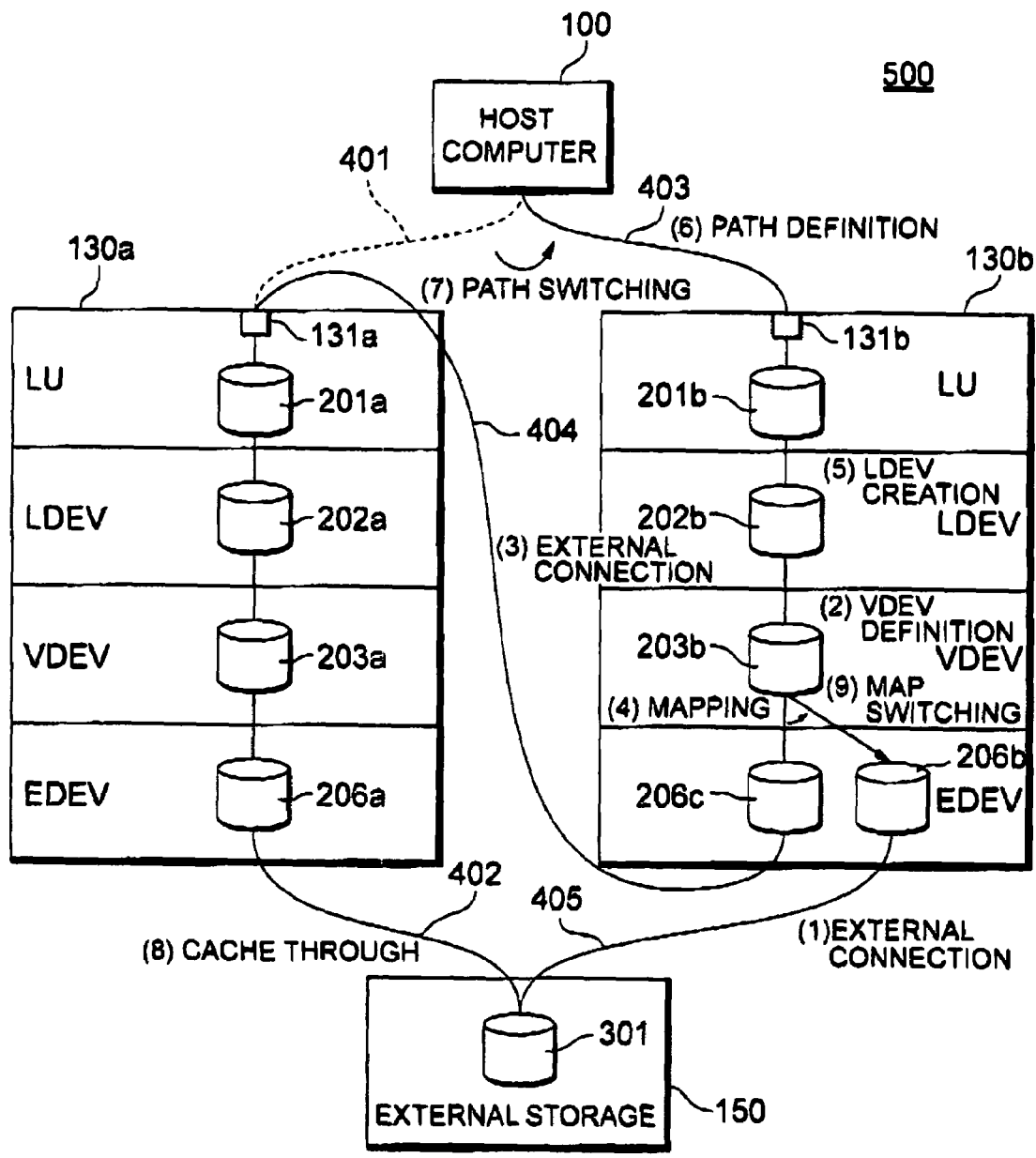
FIG. 1 is a principle diagram of logical unit migration processing according to an embodiment of the present invention.

Embodiments of the present invention are now explained with reference to the attached drawings. Foremost, the principle of logical unit migration processing of the present embodiment is explained with reference to FIG. 1 The computer system 500 pertaining to this embodiment includes a host computer 100, a plurality of storage systems 130a, 130b, and an external storage system 150.

The storage system 130a has one or more logical units (LU) 201a. A LUN (Logical Unit Number) is assigned to the logical unit 201a. The logical unit 201a is provided to the host computer 100 as a logical storage extent. The host computer 100 is able to write data in the logical unit 201a and read data from the logical unit 201a. A plurality of intermediate storage hierarchies (LDEV/DEV/EDEV) are provided to the lower layer of the logical unit 201a. The intermediate storage hierarchy is a logical storage resource for associating the logical unit 201a and the external volume 301. Access from the host computer 100 is conveyed from the logical unit 201a to the external volume 301 via the intermediate storage hierarchy.

For instance, a logical device (LDEV) 202a, a virtual device (VDEV) 203a, and an expansion device (EDEV) 206a may be included in the intermediate storage hierarchy in the storage system 130a. Each of these devices is not necessarily required, and certain devices may be omitted. Further, in addition to each of these devices, other devices (for instance, a device group (DEVGr) or the like described later) (refer to FIG. 3) may also be included.

Figure 3:
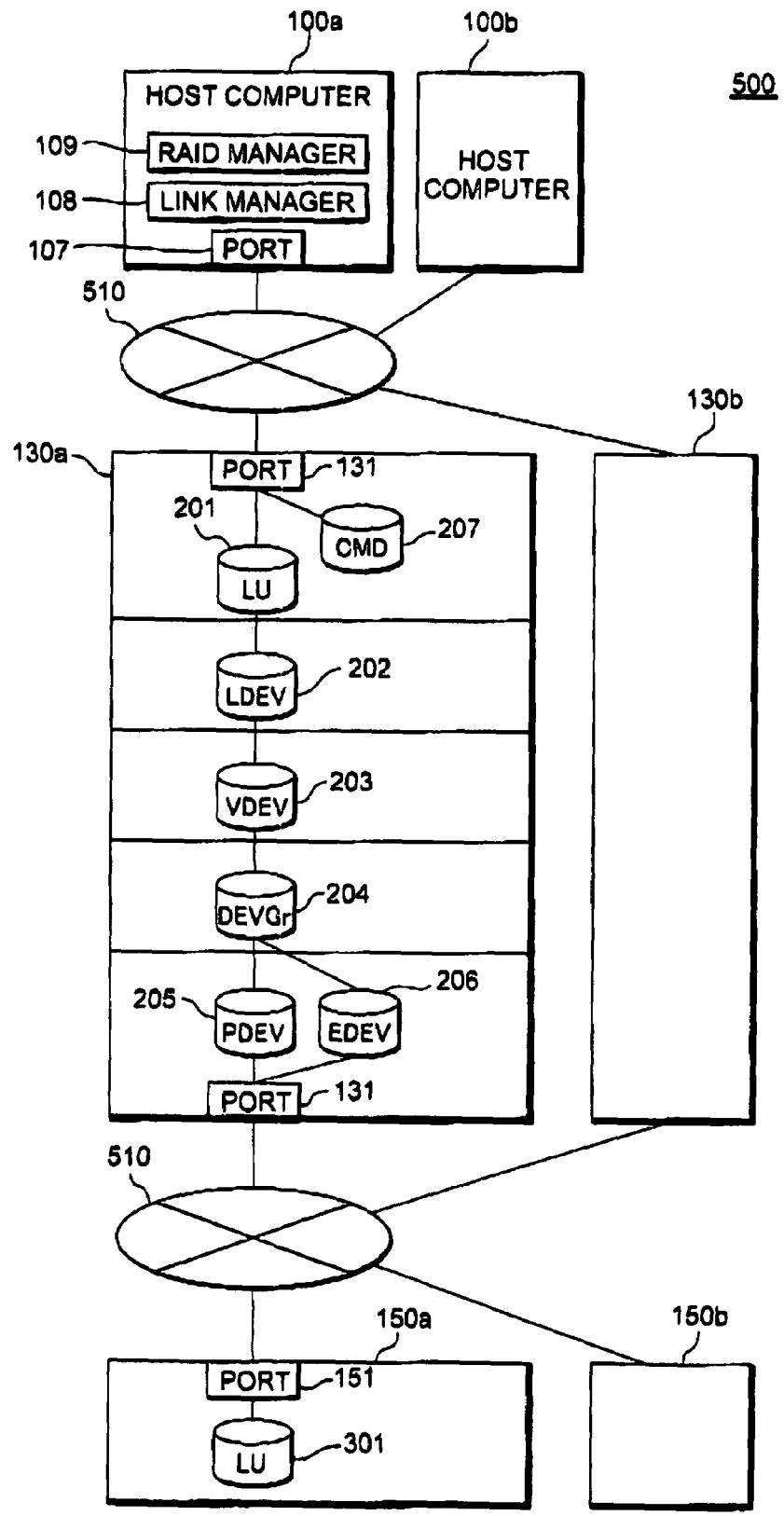
FIG. 3 is an explanatory diagram of a storage hierarchy configured in a storage system.

Incidentally, as shown in FIG. 3, when the storage system 130 has a physical device (PDEV) 205, the physical device 205 and the expansion device 206 both belong to the same intermediate storage hierarchy.

For convenience of explanation, there are times when the storage hierarchy to which the logical unit belongs is referred to as a "LDEV hierarchy". Similarly, there are times when the storage hierarchy to which the logical device belongs is referred to as a "LDEV hierarchy", when the storage hierarchy to which the virtual device belongs is referred to as a "VDEV hierarchy", and when the storage hierarchy to which the physical device and/or expansion device belongs is referred to as a "PDEV/EDEV hierarchy".

The storage system 130a includes one or more ports 131a for connecting to the host computer 100 via a path 401, a logical unit 201a allocated to a port 131a, a logical device 202a mapped to a logical unit 201a, a virtual device 203a mapped to a logical device 202a, and an expansion device 206a mapped to a virtual device 203a. Here, "mapping" refers to the association of an address space of a certain device with an address space of another device. In this specification, to map a certain device to another device is synonymous with associating (or allocating) a certain device with (to) another device.

The storage system 130a is connected to the external storage system 150 via a path 402. The external storage system 150 has an external volume 301 defined on a physical device having a real storage extent such as a disk drive.

Here, the expansion device 206a is a virtualization of the external volume 301 as the storage resource existing outside the storage system 130a. In other words, the expansion device 206a is a storage hierarchy configured by virtualizing the external storage resource.

The virtual device 203a is a storage hierarchy for connecting an upper-level storage hierarchy (for instance LU/LDEV) and a lower-level storage hierarchy (for instance DEVGr/EDEV). When the lower-level storage hierarchy is a physical device, the virtual device 203a, for example, is a storage hierarchy configured by configuring the storage extents provided respectively from a plurality of physical devices in a RAID configuration. Meanwhile, when the lower-level storage hierarchy is an expansion device 206a, the virtual device 203a, for example, is a storage extent configured by assembling all or a part of the respective storage extents of the plurality of expansion devices 206a, or a storage extent configured by extracting a part of the storage extent of the expansion device 206a.

The logical device 202a, for example, is a storage extent configured by assembling all or a part of the respective storage extents of the plurality of virtual devices 203a, or a storage extent configured by extracting a part of the storage extent of the virtual device 203a. When the host computer 100 is an open system, the host computer 100 recognizes the logical device 202a as one physical device, and accesses the desired logical device 202a by designating the LUN or logical block address. When the host computer 100 is a mainframe system, the host computer 100 directly recognizes the logical device 202a.

The logical unit 201a is a virtualization of the external volume 301, and is also a logical storage extent recognized by the host computer 100. For example, when the host computer 100 is a UNIX (registered trademark) system, the logical unit 201a is associated with a device file. Meanwhile, when the host computer 100 is a Windows (registered trademark) system, the logical unit 201a is associated with a drive letter (drive name). A unique LUN (Logical Unit Number) is assigned to the logical unit 201a.

For the convenience of explaining the logical unit migration processing, the relation between the logical unit 201a and the logical device 202a will be one-on-one, the relation between the logical device 202a and the virtual device 203a will be one-on-one, the relation between the virtual device 203a and the expansion device 206a will be one-on-one, and the relation between the expansion device 206a and the external volume 301 will be one-on-one. Under the foregoing relation, the storage capacity of the logical unit 201a recognized by the host computer 100 is equivalent to the storage capacity of the external volume 301.

Meanwhile, the storage system 130b has a plurality of storage hierarchies that are hierarchized as with the storage system 130a. The storage system 130b includes one or more ports 131b for connecting to the host computer 100 via a path 403, a logical unit 201b allocated to the port 131b, a logical device 202b mapped to a logical unit 201b, a virtual device 203b mapped to a logical device 202b, and expansion devices 206c, 206b mapped to a virtual device 203b.

For the convenience of explaining the logical unit migration processing, the relation between the logical unit 201b and the logical device 202b will be one-on-one, the relation between the logical device 202b and the virtual device 203b will be one-on-one, the relation between the virtual device 203b and the expansion device 206c will be one-on-one, the relation between the virtual device 203b and the expansion device 206b will be one-on-one, the relation between the expansion device 206c and the logical unit 201a will be one-on-one, and the relation between the expansion device 206b and the external volume 301 will be one-on-one. Further, the expansion device 206c and the expansion device 206b have the same storage capacity, and either the expansion device 206c or the expansion device 206b is selectively mapped to the virtual device 203b.

The outline of processing for migrating data of the logical unit 201a (migration source logical unit) in the storage system 130a (migration source storage) to the logical unit 201b (migration destination logical unit) in the storage system 130b (migration destination storage) is now explained. The logical unit migration processing includes the following processing routine of (1) to (9).

(1) The storage system 130b defines a path 405 for externally connecting the external volume 301 and the storage system 130b, and creates an expansion device 206b for virtualizing the external volume 301 in the storage system 130b.

(2) The storage system 130b creates a virtual device 203b having a storage capacity that is the same as the storage capacity of the external volume 301 in the storage system 130b.

(3) The storage system 130b defines a path 404 for externally connecting the 10 logical unit 201a and the storage system 130b, and creates an expansion device 206c for virtualizing the logical unit 201a in the storage system 130b.

(4) The storage system 130b maps the expansion device 206c to the virtual device 203b.

(5) The storage system 130b creates a logical device 202b having a logical configuration that is the same as the logical configuration of the logical device 202a in the storage system 130b. The virtual device 203b is mapped to the logical device 202b.

(6) The storage system 130b creates a logical unit 201b having a logical configuration that is the same as the logical configuration of the logical unit 201a in the storage system 130b, and defines a path 403 for connecting the host computer 100 and the logical unit 201b. The logical device 202b is mapped to the logical unit 201b.

(7) The host computer 100 switches the path 401 to the path 403 as a path for accessing the external volume 301. Here, access from the host computer 100 to the logical unit 201a is inhibited such as by deleting the path 401. Incidentally, path switching from the path 401 to the path 403 may also be conducted by the storage systems 130a, 130b, or the management server 110. Further, it is not necessarily the case that the path 401 needs to be deleted, and, for instance, the path 401 may be set as an alternate path (for instance, a path to be used during system failure) of the path 403, and the path 401 may be left as is with the path 401 in an invalid state.

As a result of the foregoing processing, not only is the logical unit 201b a virtualization of the logical unit 201a, it is also a virtualization of the external volume 301. Thus, the data I/O path from the host computer 100 to the logical unit 201a during the logical unit migration processing will be path 403→storage hierarchy (LU/LDEV/VDEV/EDEV) in the storage system 130b→path 404→storage hierarchy (LU/LDEV/VDEV/EDEV) in the storage system 130a→path 402→external volume 301.

Incidentally, when the storage systems 130a, 130b involved in the logical unit migration processing are equipped with an encryption function, there are cases when it is not possible to decrypt data written in the external volume 301 if the encryption function of the two storage systems 130a, 130b is set to be ON. In the foregoing case, the encryption function of the storage system 130b is set to be OFF, and the encryption function of the storage system 130a is set to be ON. In other words, data written in the expansion device 206c is not encrypted due to the storage system 130b, and data written in the expansion device 206a is not encrypted due to the storage system 130a. As a result of setting the encryption function as described above, since it is possible to limit the number of times data written in the external volume 301 is encrypted to once, it is possible to decrypt data written in the external volume 301.

(8) The storage system 130a sets the operation mode of the storage system 130a for destaging to the external volume 301 all dirty data accumulated in the disk cache of the storage system 130a to a cache through mode (write through mode). Dirty data refers to unreflected data that has not been destaged from the disk cache to the external volume 301. A cache through mode refers to the operation of receiving a data write request from the host computer 100 and storing data in the disk cache, additionally writing such data in a device (internal device or external device), and thereafter reporting the completion of updating data to the host computer 100. Incidentally, the storage system 130a may autonomously set the operation mode to a cache through mode, or set the operation mode to a cache through mode based on an external command (for instance, from the storage system 130b, the host computer 100, or a management server 110 described later).

(9) After destaging all dirty data accumulated in the disk cache of the storage system 130a to the external volume 301, the storage system 130b releases the mapping relation between the expansion device 206c and the virtual device 203b, and maps the expansion device 206b to the virtual device 203b. In addition, the storage system 130b deletes the path 404.

According to the foregoing method, it is possible to migrate the logical unit 201a while continuing the data I/O processing from the host computer 100 to the logical unit 201a. Thereby, since the role of performing I/O processing to the external volume according to the load fluctuation among the plurality of storage systems 130 resulting from the I/O request from the host computer 100 can be switched between the plurality of storage systems 130a, 130b, it is possible to realize the load balancing of the computer system 500. In addition, by setting the operation mode of the migration source storage among the storage systems 130a, 130b to a cache through mode and setting the operation mode of the migration destination storage to a write after mode, it is possible to perform asynchronous write processing using the disk cache, and suppress the performance deterioration of the storage system 130a caused by the logical unit migration processing.

Incidentally, although it is possible to migrate the logical unit 201a even if the operation mode of the migration target storage system 130b to a cache through mode, the migration processing of the logical unit 201a will not be complete unless all dirty data accumulated in the migration source storage system 130a is destaged to the external volume 301. Thus, in order to shorten the migration processing time of the logical unit 201a, it is preferable to set the operation mode of the migration source storage system 130a to a cache through mode.

Further, with the system configuration shown in FIG. 1, although the respective storage systems 130a, 130b have an expansion device 206 configured by virtualizing the external volume 301, they do not have an internal device (physical device). The logical unit migration processing pertaining to the present invention is not limited to the application in a system configuration as shown in FIG. 1, and, for instance, may also be applied to processing for migrating a logical unit provided by a physical device such as a disk device built in the storage systems 130a, 130b that do not have an external volume virtualization function.

In the foregoing explanation of the logical unit migration processing, although a case was illustrated where the mutual mapping relation between the respective intermediate storage hierarchies is one-on-one for the convenience of explanation, the mutual mapping relation between the respective intermediate storage hierarchies is not necessarily limited to be one-on-one. As the mutual mapping relation between the respective intermediate storage hierarchies, for example, variations such as CVS (Custom Volume Size), LUSE (LU Size Expansion), external volume RAID, VMA (Volume Management Area) volume, mainframe volume, VDEV consolidation, VDEV discrete, AOU (Allocation on Use), snapshot and the like may be considered. Details will be explained in the embodiments described later (refer to FIG. 4 to FIG. 22).

Embodiments

Figure 2:
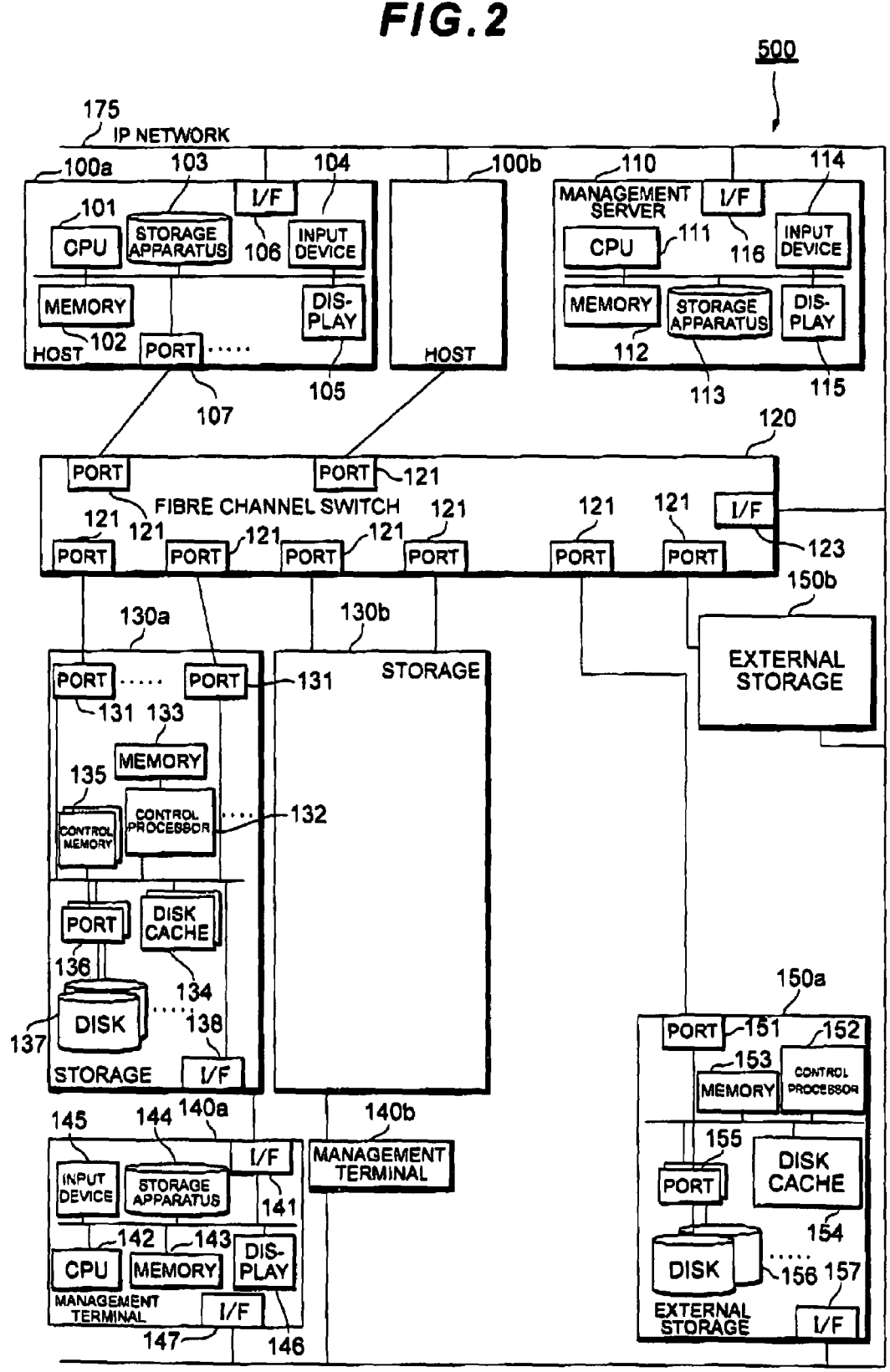
FIG. 2 is a network configuration relating to an embodiment of the present invention.

FIG. 2 shows a network configuration of the computer system 500 pertaining to the present embodiment. The computer system 500 includes a plurality of host computers 100a, 100b, one or more management servers 110, one or more fibre channel switches 120, a plurality of storage systems 130a, 130b, a plurality of management terminals 140a, 140b, and a plurality of external storage systems 150a, 150b. In the following explanation, when the host computers 100a, 100b are not differentiated, they are collectively referred to as a host computer 100. When the storage systems 130a, 130b are not differentiated, they are collectively referred to as a storage system 130. When the management terminals 140a, 140b are not differentiated, they are collectively referred to as a management terminal 140. When the external storage systems 150a, 150b are not differentiated, they are collectively referred to as a storage system 150.

The host computer 100, the storage system 130, and the external storage system 150 are respectively connected to a port 121 of a fibre channel switch 120 via ports 107, 131, 151. Further, the host computer 100, the storage system 130, the external storage system 150, and the fibre channel switch 120 are respectively connected from the interface controllers 106, 138, 157, 123 to the management server 110 via an IP network 175. The management server 110 manages these network nodes (host computer 100, storage system 130, external storage system 150, and fibre channel switch 120).

Incidentally, although the storage system 130 has a network configuration connected to the management server 110 via the management terminal 140 in this embodiment, the storage system 130 may be of a network configuration to be directly connected to the IP network 175.

The host computer 100 includes a CPU 101, a memory 102, a storage apparatus 103, an input device 104, a display 105, an interface controller 106, and a port 107. The storage apparatus 103, for instance, is a disk device, a magneto optical disk device or the like. The host computer 100 executes information processing by reading software such as an operating system or an application program stored in the storage apparatus 103 into the memory 102, and making the CPU 101 read and execute such software. The input device 104 is a keyboard, a mouse or the like. The host computer 100 accepts input from a host administrator or the like via the I/O device 104, and displays the information processing results and the like on the display 105. The interface controller 106 is a LAN adapter or the like for connecting to the IP network 175. The port 107 is a host bus adapter or the like for connecting to the storage system 130.

The management server 110 includes a CPU 111, a memory 112, a storage apparatus 113, an input device 114, a display 115, and an interface controller 116. The storage apparatus 113, for instance, is a disk device, a magneto optical disk device or the like. The management server 110 reads storage management software stored in the storage apparatus 113 into the memory 112, and maintains and manages the overall computer system 500 by making the CPU 111 read and execute such storage management software. When the CPU 111 executes the storage management software, the management server 110 collects, from the interface controller 116 via the IP network 175, configuration information, resource utilization ratio, performance monitoring information, failure log and so on from the respective network nodes in the computer system 500. The management server 110 thereafter outputs the collected information to an output device such as the display 115 so as to present such information to the storage administrator. The management server 110 also accepts commands relating to maintenance and management from the storage administrator via the input device 114 such as a keyboard or a mouse, and sends such commands to the network node.

The storage system 130 has one or more ports 131 for connection to the storage network, one or more control processors 132 for controlling the data I/O processing to the disk device 137, one or more memories 133 that function as a work area of the respective control processors 132, one or more disk caches 134 for temporarily storing data to be input and output to and from the disk device 137, one or more control memories 135 for storing configuration information and the like of the storage system 130, one or more ports 136 that function as an interface for connecting to the disk device 137, and a disk device 137 for storing data.

The control processor 132 specifies the logical unit of the access destination based on information (port ID and LUN) contained in the I/O request received from the host computer 100 via the port 131. If the logical unit of the access destination corresponds with the disk device 137 (internal device), the control processor 132 controls the input and output of data to and from the disk device 137. If the logical unit of the access destination corresponds with the external storage system 150 (external device), the control processor 132 controls the input and output of data to and from the external storage system 150.

Incidentally, as the port 131, although a port corresponding to a fibre channel interface having SCSI (Small Computer System Interface) as the upper-level protocol is assumed in this embodiment, the port 131 may also be a port corresponding to an IP network interface having SCSI as the upper-level protocol.

The storage system 130 has the following storage hierarchy. A disk array is configured from a plurality of disk devices 137, and this disk array is managed as a physical device by the control processor 132. Further, the control processor 132 allocates a logical device to the physical device mounted in the storage system 130 (that is, the control processor 132 associates the physical device with the logical device). The logical device is managed in the storage system 130, and its LDEV number is managed independently in each storage system 130.

The logical device is associated with the LUN allocated to each port 131, and is provided to the host computer 100 as a device in the storage system 130. In other words, what the host computer 100 recognizes is the logical device in the storage system 130, and the host computer 100 uses the LUN for identifying the logical device allocated to the port 131 in order to access the data stored in the storage system 130.

In this embodiment, the control processor 132 manages the logical device in the external storage 150 as an external device, and virtualizes it as a device (internal device) in the storage system 130. In other words, the external device managed by the storage system 130 is a virtual device. The external device incorporated into the storage system 130 with the external storage connecting technology is managed as a logical device in the storage system 130 as with the physical device in the storage system 130.

In order to realize the foregoing storage hierarchy, the control processor 132 manages the relation of the logical device, physical device, and disk device 13 in the storage system 130, and the logical device and disk device 156 in the external storage system 150. The control processor 132 converts the I/O request from the host computer 100 into an access request to the disk device 137 in the storage system 130, or into an access request to the disk device 156 in the external storage system 150.

As described above, the storage system 130 of this embodiment defines one or more physical devices by consolidating the storage extents of a plurality of disk devices 137 (that is, it consolidates the storage extents of a plurality of disk devices 137 and associates it with one or more physical devices), allocates one logical device to one physical device, and provides the storage extent to the host computer 100. Each disk device 137 may also be associated with one physical device, The control processor 132 controls the data I/O processing to the device, as well as controls the data replication and data rearrangement between the volumes. The control processor 132 is connected to the management terminal 140 via the interface controller 138, and may also receive the configuration change command input by the storage administrator into the management terminal 140, and change the configuration of the storage system 130.

The disk cache 134 temporarily stores the data to be input and output between the host computer 100 and the disk device 137. The processing of storing data received by the storage system 130 from the host computer 100 in the disk cache 134, returning a write completion report to the host computer 100, and thereafter destaging the data to the disk device 137 is referred to as write after processing.

When the storage system 130 is configured to perform write after processing, in order to prevent the data stored in the disk cache 134 from becoming lost before being written into the disk device 137, it is preferable to improve the fault tolerance by backing up the power of the disk cache 134, or duplexing the disk cache 134.

The control memory 135 stores configuration information of the storage system 130 (for instance, mapping information for managing the relation between devices, setting information of the cache through mode or the like). Since the control processor 132 will not be able to access the disk device 137 if the configuration information stored in the control memory 135 is lost, it is preferable to improve the fault tolerance by backing up the power of the control memory 135, or duplexing the control memory 135.

The management terminal 140 includes an interface controller 141, a CPU 142, a memory 143, a storage apparatus 144, an input device 145, a display 146, and an interface controller 147. The interface controller 141 is a communication interface for connecting to the storage system 130. The storage apparatus 144, for instance, is a disk device, a magneto optical disk device or the like. The input device 145 is a keyboard, a mouse or the like. The display 146 provides a user interface environment for storage management, and, for instance, displays the configuration information and management information of the storage system 130. The CPU 142 refers to the configuration information, changes the configuration, and commands the operation of specific functions by reading and executing the storage management program stored in the storage apparatus 144 into the memory 143.

In this embodiment, a network configuration may be adopted where the storage system 130 is directly connected to the management server 110 without going through the management terminal 140, and manages the storage system 130 with management software that operates on the management server 110.

The external storage system 150 includes one or more ports 151 for connecting to the port 131 of the storage 130 via the fibre channel switch 120, one or more control processors 152 for controlling the data I/O processing to the disk device 156, one or more memories 153 that function as a work area of the respective control processors 152, one or more disk caches 154 for temporarily storing data to be input and output to and from the disk device 156, one or more ports 155 that function as an interface for connecting the control processor 152 to the disk device 156, one or more disk drives 156 for storing data, and an interface controller 157 that functions as an interface for connecting to the IP network.

Since a network configuration where the port 131 equipped in the storage system 130 and the port 151 equipped in the external storage system 150 are connected via the fibre channel switch 120 is adopted in this embodiment, it is desirable to set zoning to the fibre channel switch 120 in order to prevent the direct access from the host computer 100 to the external storage system 150. It is not necessarily required to establish the fibre channel switch 120 on the storage network, and, for instance, a network configuration where the port 131 equipped in the storage system and the port 151 equipped in the external storage system 150 are directly connected may also be adopted.

FIG. 3 shows a storage hierarchy configured in the storage system 130 pertaining to this embodiment. Logical resources and physical resources that are the same as those shown in FIG. 1 and FIG. 2 are given the same reference numeral, and the detailed explanation thereof is omitted.

The host computer 100 includes a link manager 108 and a RAID manager 109. The link manager 108 is a software program for switching the access path to the storage system 130. The RAID manager 109 is storage management software for managing the storage resource of the storage system 130, and gives various commands to the storage system 130 (for instance, a logical unit migration command).

A certain port 131 equipped in the storage system 130 is connected to the host computer 100 via the storage network 510, and another port 131 is connected to the external storage system 150 via the storage network 510. The storage network 510 is a network such as an FC-SAN (Fibre Channel Storage Area Network) including one or more fibre channel switches 120.

The storage system 130 has a storage hierarchy configured from a logical unit 201, a logical device 202, a virtual device 203, a device group 204, a physical device 205, and an expansion device 206. The device group 204, for instance, is a storage extent configured by consolidating all or a part of the respective storage extents of a plurality of physical devices 205 and/or the expansion device 206, or a storage extent configured by extracting a part of the storage extent of the physical device 205 and/or the expansion device 206.

Incidentally, although the physical device 205 and the expansion device 206 differ in that the former is a virtualization of the storage extent (internal device) of the disk device 137 of the storage system 130, and the latter is a virtualization of the storage extent (external device) of the disk device 156 of the external storage system 150, the both are common in that they are virtualizations of real devices, and therefore belong to the same hierarchy (lowest layer).

The storage system 130 includes a CMD (Command Device) 207 to be allocated to the port 131. The CMD 207 is a logical unit used for transferring commands and statuses between the host computer 100 and the storage system 130. Commands sent from the host computer 100 to the storage system 130 are written in the CMD 207. The storage system 130 executes processing corresponding to the commands written in the CMD 207, and writes the execution result thereof as a status in the CMD 207. The host computer 100 reads and confirms the status written in the CMD 207, and writes the command to be subsequently executed in the CMD 207. Like this, the host computer 100 is able to give various commands to the storage system 130.

As the contents of commands to be given by the host computer 100 to the storage system 130, for instance, there is a device migration command (logical unit migration command) in units of logical units or a device migration command (logical device migration command) in units of logical devices. Outline of the logical unit migration processing is as described above. If the logical unit 201 of the migration source is of a LUSE configuration, the host computer 100 is able to give a logical device migration command to the storage system 130. Since a plurality of logical devices 202 are mapped to one logical unit 201 in a logical unit 201 having a LUSE configuration (refer to FIG. 5), by designating one logical device 202 (for instance, a logical device 202 allocated to the top address of the logical unit 201) among the plurality of logical devices 202, it is possible to designate all other logical devices 202 mapped to the logical unit 201 as the migration target.

Incidentally, when prescribed conditions (for instance, when a failure occurs in the storage system 130 or when the performance of the storage system 130 deteriorates) are satisfied, the storage system 130 may autonomously (without waiting for a command from the host computer 100) execute the logical unit migration processing. Outline of processing for migrating the logical unit when a failure occurs in the storage system 130 or when the performance of the storage system 130 deteriorates will be described later.

Further, the management server 110 may also give a logical unit migration command to the storage system 130 via the IP network 175 and the management terminal 140. In other words, a logical unit migration command may be given from the host computer 100 to the storage system 130 via an inbound network (via the storage network), or a logical unit migration command may be given from the management server 110 to the storage system 130 via an outbound network (via the IP network).

Variations in the mutual mapping relation between the respective storage hierarchies are now explained with reference to FIG. 4 to FIG. 22.

(1) CVS

Figure 4:
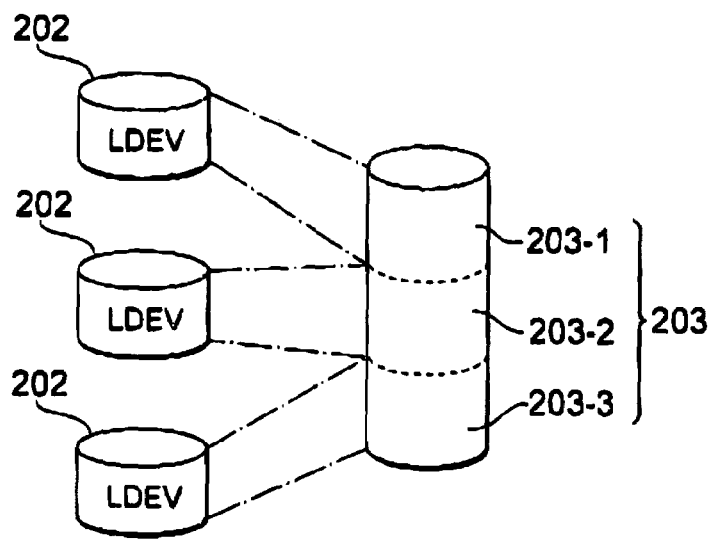
FIG. 4 is an explanatory diagram showing a mapping relation of the CVS configuration.

As shown in FIG. 4, the mapping relation of partitioning one virtual device 203 into a plurality of VDEV extents 203-1, 203-2, 203-3, and allocating one logical device 202 to the respective VDEV extents 203-1, 203-2, 203-3 is referred to as CVS. Sizes of the respective VDEV extents 203-1, 203-2, 203-3 do not necessarily have to be the same.

(2) LUSE

Figure 5:
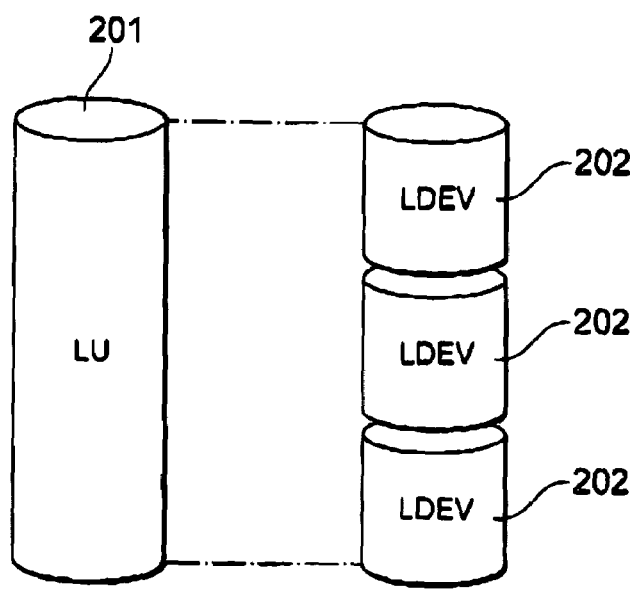
FIG. 5 is an explanatory diagram showing a mapping relation of the LUSE configuration.

As shown in FIG. 5, the mapping relation of gathering the storage extents of a plurality of logical devices 202 and allocating them to one logical unit 201 is referred to as LUSE.

(3) External Volume RAID

Figure 6:
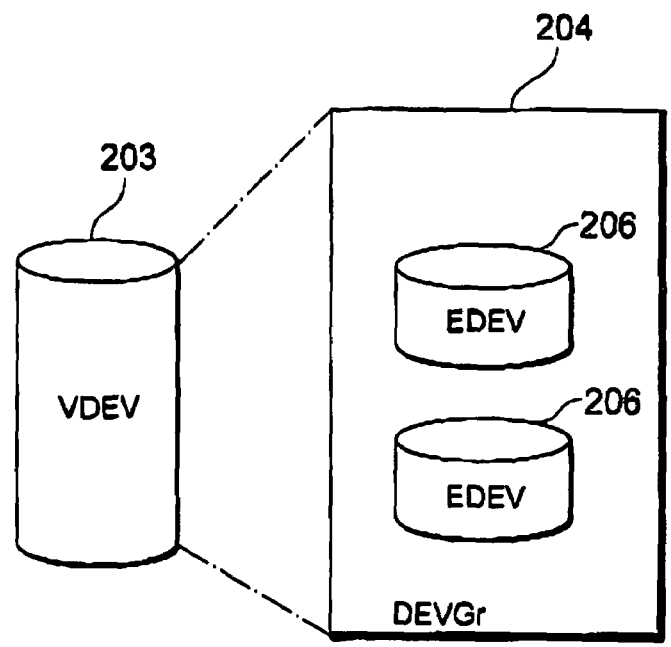
FIG. 6 is an explanatory diagram showing a mapping relation of the external volume RAID configuration.

As shown in FIG. 6, the mapping relation of allocating an expansion device 206 of a RAID configuration to a device group 204 is referred to as an external volume RAID. For example, one expansion device 206 among the plurality of expansion devices 206 of a RAID 1 configuration corresponds to a data disk, and another expansion device 206 corresponds to a mirror disk.

(4) VMA Volume

Figure 7:
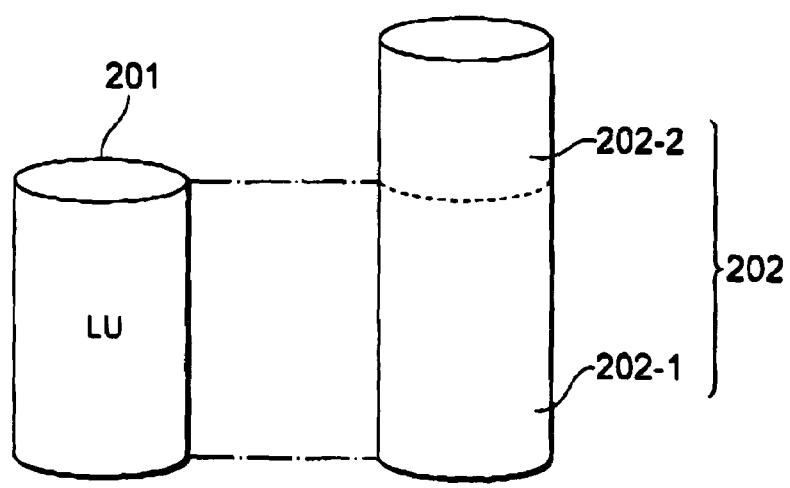
FIG. 7 is an explanatory diagram of the VMA volume.

FIG. 7 shows a VMA volume. A VMA volume is a logical device 202 used in an open system. The logical device 202 has a user extent 202-1 for storing user data, and a management extent 202-2 for storing management information. Management information, for instance, includes the access attribute of the VMA volume. Access attribute includes information such as readable/writable, read only, non-readable/non-writable, read capacity zero, inquiry inhibit, secondary volume disable (S-VOL disable) and so on. The user extent 202-1 can be recognized by the host computer 100 and is allocated to the logical unit 201, whereas the management extent 202-2 cannot be recognized by the host computer 100, and is not allocated to the logical unit 201.

(5) Mainframe Volume

Figure 8:
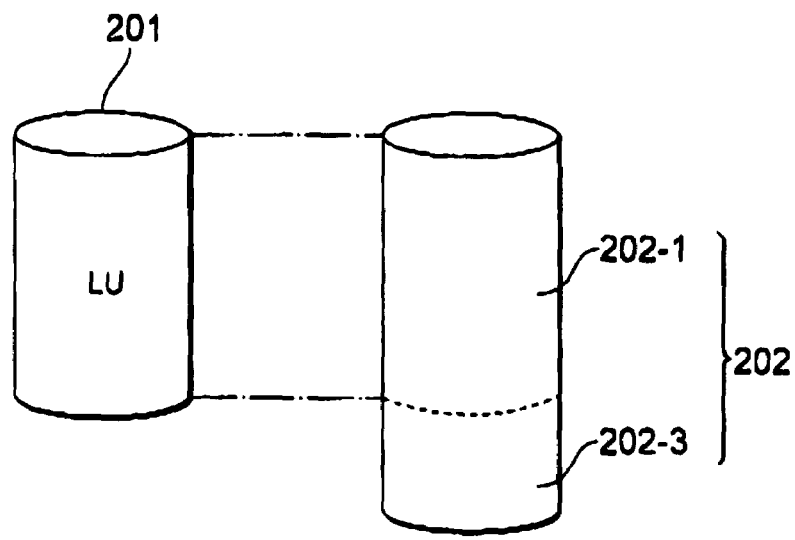
FIG. 8 is an explanatory diagram of the mainframe volume.

FIG. 8 shows a mainframe volume. The mainframe volume is a logical device 202 to be used in a mainframe system. The logical device 202 has a user extent 202-1 for storing user data, and a management extent 202-3 for storing management information. The management information, for example, includes the access attribute of the mainframe volume and so on. The user extent 202-1 can be recognized by the host computer 100 and is allocated to the logical unit 201, whereas the management extent 202-3 cannot be recognized by the host computer 100 and is not allocated to the logical unit 201.

(6) VDEV Consolidation

Figure 9:
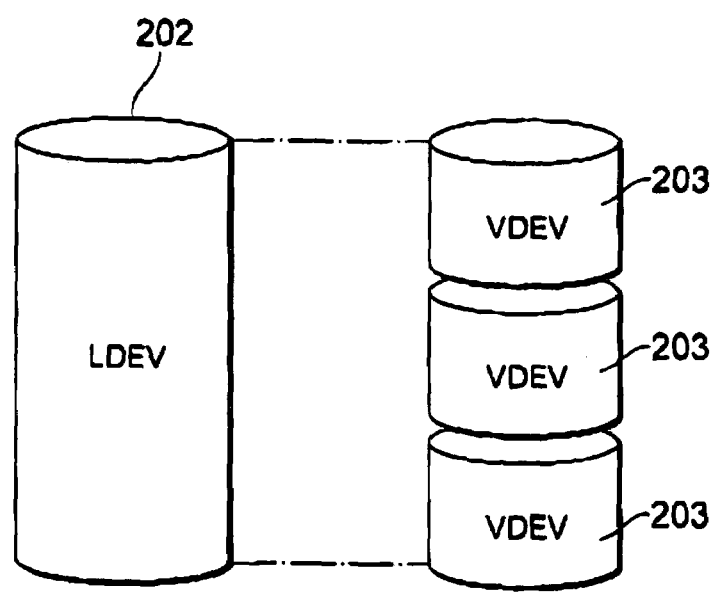
FIG. 9 is an explanatory diagram showing a mapping relation of the VDEV consolidation.

As shown in FIG. 9, the mapping relation of gathering the storage extents of a plurality of virtual devices 203 and allocating them to one logical device 202 is referred to as VDEV consolidation.

(7) VDEV Discrete (Basic Form)

Figure 10:
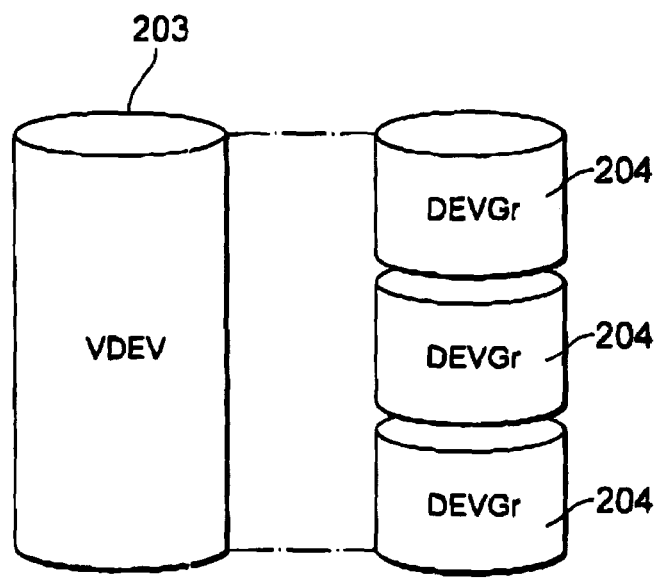
FIG. 10 is an explanatory diagrams showing a mapping relation of the VDEV discrete.

As shown in FIG. 10, the mapping relation of gathering the storage extents of a plurality of device groups 204 and allocating them to one virtual device 203 is referred to as VDEV discrete. The mapping relation of VDEV discrete includes the modified examples 1 and 2 described below.

(B) VDEV Discrete

MODIFIED EXAMPLE 1

Figure 11:
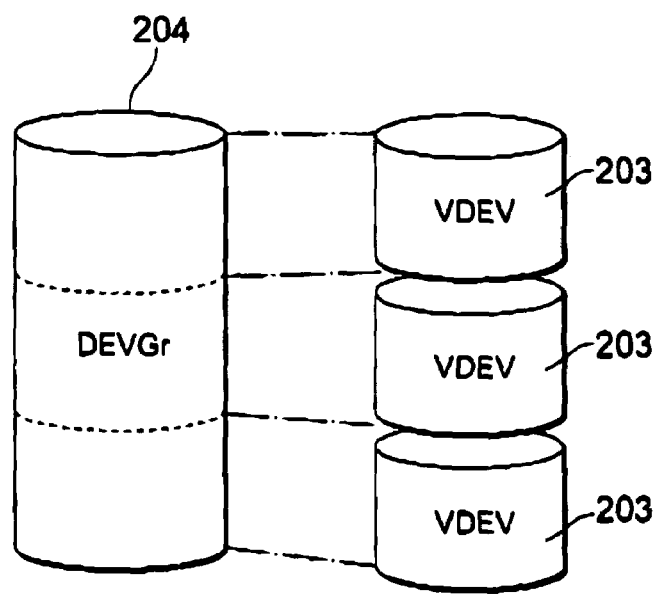
FIG. 11 is an explanatory diagram showing a mapping relation of the VDEV discrete.

As one modified example of VDEV discrete, for example, as shown in FIG. 11, one device group 204 may be partitioned into a plurality of storage extents, and one virtual device 203 may be allocated to each of the partitioned storage extents.

(9) VDEV Discrete

MODIFIED EXAMPLE 2

Figure 12:
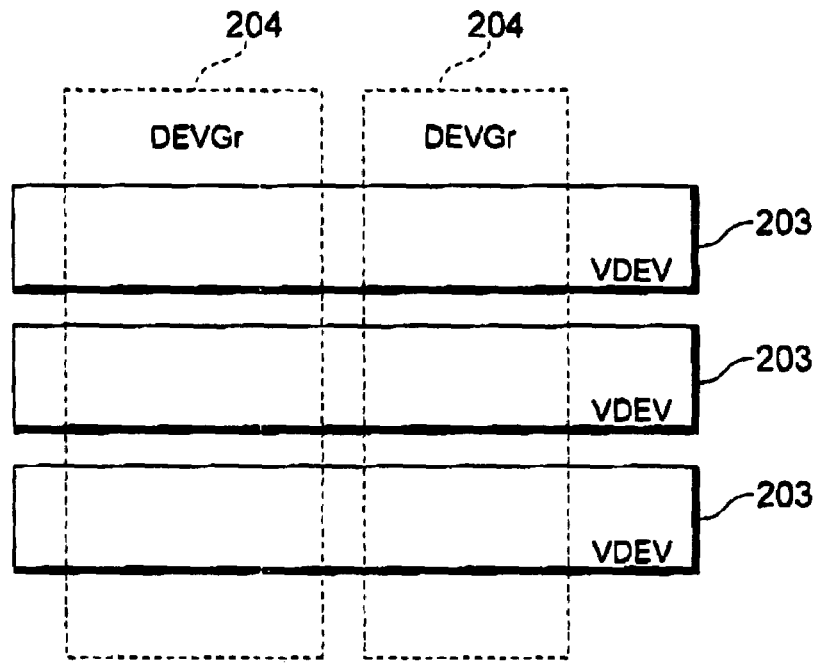
FIG. 12 is an explanatory diagram showing a mapping relation of the VDEV discrete.

As another modified example of VDEV discrete, for example, as shown in FIG. 12, each of the plurality of device groups 204 may be partitioned into a plurality of storage extents, and each of the partitioned storage extents may be allocated to a plurality of virtual devices 203.

(10) DEVGr/EDEV

Figure 13:
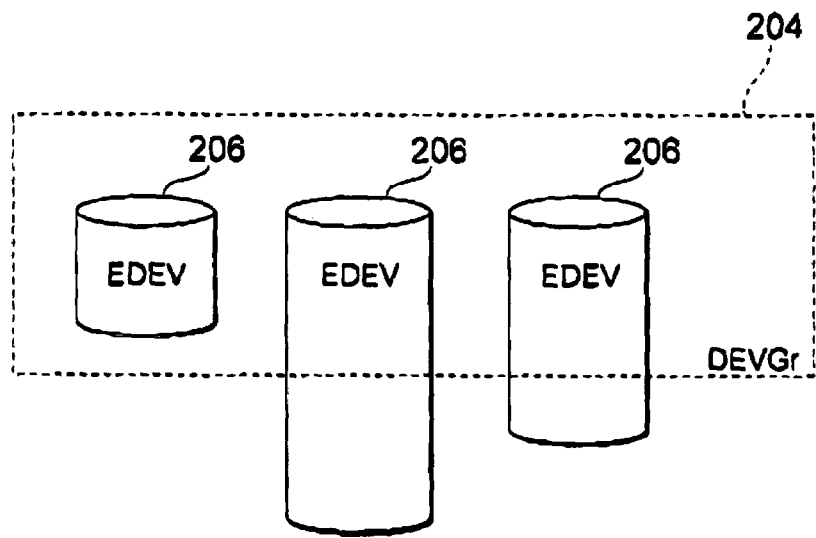
FIG. 13 is an explanatory diagram showing the DEVGr-EDEV/PDEV mapping relation.
Figure 14:
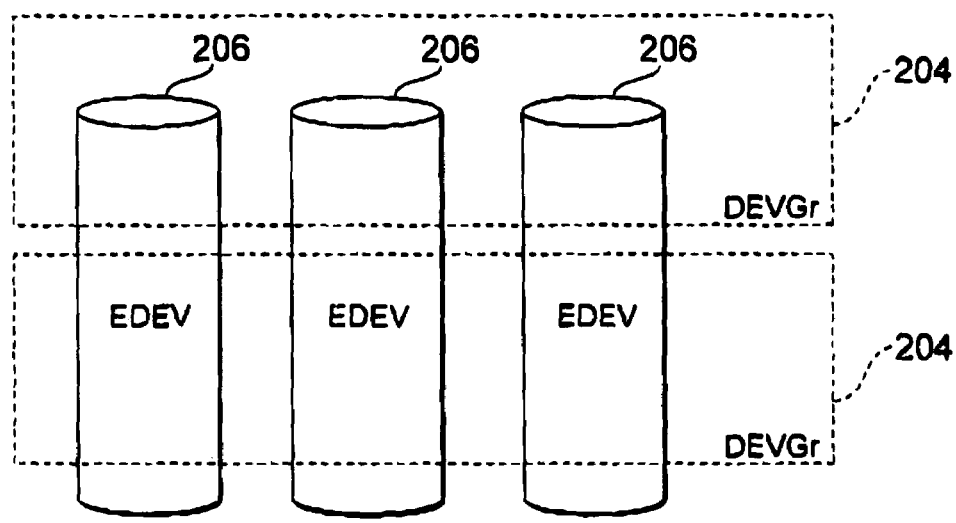
FIG. 14 is an explanatory diagram showing the DEVGr-EDEV/PDEV mapping relation.
Figure 15:
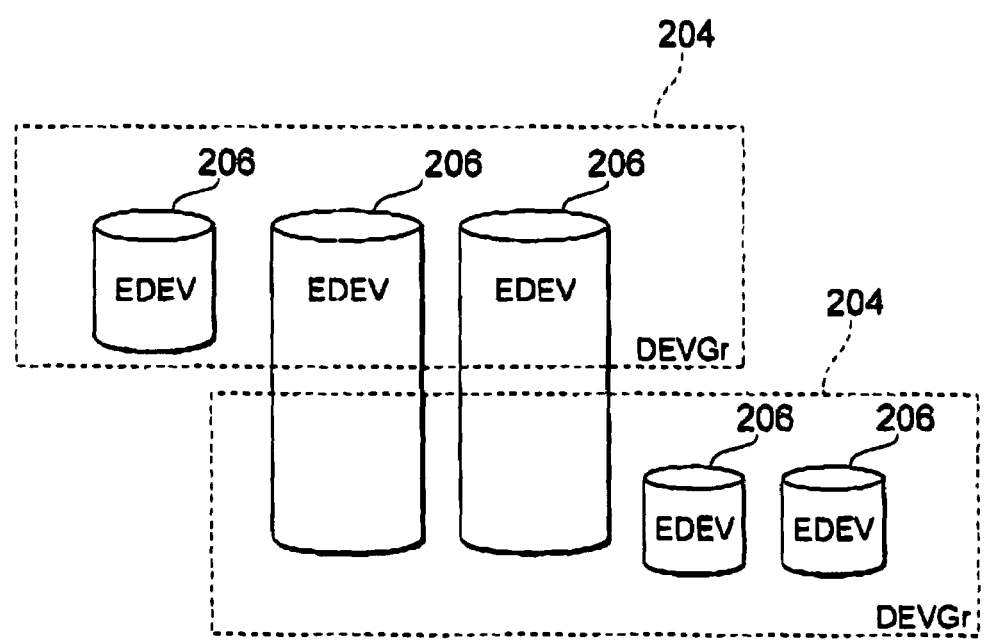
FIG. 15 is an explanatory diagram showing the DEVGr-EDEV/PDEV mapping relation.

With respect to the mapping relation between the device group 204 and the expansion device 206, for instance, as shown in FIG. 13, all or a part of the respective storage extents of the plurality of expansion devices 206 may be gathered and allocated to one device group 204. Among the expansion devices 206, there may be a storage extent that is not allocated to the device group 204. For example, as shown in FIG. 14, all or a part of the respective storage extents of the plurality of expansion devices 206 may be gathered and allocated to a plurality of device groups 204. Among the expansion devices 206, there may be a storage extent that is not allocated to any device group 204. For example, as shown in FIG. 15, there may be an expansion device 206 that is allocated to a plurality of device groups 204, or an expansion device 206 that is allocated only to certain device groups 204.

(11) Heterogenous Media Mixed RAID

Figure 16:
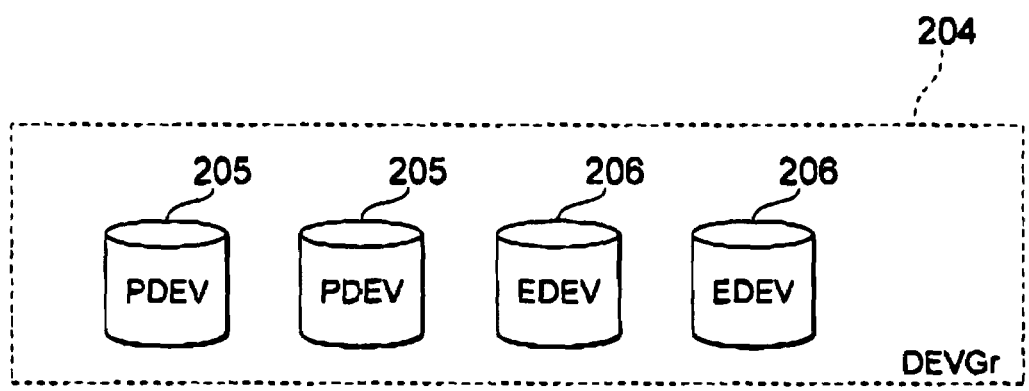
FIG. 16 is an explanatory diagram showing the DEVGr-EDEV/PDEV mapping relation.
Figure 17:
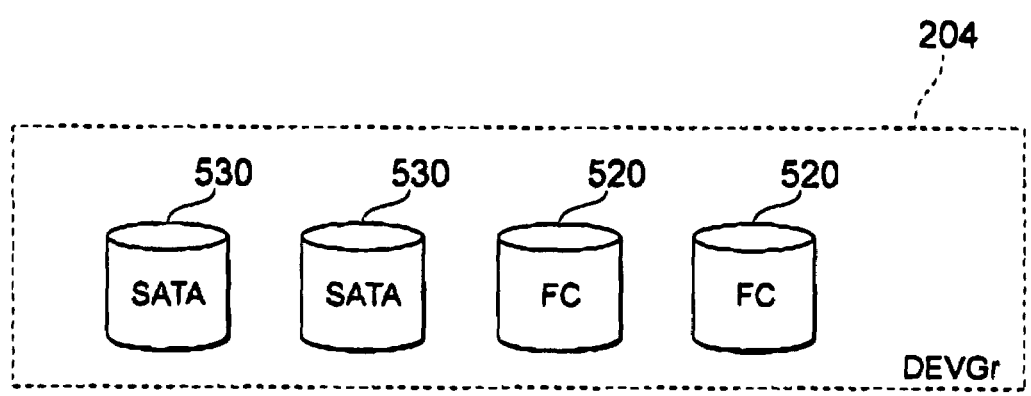
FIG. 17 is an explanatory diagram showing the DEVGr-EDEV/PDEV mapping relation.

As shown in FIG. 16, heterogenous devices (for instance, physical device 205 and expansion device 206) may be mixed and allocated to the storage extent of one device group 204. For example, as shown in FIG. 17, heterogenous disk drives (for instance, FC disk drive 520 and SATA disk drive 530) may be mixed and allocated to the storage extent of one device group 204. For example, as shown in FIG. 18 to FIG. 20, the flash memory 540 and the disk drive 550 may be mixed and allocated to the storage extent of one device group 204.

Figure 18:
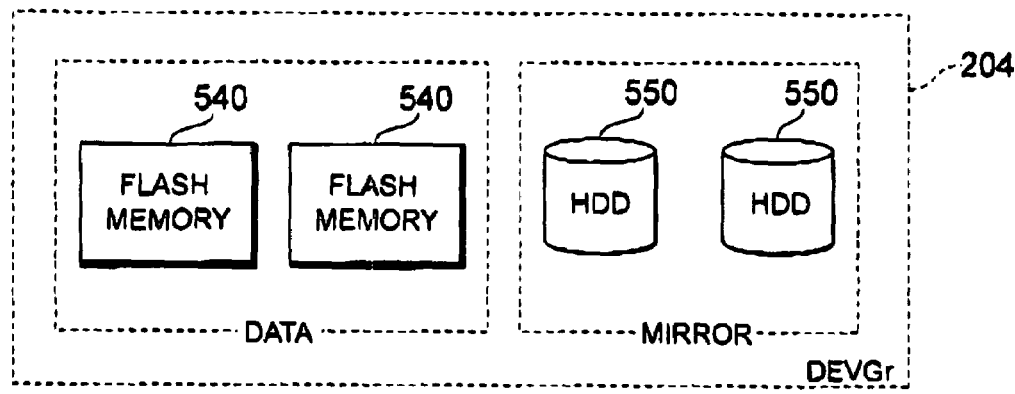
FIG. 18 is an explanatory diagram showing the DEVGr-EDEV/PDEV mapping relation.

In FIG. 18, a device group 204 having a RAID 0/1 configuration based on a plurality of flash memories 540 and a plurality of disk drives 550 is configured. A data volume is configured with a plurality of flash memories 540, and a mirror volume is configured with a plurality of disk drives 550. In this kind of drive configuration, data is read from the flash memory 540 during random reading. Data is read respectively from the flash memory 540 and the disk drive 550 during sequential reading. Data is respectively written in the flash memory 540 and the disk drive 550 during writing. According to this kind of drive configuration, it is possible to utilize the high speed of the flash memory 540, and realize low costs in comparison to a RAID configured with only the flash memories 540.

Figure 19:
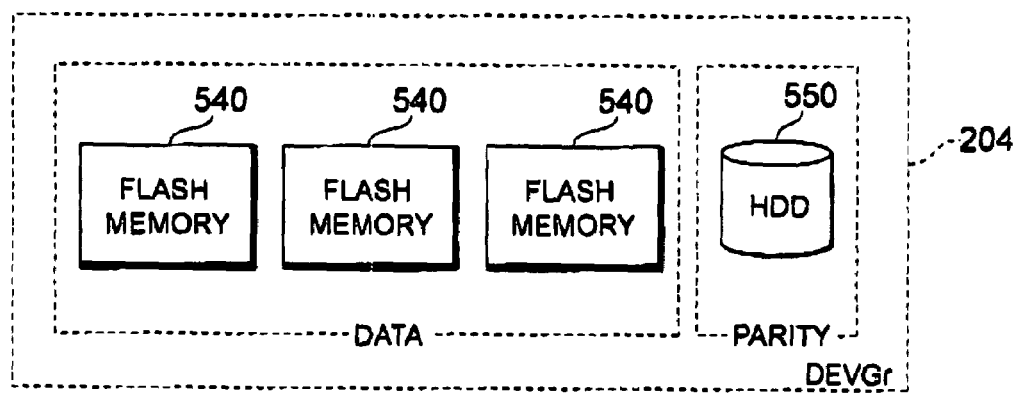
FIG. 19 is an explanatory diagram showing the DEVGr-EDEV/PDEV mapping relation.

In FIG. 19, a device group 204 having a RAID 4 configuration is configured from three flash memories 540 and one disk drive 550. The flash memory 540 stores data and the disk drive 550 stores parity data. In this kind of drive configuration, it is possible to extend the life span of the flash memory 540 by not using the flash memory 540, which as a write life, in a parity drive with numerous accesses.

Figure 20:
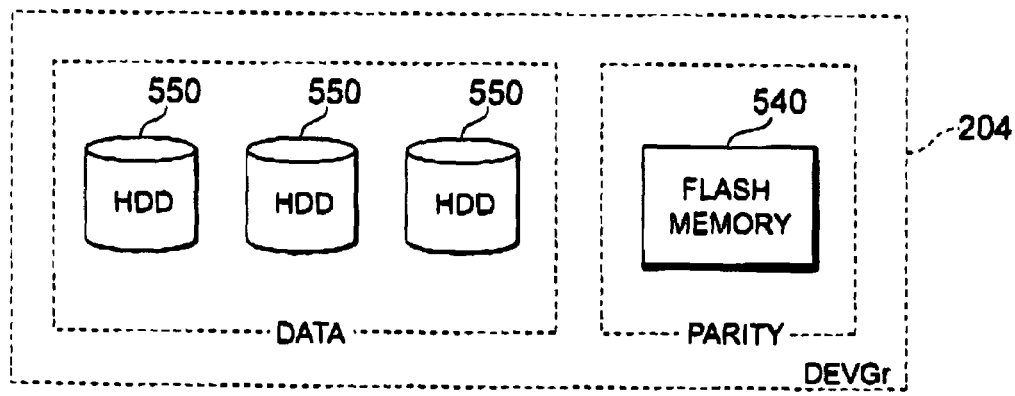
FIG. 20 is an explanatory diagram showing the DEVGr-EDEV/PDEV mapping relation.

In FIG. 20, a device group 204 having a RAID 4 configuration is configured from one flash memory 540 and three disk drives 550. The flash memory 540 stores data and the disk drive 550 stores parity data. In this kind of drive configuration, it is possible to improve the write performance by not using the flash memory 540 in a parity drive with numerous accesses.

(12) AOU

Figure 21:
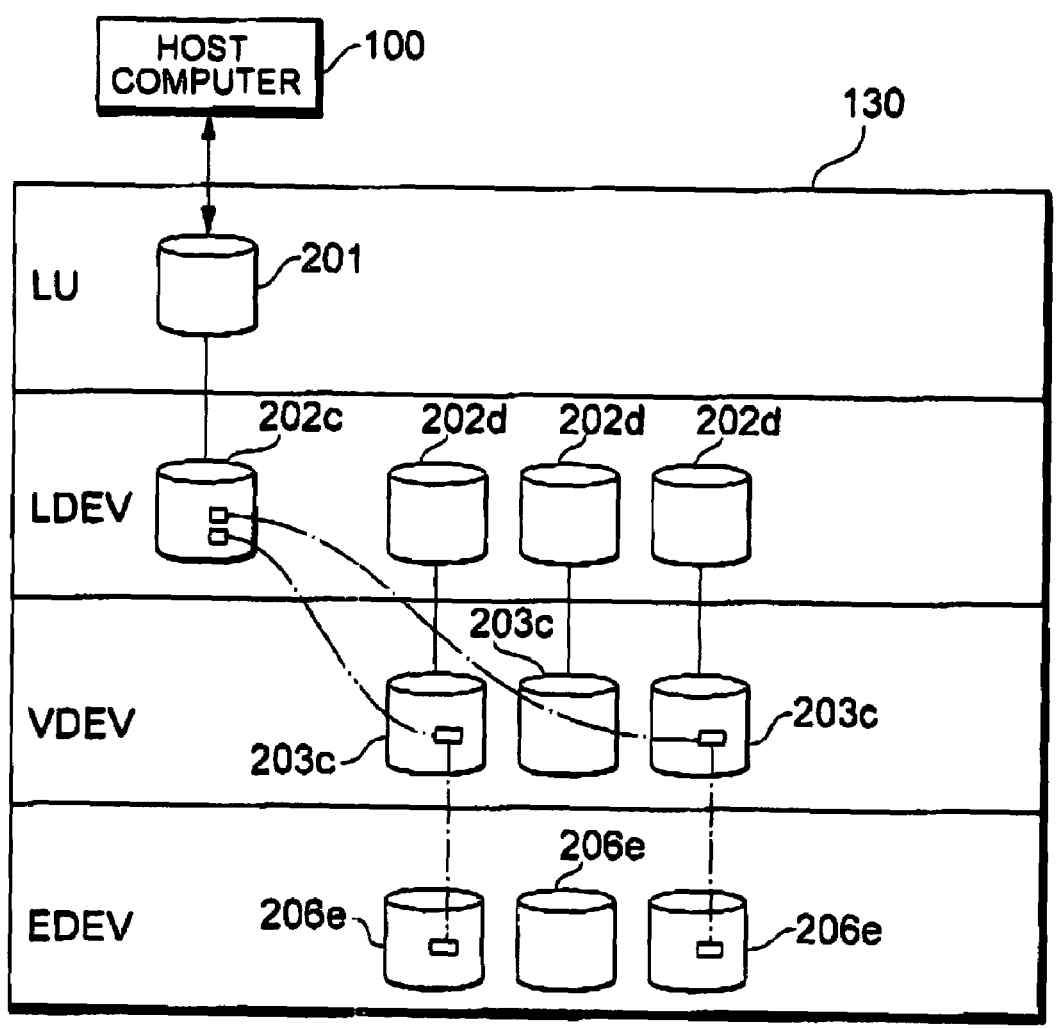
FIG. 21 is an explanatory diagram showing the AOU configuration.

FIG. 21 shows the mutual mapping relation referred to as AOU between the storage hierarchies in the storage system 130. The logical unit 201 belongs to the LU hierarchy. The AOU volume 202c and a plurality of pool volumes 202d belong to the LDEV hierarchy. A plurality of pool volumes 203c belong to the VDEV hierarchy. A plurality of expansion devices 206e belong to the PDEV/EDEV hierarchy. The AOU volume 202c is allocated to the logical unit 201 recognized by the host computer 100. A part of the respective storage extents of the plurality of pool volumes 203c is allocated to the AOU volume 202c. It is possible to dynamically allocate the storage extent of the pool volume 203c to the AOU volume 202c, and the capacity of the AOU volume 202c can be freely increased or decreased. The respective storage extents of the plurality of expansion devices 206e are allocated to the respective storage extents of the plurality of pool volumes 203c. Incidentally, the physical device may be disposed in substitute for the expansion device 206e in the PDEV/EDEV hierarchy.

(13) Snapshot

Figure 22:
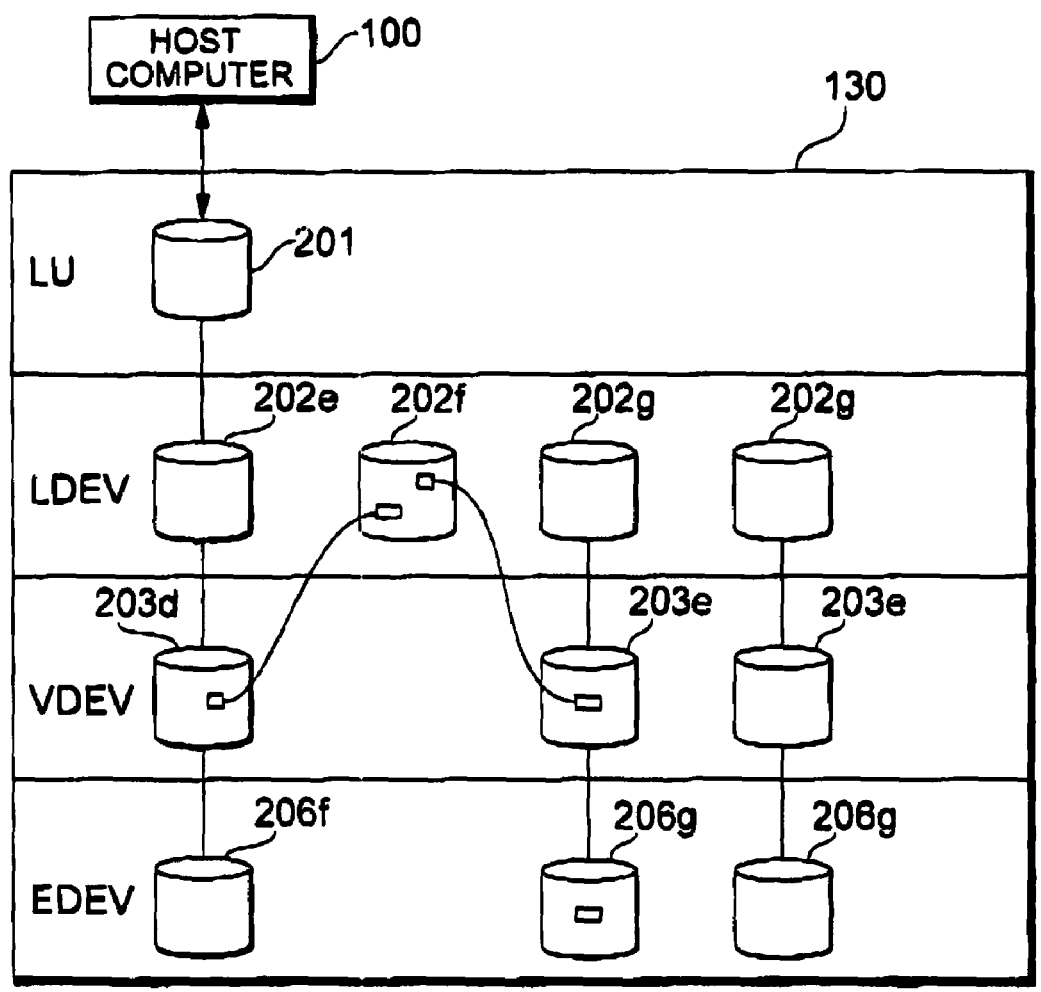
FIG. 22 is an explanatory diagram showing a storage hierarchy of the snapshot function.

FIG. 22 shows the mutual mapping relation between the storage hierarchies in the storage system 130 with a snapshot function. The logical unit 201 belongs to the LU hierarchy. The primary volume 202e, secondary volume 202f, and a plurality of pool volumes 202g belong to the LDEV hierarchy. The virtual device 203d, and a plurality of pool volume 203e belong to the VDEV hierarchy. The expansion devices 206f, 206g belong to the PDEV/EDEV hierarchy. The logical device 202e is allocated to the logical unit 201. The virtual device 203d is allocated to the logical device 202e. The expansion device 206f is allocated to the virtual device 203d. The secondary volume 202f is a virtual logical volume for restoring the data image of the primary volume 202e at a certain point in time from the data stored in the primary volume 202e at a certain point in time, and data saved from the primary volume 202e to the pool volume 203e after a certain point in time.

Figure 23:
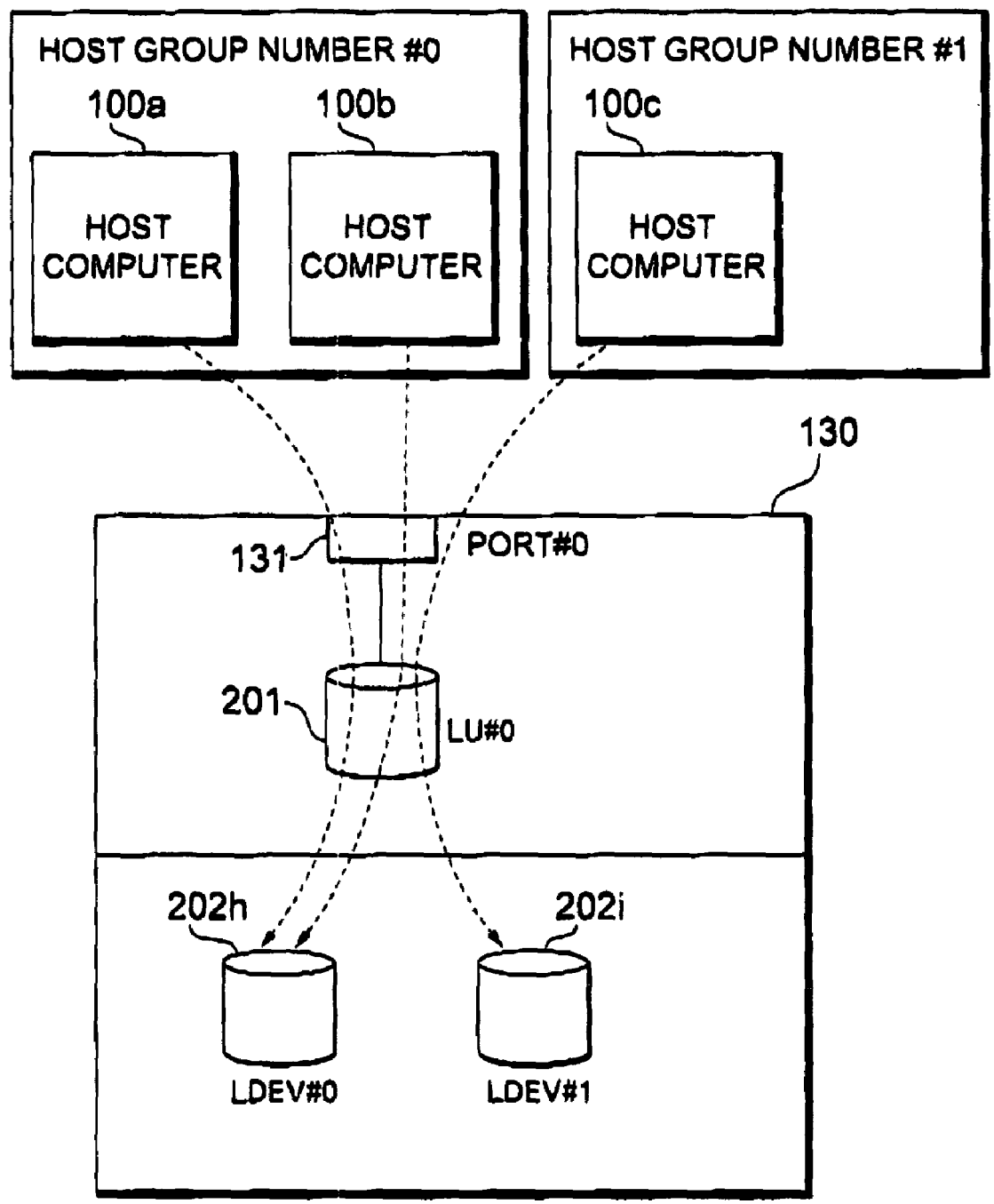
FIG. 23 is an explanatory diagram relating to a host group.

The host group is now explained with reference to FIG. 23. A plurality of host computers 100a, 100c belonging to the host group of host group number #0 can respectively access the logical device 202h of logical device number #0 by designating port number #0 as the number of the port 131, and designating LUN #0 as the number of the logical unit 201. Meanwhile, the host computer 100b belonging to the host group of host group number #1 can access the logical device 202i of logical device number #1 by designating port number #0 as the number of the port 131, and designating LUN #0 as the number of the logical unit 201. Like this, even if a certain host computer 100 designates the same port number and the same logical unit number, the accessible logical device 202 will differ depending on the host group number to which the host computer 100 belongs.

In the logical unit migration processing pertaining to this embodiment, when migrating a logical unit 201 available to one host computer 100 belonging to a certain host group to another storage system 130, the other host computer 100 belonging to that host group shall also execute the same logical unit migration processing.

Figure 24:
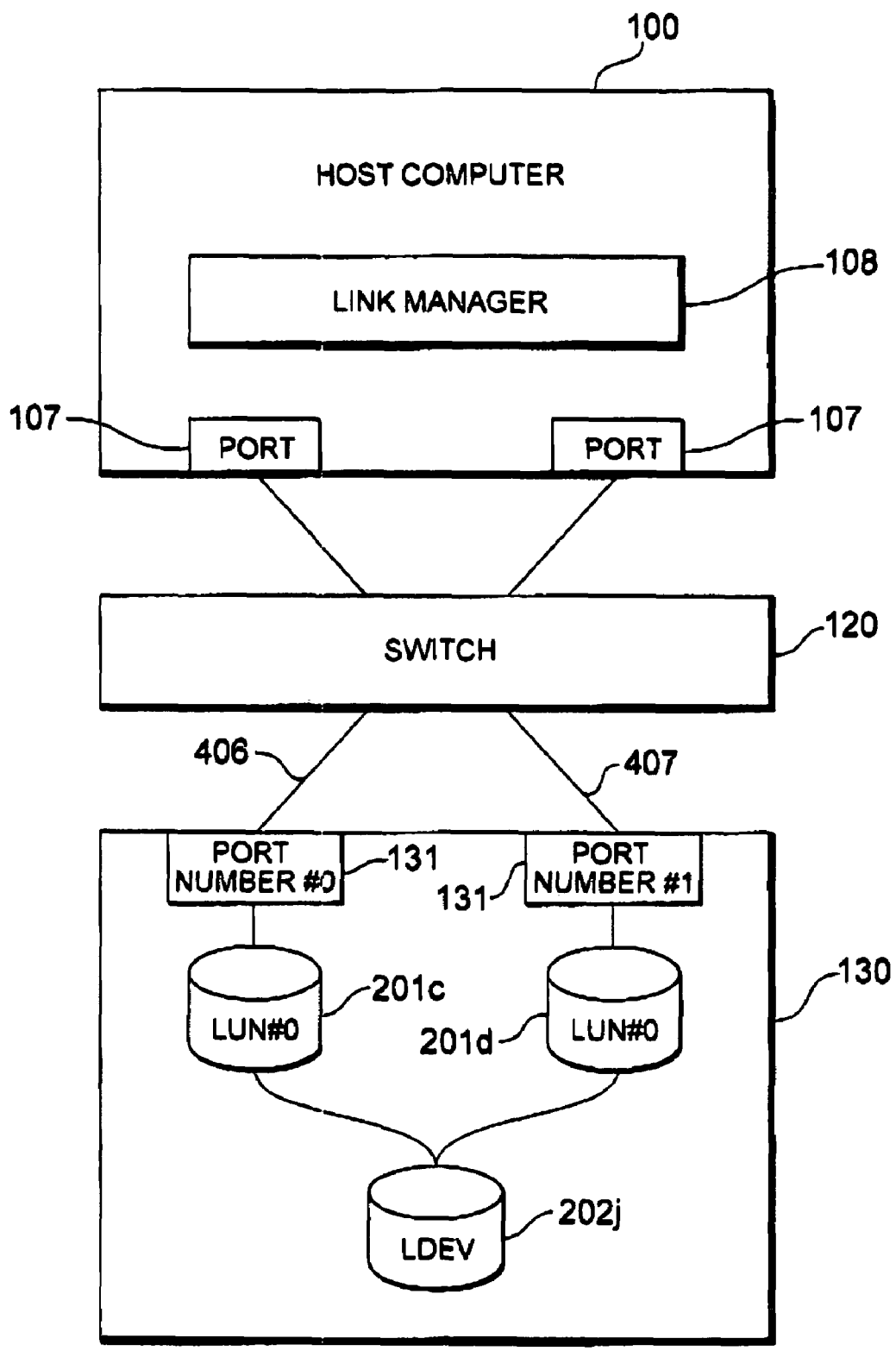
FIG. 24 is an explanatory diagram relating to an alternate path.

The alternate path is now explained with reference to FIG. 24 and FIG. 25. As shown in FIG. 24, when there are a plurality of paths 406, 407 for connection from the host computer 100 to the logical device 202j in the storage system 130 and one path 406 among the plurality of paths 406, 407 is set as a preferred path, the other path 407 is set as an alternate path. The alternate path is also referred to as a standby path. The host computer 100 is able to access the logical device 202j via the path 406 by designating port number #0 as the number of the port 131, and designating LUN #0 as the number of the logical unit 201c. Further, the host computer 100 is able to access the logical device 202j via the path 407 by designating port number #1 as the number of the port 131, and designating LUN #0 as the number of the logical unit 201d. The link manager 108 executes processing for selecting either the path 406 or path 407 as the path for accessing the logical device 202j. Since the logical units 201c, 201d are both virtualizations of the same logical device 202j, when migrating one logical unit (for example, logical unit 201c) to another storage system 130, it is necessary to migrate the other logical unit (for example, logical unit 201d) to another storage system 130.

Figure 25:
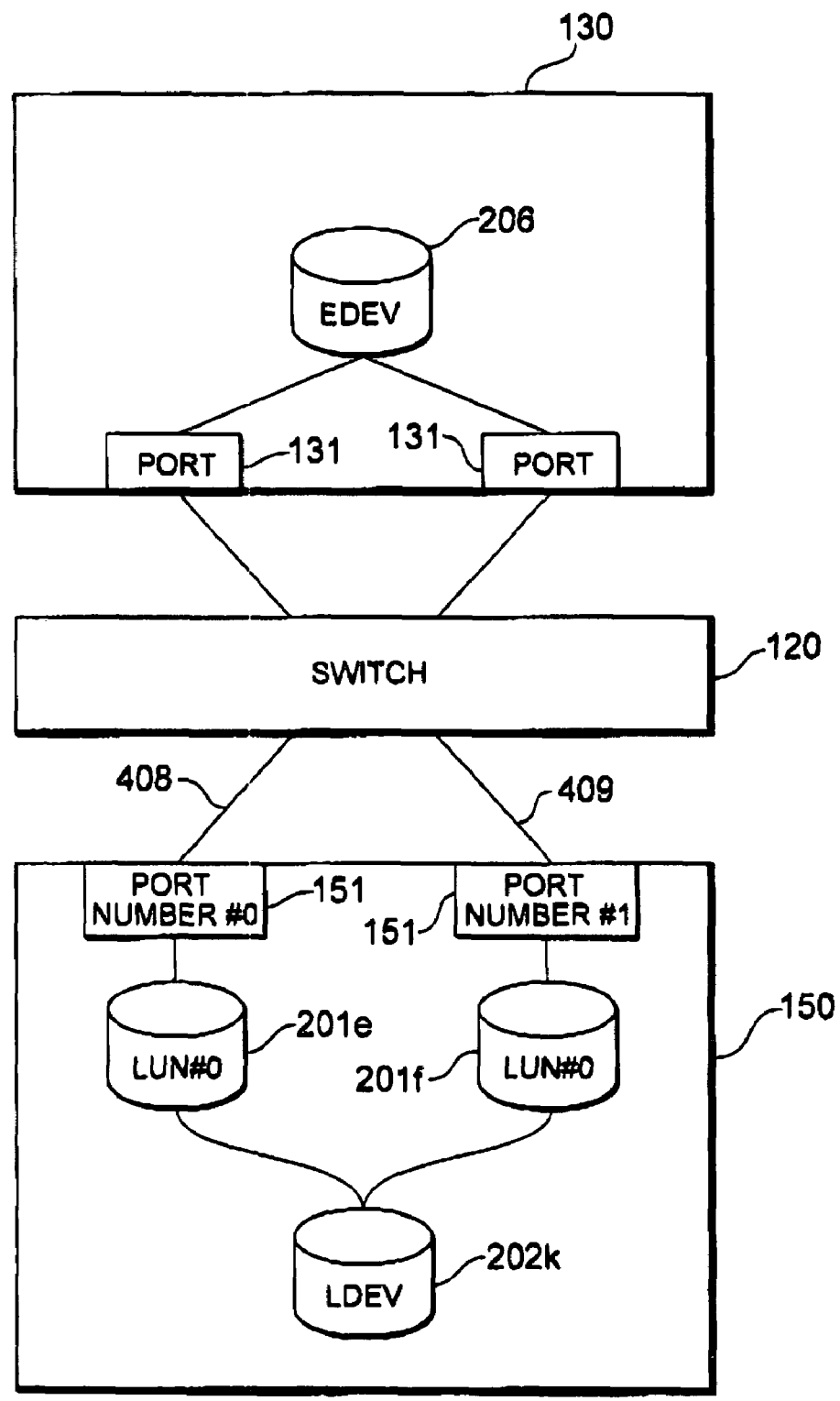
FIG. 25 is an explanatory diagram relating to an alternate path.

As shown in FIG. 25, when there are a plurality of paths 408, 409 for connection from the storage system 130 to the logical device 202k in the external storage system 150 and one path 408 among the plurality of paths 408, 409 is set as a preferred path, the other path 409 is set as an alternate path. The storage system 130 is able to access the logical device 202k via the path 408 by designating port number #0 as the number of the port 151, and designating LUN #0 as the number of the logical unit 201e. Further, the storage system 130 is able to access the logical device 202k via the path 409 by designating port number #1 as the number of the port 151, and designating LUN #0 as the number of the logical unit 201f. Since the logical units 201e, 201f are both virtualizations of the same logical device 202k, when migrating one logical unit (for example, logical unit 201e) to another storage system 130, it is necessary to migrate the other logical unit (for example, logical unit 201f) to another storage system 130.

The various types of information used in the logical unit migration processing are now explained with reference to FIG. 26 to FIG. 33.

Figure 26:
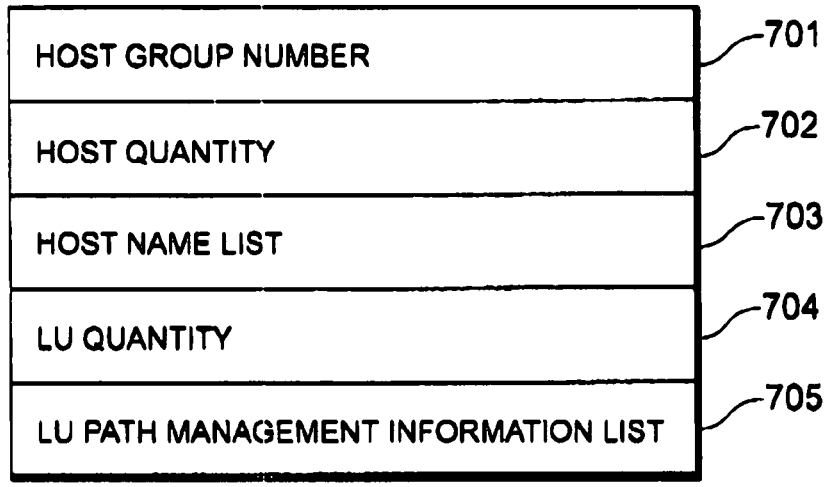
FIG. 26 is an explanatory diagram of host group management information.

FIG. 26 shows the host group management information 601. The host group management information 601 retains information concerning the host group. The host group management information 601 retains information from the entry 701 to the entry 705.

The entry 701 stores the host group number as the identifying information for identifying the host group in the computer system 500.

The entry 702 stores several host computers 100 belonging to the host group specified by the host group number.

The entry 703 stores a list of host names of all host computers 100 belonging to the host group specified by the host group number. As the host name, there is no particular limitation so as long as it is information capable of uniquely identifying the host computer 100, and, for instance, a WWN (World Wide Name) assigned to the port 107 may be used.

The entry 704 stores the number of logical units accessible from the host computer 100 belonging to the host group specified by the host group number.

The entry 705 stores a list of the LU path management information 602 described later.

Figure 27:
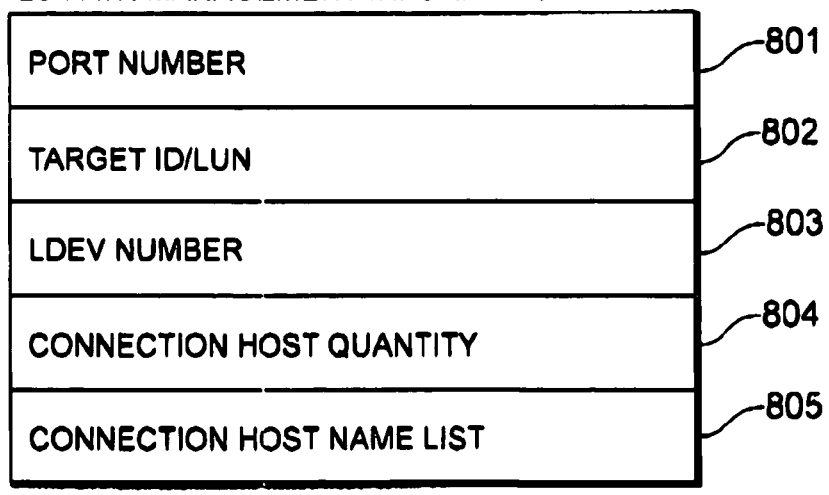
FIG. 27 is an explanatory diagram of LU path management information.

FIG. 27 shows the LU path management information 602. The LU path management information 602 retains information concerning the number of effective LUNs defined in each port 130 regarding the respective pots 131 in the storage system 130. The LU path management information 602 retains information from the entry 801 to the entry 805.

The entry 801 stores the port number for uniquely identifying the port 131 in the storage system 130.

The entry 802 stores information (for example, target ID or LUN) for identifying the logical unit 201. The target ID and LUN are identifiers for identifying the logical unit 201. For example, the SCSI-ID and LUN used in accessing the device on a SCSI protocol from the host computer 100 are used as identifiers for identifying the logical unit 201.

The entry 803 stores a number (LDEV number) of the logical device allocated with a LUN stored in the entry 802. A number of the representative logical device 202 among the plurality of logical devices 202 allocated to the logical unit 201 in a case where the logical unit 201 has a LUSE configuration is stored in the entry 803.

The entry 804 stores the number of host computers 100 accessible to the logical device specified by the LDEV number stored in the entry 803.

The entry 805 stores a list of host names of all host computers 100 accessible to the logical device specified by the LDEV number stored in the entry 803.

Figure 28:
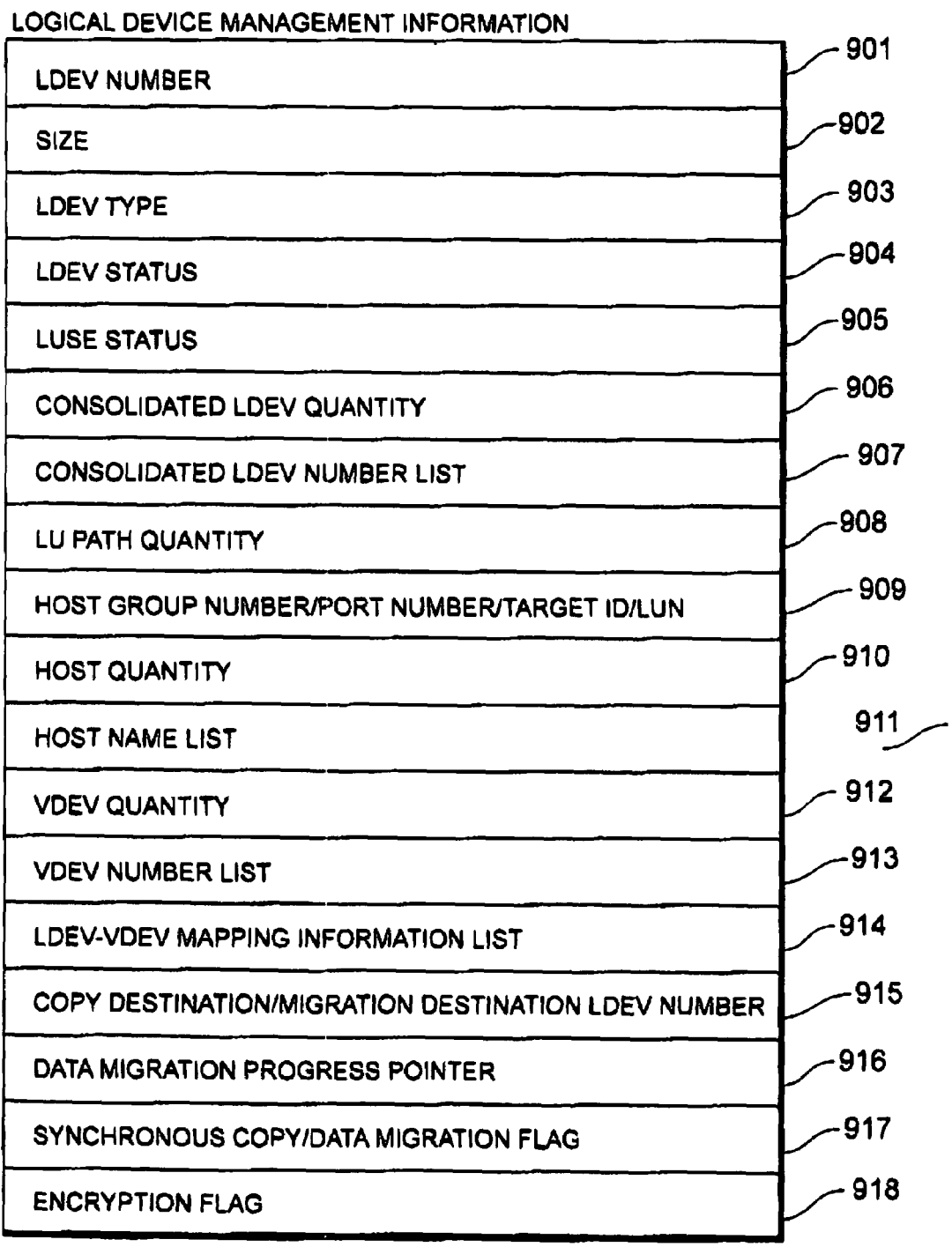
FIG. 28 is an explanatory diagram of logical device management information.

FIG. 28 shows the logical device management information 603. The logical 20 device management information 603 retains information from the entry 901 to the entry 918 concerning the respective logical devices 202.

The entry 901 stores the LDEV number for identifying the logical device 202.

The entry 902 stores the capacity (size) of the logical device 202 specified by the LDEV number.

The entry 903 stores the LDEV type of the logical device 202 specified by the LDEV number. The storage system 130 is able to define the logical device 202 of a plurality of device types having different data management units in the disk cache or different storage formats of device management information (existence or format of storing management information in the disk space). The LDEV type shows the device type of each logical device 202.

The entry 904 stores the LDEV status of the logical device 202 specified by the LDEV number. The LDEV status shows the device status of the logical device 202. The LDEV status includes "online", "offline", "unloaded", and "blocked". The "online" status shows that the logical device 202 is operating normally, an LU path is defined in one or more port 131s, and is accessible from the host computer 100. The "offline" status shows that the logical device 202 is defined and operating normally, but is not accessible from the host computer 100 due to reasons such as the LU path being undefined. The "unloaded" status shows that the logical device 202 is not accessible from the host computer 100 due to reasons such as a physical device or an external device not being allocated to the logical device 202. The "blocked" status shows that a failure occurred in the logical device 202 and is not accessible from the host computer 100. Although the initial value of the entry 603d is "unloaded", this is updated to "offline" with the logical device definition processing, and further updated to "online" with the LU path definition processing.

The entry 905 stores the LUSE status of the logical device 202 specified by the LDEV number. The LUSE status shows whether the logical unit 201 has a LUSE configuration, and the LDEV number of the representative logical device among the plurality of logical devices 202 allocated to the logical unit 201 in a case where the logical unit 201 has a LUSE configuration.

The entry 906 stores the number of consolidated LDEVs. The number of consolidated LDEVs shows the number of logical devices 202 allocated to the logical unit 201 in a case where the logical unit 201 has a LUSE configuration.

The entry 907 stores the consolidated LDEV number list. The consolidated LDEV number list shows a list of the LDEV numbers of the logical device 202 allocated to the logical unit 201 in a case where the logical unit 201 has a LUSE configuration.

The entry 908 stores the number of LU paths. The LU path is a path for connecting the host computer 100 to the logical unit 201. The LU path quantity shows the number of LU paths.

The entry 909 stores a number of the respective host groups, a port number for identifying the port 131 accessible from the host computer 100 belonging to the host group, and a list of information (target ID or LUN) of the logical unit 201 allocated to the port 131.

The entry 910 stores the number of host computers 100 belonging to the respective host groups.

The entry 911 stores a list of the host names of the host computers 100 in a case where access is permitted to one logical unit 201 by a plurality of host computers 100.

The entry 912 stores the number of virtual devices 203 allocated to the logical device 202 in a case where the logical device 202 has a VDEV consolidated configuration.

The entry 913 stores a list of the numbers (VDEV numbers) of the virtual device 203 in a case where the logical device 202 and the virtual device 203 do not correspond one-on-one.

The entry 914 stores information showing the mapping relation between the logical device 202 and the virtual device 203. For example, the entry 914 stores the offset position of the logical device 202 in the virtual device 203 in a case where the logical device 202 has a CVS configuration, and the offset position of the virtual device 203 in the logical device 202 in a case where the logical device 202 has a VDEV consolidated configuration.

The entry 915 stores the number of the logical device 202 of the copy destination or migration destination in a case where the logical device 202 is being subject to synchronous copy or migration. The entry 915 stores an invalid value when the logical device 202 is not being subject to synchronous copy or migration.

The entry 916 stores information showing the last address completing the data migration in a case where the logical device 202 is being subject to data migration (hereinafter referred to as a "data migration progress pointer"). The data migration progress pointer is used for determining whether the migration of the storage extent of the access destination is complete or incomplete upon the storage system 130 receiving an I/O request to the logical device 202 from the host computer 100, and selecting the processing.

The entry 917 stores information showing whether the logical device 202 is being subject to synchronous copy, data migration or neither processes (hereinafter referred to as a "synchronous copy/data migration flag").

The entry 918 stores an encryption flag. An encryption flag is flag information showing whether to encrypt data written in the physical device 205 or the expansion device 206. When the encryption flag is set up as ON, the storage system 130 encrypts the data to be written in the physical device 205 or the expansion device 206.

Figure 29:
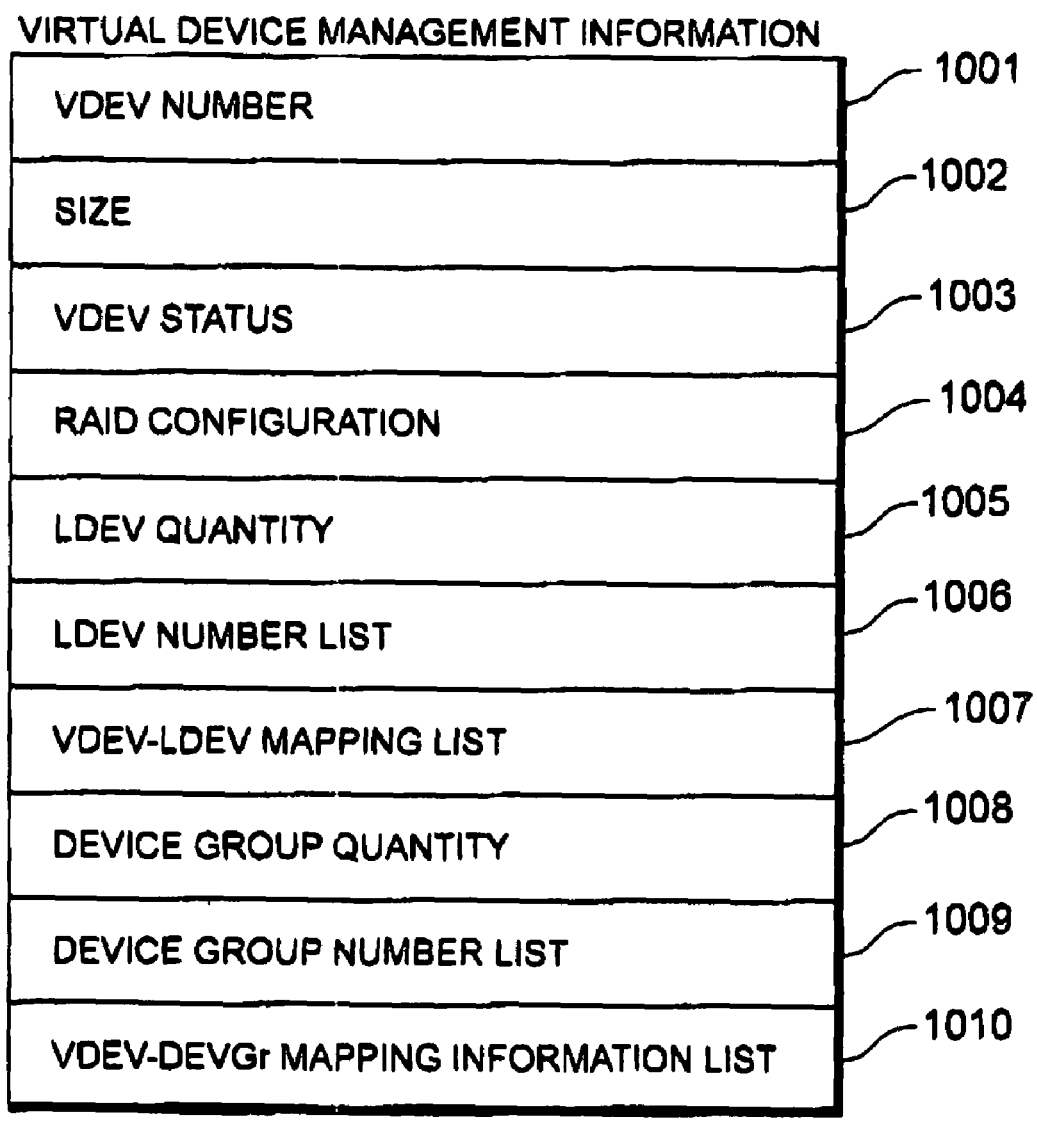
FIG. 29 is an explanatory diagram of virtual device management information.

FIG. 29 shows the virtual device management information 604. The virtual device management information 604 retains information from the entry 1001 to the entry 1010 concerning the respective virtual devices 203.

The entry 1001 stores the VDEV number for identifying the virtual device 203.

The entry 1002 stores the capacity (size) of the virtual device 203 specified by the VDEV number.

The entry 1003 stores the VDEV status of the virtual device 203 specified by the VDEV number. The VDEV status shows the device status of the virtual device 203. The VDEV status includes "online", "offline", "unloaded", and "blocked". The LDEV status includes "online", "offline", "unloaded", and "blocked". The "online" status shows that the virtual device 203 is operating normally, and a path is defined from the host computer 100 to the virtual device 203. The "offline" status shows that the virtual device 203 is defined and operating normally, but is not accessible from the host computer 100 due to reasons such as the path to the virtual device 203 being undefined. The "unloaded" status shows that the virtual device 203 is not accessible from the host computer 100 due to reasons such as a physical device or an external device not being allocated to the virtual device 203. The "blocked" status shows that a failure occurred in the virtual device 203 and is not accessible from the host computer 100. Although the initial value of the entry 1003 is "unloaded", this is updated to "offline" with the virtual device definition processing, and further updated to "online" with the path definition processing.

The entry 1004 stores the RAID configuration of the virtual device 203 specified by the VDEV number. The RAID configuration, for instance, includes the RAID level, data parity quantity, drive configuration, stripe size and so on.

The entry 1005 stores the number of logical devices 202 allocated from one virtual device 203 in a case where the logical device 202 has a CVS configuration.

The entry 1006 stores a list of numbers of the logical devices 202 allocated with the virtual device 203 specified by the VDEV number.

The entry 1007 stores a list of information showing the mapping relation between the logical device 202 and the virtual device 203. For example, the entry 1007 stores the offset position of the logical device 202 in the virtual device 203 in a case where the logical device 202 has a CVS configuration, and the offset position of the virtual device 203 in the logical device 202 in a case where the logical device 202 has a VDEV consolidated configuration.

The entry 1008 stores the number of device groups 204 allocated to the virtual device 203. For instance, the entry 1008 stores the number of device groups 204 allocated to the virtual device 203 in a case where the virtual device 203 has a VDEV discrete configuration. Further, for example, the entry 1008 is used for allocating a plurality of device groups 204 to one virtual device 203 during the logical unit migration processing.

The entry 1009 stores a list of numbers of the device group 204 allocated to the virtual device 203.

The entry 1010 stores a list of information showing the mapping relation between the virtual device 203 and the device group 204.

Figure 30:
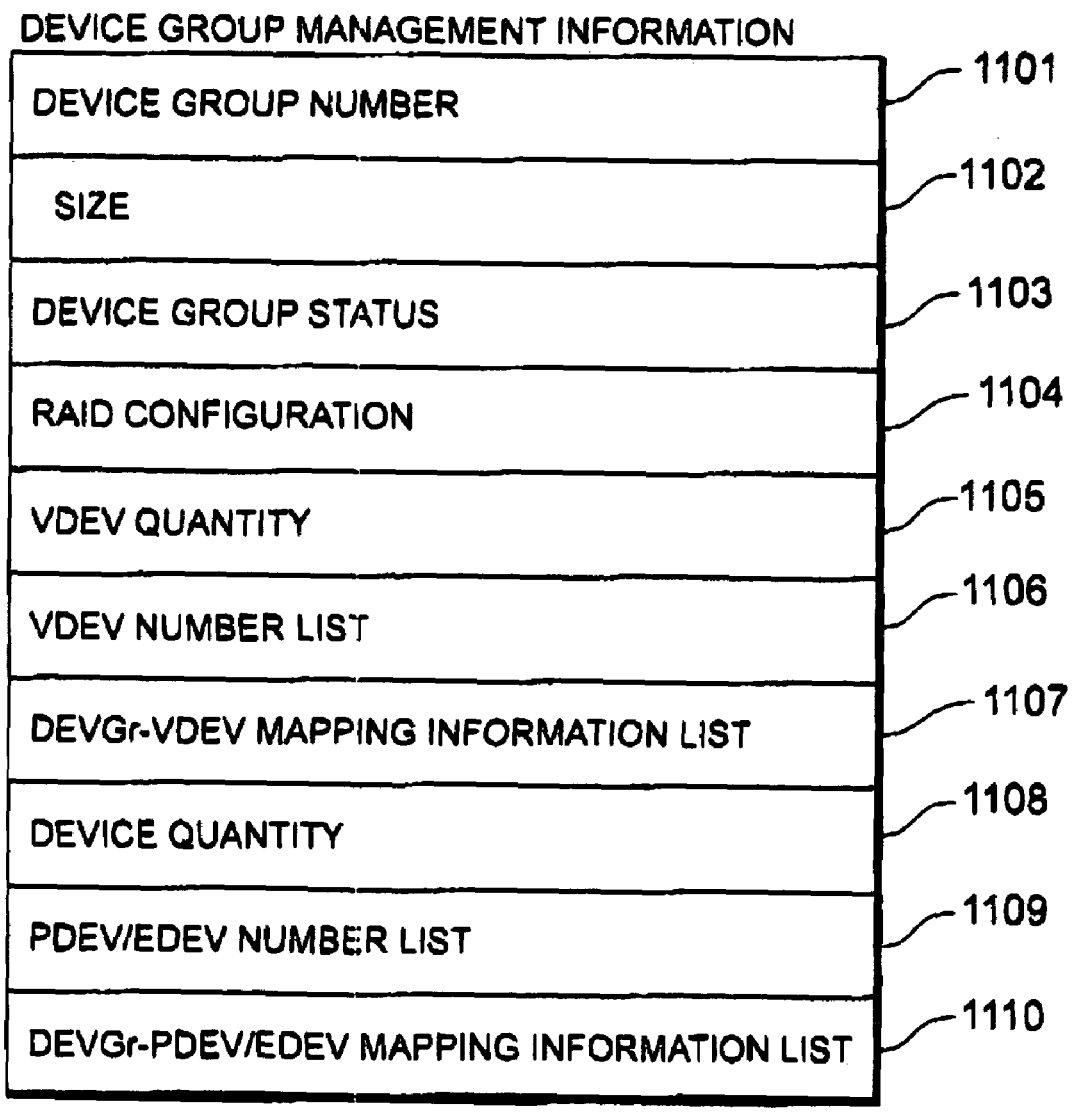
FIG. 30 is an explanatory diagram of device group management information.

FIG. 30 shows the device group management information 605. The device group management information 605 retains information from the entry 1101 to the entry 1110 concerning the respective device groups 204.

The entry 1101 stores the device group number for identifying the device group 204.

The entry 1102 stores the capacity (size) of the device group 204 specified by the device group number.

The entry 1103 stores the DEVGr status of the device group 204 specified by the device group number. The DEVGr status shows the device status of the device group 204. DEVGr status includes "online", "offline", "unloaded", and "blocked". The LDEV status includes "online", "offline", "unloaded", and "blocked". The "online" status shows that the device group 204 is operating normally, and a path is defined from the host computer 100 to the device group 204. The "offline" status shows that the device group 204 is defined and operating normally, but is not accessible from the host computer 100 due to reasons such as the path to the device group 204 being undefined. The "unloaded" status shows that the device group 204 is not accessible from the host computer 100 due to reasons such as a physical device or an external device not being allocated to the device group 204. The "blocked" status shows that a failure occurred in the device group 204 and is not accessible from the host computer 100. Although the initial value of the entry 1103 is "unloaded", this is updated to "offline" with the device group definition processing, and further updated to "online" with the path definition processing.

The entry 1104 stores the RAID configuration of the device group 204 specified by the device group number. The RAID configuration, for instance, includes the RAID level, data parity quantity, drive configuration, stripe size and so on. Nevertheless, when allocating one expansion device 206 to one device group 204 such as during the logical unit migration processing, the RAID configuration is applied to the device group 204.

The entry 1105 stores the number of virtual devices 203 allocated to the device group 204. When migrating a logical unit 201 having a LUSE configuration, since there are cases where a plurality of virtual devices 203 are allocated to one device group 204, the value of the entry 1105 is updated in such a case.

The entry 1106 stores a list of numbers of the virtual devices 203 allocated to the device group 204 specified by the device group number.

The entry 1107 stores a list of information showing the mapping relation between the device group 204 and the virtual device 203.

The entry 1108 stores the number of devices (physical devices 205 or expansion devices 206) allocated to the device group 204.

The entry 1109 stores a list of numbers of devices (physical devices 205 or expansion devices 206) allocated to the device group 204.

The entry 1110 stores a list of information showing the mapping relation between the device group 204 and the device (physical device 205 or expansion device 206). For example, the entry 1110 stores the address and capacity from the top of the expansion device 206 in a case as shown in FIG. 13 to FIG. 15 where only a part of the expansion device 206 is allocated to the device group 204.

Figure 31:
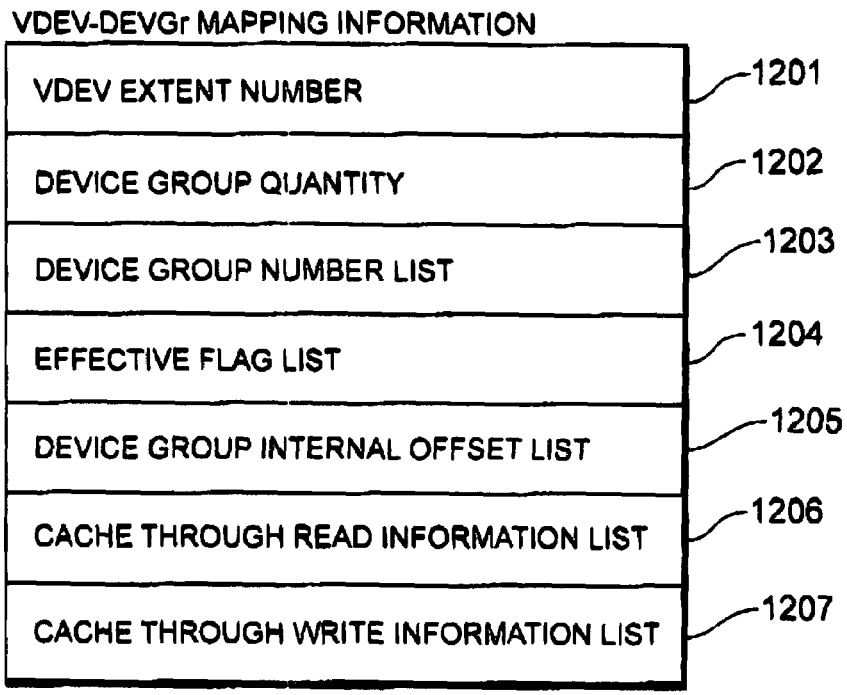
FIG. 31 is an explanatory diagram of VDEV-DEVGr mapping information.

FIG. 31 shows the VDEV-DEVGr mapping information 606. The VDEV-DEVGr mapping information 606 retains information from the entry 1201 to the entry 1207.

The entry 1201 stores the number for identifying the VDEV extent. A VDEV extent is a partial extent of the virtual device 203.

The entry 1202 stores the number of device groups 204 associated with the VDEV extent.

The entry 1203 stores a list of numbers of the device groups 204 associated with the VDEV extent.

The entry 1204 stores a list of effective flags. An effective flag is flag information showing whether to execute processing such as mirroring or parity creation to the virtual device 203 allocated to the logical unit 201. The effective flag is set up as OFF during the logical unit migration processing, and processing such as mirroring or parity creation is not performed to the virtual device 203 allocated to the logical unit 201 of the migration source.

The entry 1205 stores a list of offset addresses of the VDEV extents associated with the device group 204.

The entry 1206 stores a list of information showing whether to operate the respective VDEV extents in the operation mode of cache through read.

The entry 1207 stores a list of information showing whether to operate the respective VDEV extents in the operation mode of cache through write.

Figure 32:
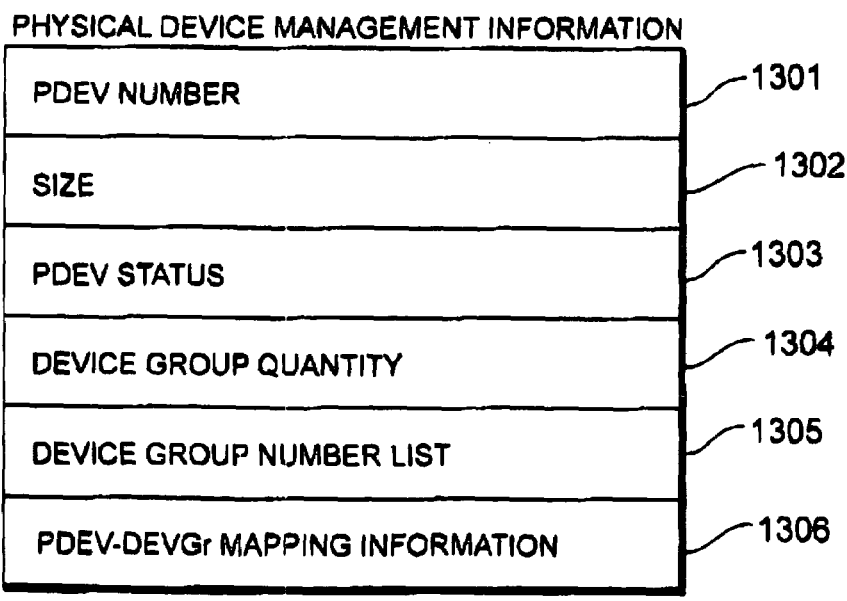
FIG. 32 is an explanatory diagram of physical device management information.

FIG. 32 shows the physical device management information 607. The physical device management information 607 retains information from the entry 1301 to the entry 1306 concerning the respective physical devices 205 defined in the storage system 130.

The entry 1301 stores the physical device number for identifying the physical device 205.

The entry 1302 stores the capacity (size) of the physical device 205 specified by the physical device number.

The entry 1303 stores the device status of the physical device 205 specified by the physical device number. The device status includes "online", "offline", "unloaded", and "blocked". The "online" status shows that the physical device 205 is operating normally, and the physical device 205 is allocated to the logical device 202. The "offline" status shows that the physical device 205 is defined and operating normally, but the physical device 205 is not allocated to the logical device 202. The "unloaded" status shows that the physical device 205 is not defined in the disk device 137. The "blocked" status shows that a failure occurred in the physical device 205 and is not accessible. Although the initial value of the entry 1303 is "unloaded", this is updated to "offline" with the physical device definition processing, and further updated to "online" when the physical device 205 is defined in the logical device 202.

The entry 1304 stores the number of device groups 204 allocated to one physical device 205 in a case where the storage extent of one physical device 205 is partially allocated to a plurality of device groups 204 (refer to FIG. 15).

The entry 1305 stores a list of numbers of the device groups 204 allocated to the physical device 205.

The entry 1306 stores information showing the mapping relation between the physical device 205 and the device group 204.

Figure 33:
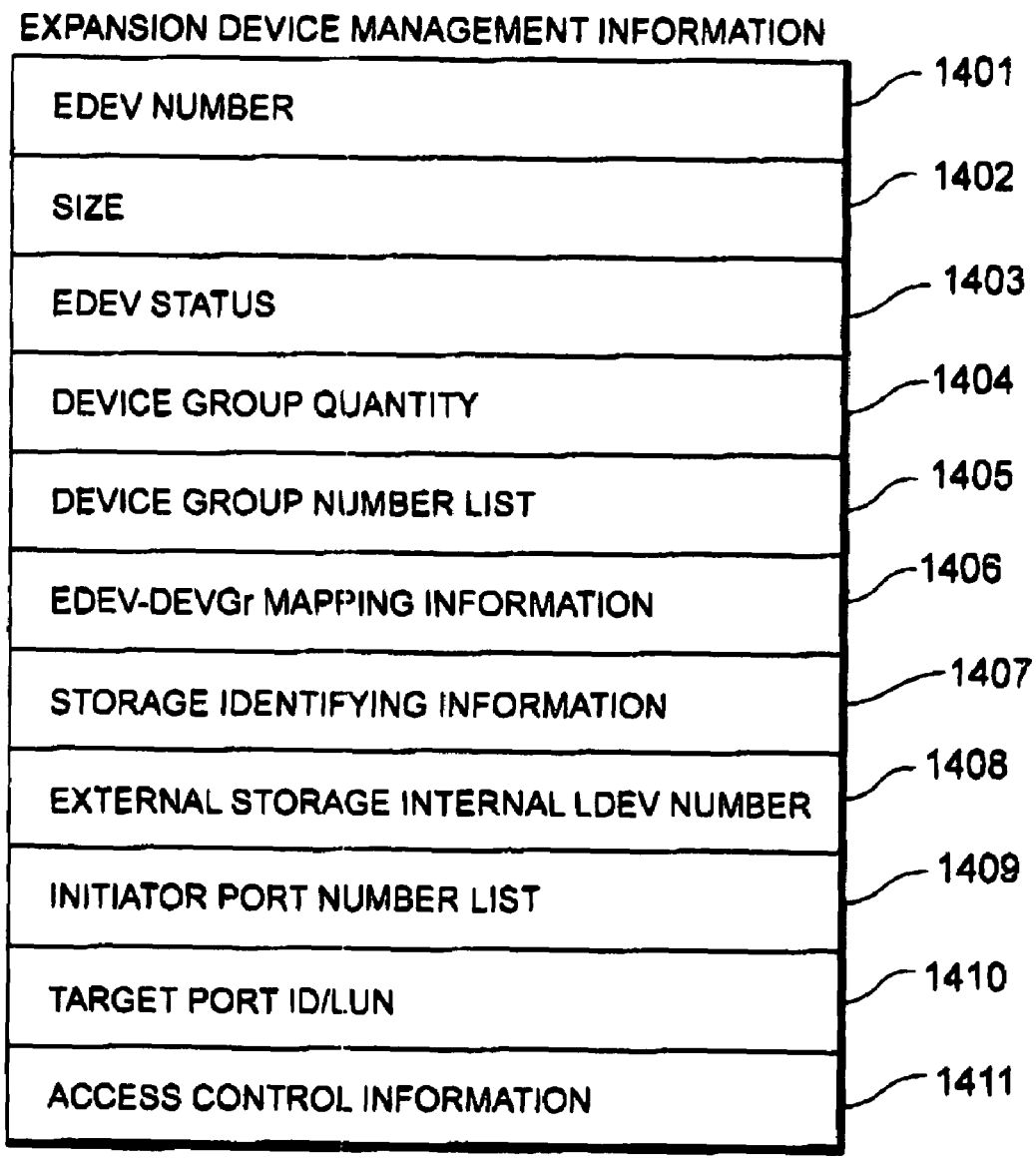
FIG. 33 is an explanatory diagram of expansion device management information.

FIG. 33 shows the expansion device management information 608. The expansion device management information 608 is for virtualizing the external volume 301 of the external storage system 150 as an expansion device 206 (internal volume) in the storage system 130. The expansion device management information 608 retains information from the entry 1401 to the entry 1411 concerning the respective external volumes 301.

The entry 1401 stores an EDEV number for identifying the expansion device 206. An EDEV number is an identification number for uniquely identifying the external volume 301 in the storage system 130.

The entry 1402 stores the capacity (size) of the expansion device 206 specified by the EDEV number.

The entry 1403 stores the device status of the expansion device 206 specified by the EDEV number. The device status includes "online", "offline", "unloaded", and "blocked". The "online" status shows that the expansion device 206 is operating normally, and the expansion device 206 is allocated to the logical device 202. The "offline" status shows that the expansion device 206 is defined and operating normally, but the expansion device 206 is not allocated to the logical device 202. The "unloaded" status shows that the expansion device 206 is not defined. The "blocked" status shows that a failure occurred in the expansion device 206 and is not accessible.

Although the initial value of the entry 1403 is "unloaded", this is updated to "offline" with the expansion device definition processing, and further updated to "online" when the expansion device 206 is defined in the logical device 202.

The entry 1404 stores the number of device groups 204 allocated to one expansion device 206 in a case where the storage extent of one expansion device 206 is partially allocated to a plurality of device groups 204 (refer to FIG. 15).

The entry 1405 stores a list of numbers of the device groups 204 allocated to the expansion device 206.

The entry 1406 stores information showing the mapping relation between the expansion device 206 and the device group 204.

The entry 1407 stores storage identifying information for identifying the external storage system 150 to virtualize the expansion device 206. As the storage identifying information, for example, a combination of vendor identifying information for identifying the vendor that is manufacturing and selling the external storage system 150 and the serial number for uniquely allocating the respective vendors may be considered.

The entry 1408 stores an LDEV number of the external volume 301 managed by the external storage system 150.

The entry 1409 stores a port number for identifying the initiator port for connecting to the external storage system 150 among a plurality of ports 131 in the storage system 130.

The entry 1410 stores a list of port IDs for identifying the ports 151 and the target IDs and LUNs for identifying the external volume 301 in a case where the external volume 301 is defined in one or more ports 151 in the external storage system 150.

The entry 1411 stores access control information. The access control information is information for managing which storage system 130 has an access right for the respective extents of the external volume 301 in a case where the external volume 301 is shared by a plurality of storage systems 130.

Figure 34:
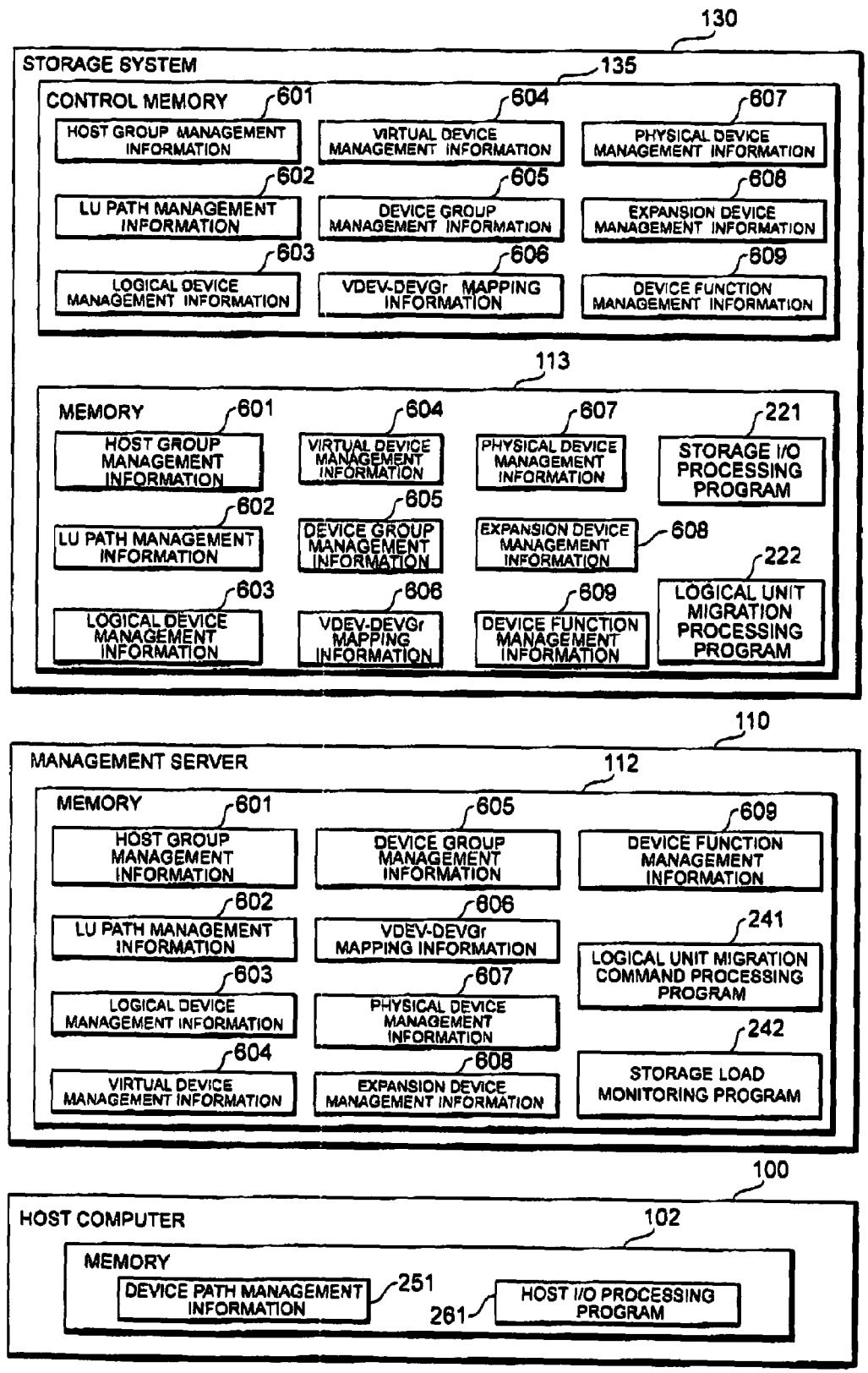
FIG. 34 is a software configuration of a computer system.

FIG. 34 shows the software configuration of the computer system 500. The control memory 135 in the storage system 130 stores various types of configuration management information (host group management information 601, LU path management information 602, logical device management information 603, virtual device management information 604, device group management information 605, VDEV-DEVGr mapping information 606, physical device management information 607, expansion device management information 608, and device function management information 609).

The device function management information 609 retains information showing the various attributes set in the respective logical devices 202. As examples of attribute information of the logical device 202, there are access control information for limiting the access to the logical device 202 to a specified host computer 100, access attribute information for inhibiting the read access or write access to the logical device 202, and encryption information such as key information used in determining the encryption of data to be stored in the logical device 202 and decryption of such data.

The memory 133 in the storage system 130,stores the various types of configuration management information described above, as well as a storage I/O processing program 221 and a logical unit migration processing program 222. Details of the storage I/O processing to be executed by the storage I/O processing program 221 and details of the logical unit migration processing program 222 to be executed by the logical unit migration processing program 222 will be described later.

The memory 112 in the management server 110 stores the various types of configuration management information described above, as well as a logical unit migration command processing program 241 and a storage load monitoring program 242. Details of the LU migration command processing to be executed by the logical unit migration command processing program 241 and details of the processing to be executed by the storage load monitoring program 242 will be described later.

The memory 102 in the host computer 100 stores device path management information 251 and a host I/O processing program 261. The host computer 100 confirms the logical device provided by the storage system 130 or the external storage system 150, and manages the logical device by associating it with a device file. The device path management information 251 contains information showing the relation between the logical device and the device file. For example, when the same logical device is allocated to a plurality of ports 131 of the storage system 130, a plurality of device files are created from the same logical device. The host computer 100 consolidates the plurality of device files associated with the same logical device, and balances the I/O load to the logical device or controls the path switching during a network failure.

Incidentally, in a case when the configuration of the storage system 130 is changed or the configuration of the respective components in the storage system 130 is changed due to a failure or automatic replacement upon receiving a command from the management server 110 or the management terminal 140 based on the storage management software or the storage administrator, one control processor 132 in the storage system 130 updates the configuration management information in the control memory 135. Further, the control processor 132 notifies another control processor 132, management terminal 140, and management server 110 to the effect that the configuration management information has been updated as a result of the configuration of the storage system 130 being changed, and updates the all configuration management information stored in the other control memories 135 to the latest information.

Figure 35:
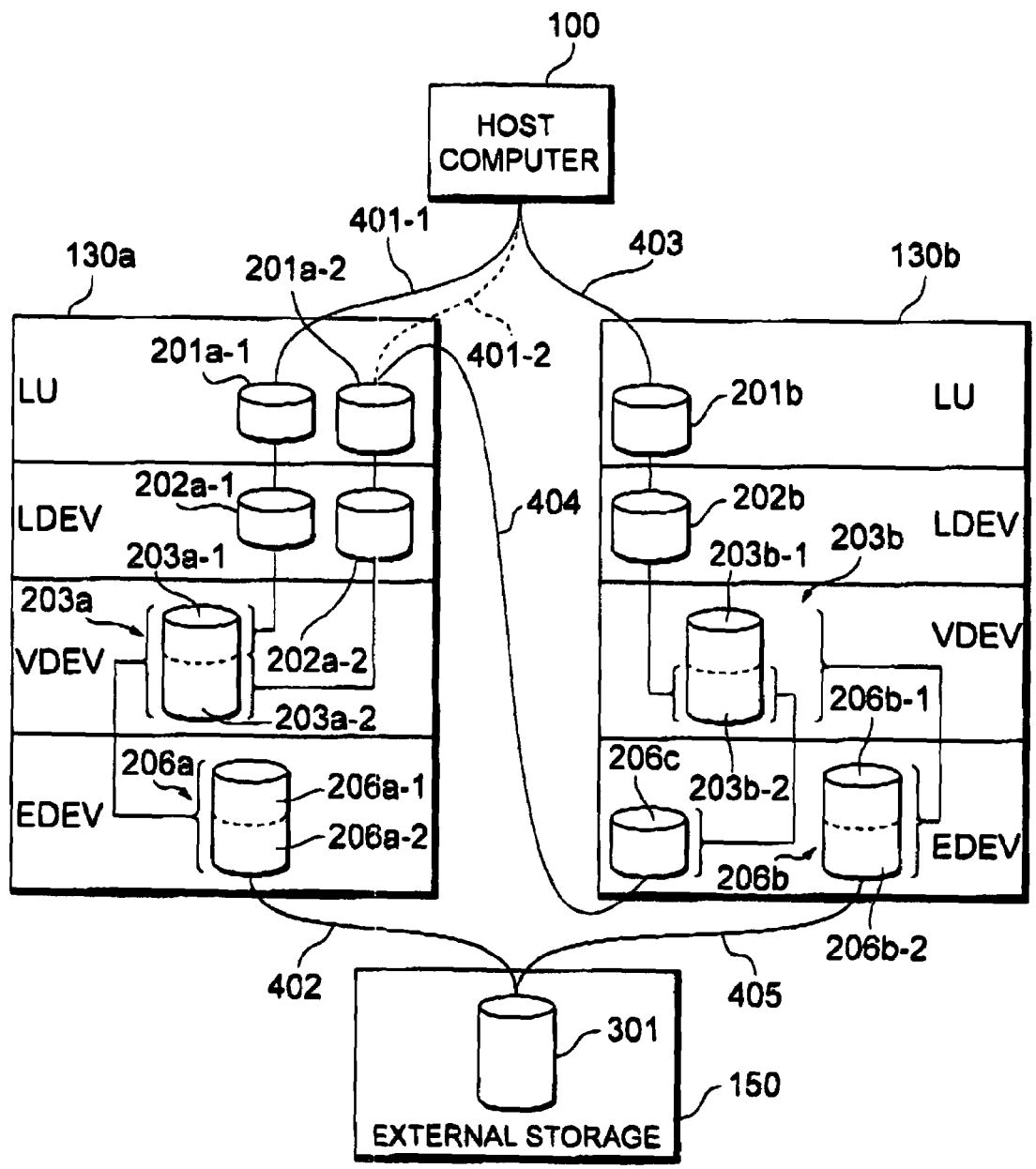
FIG. 35 is an explanatory diagram showing the outline of processing for migrating a logical unit having a CVS configuration.

Outline of the migration processing of a logical unit having a CVS configuration is now explained with reference to FIG. 35.

The storage system 130a includes logical units 201a-1, 201a-2, logical devices 202a-1, 202a-2, a virtual device 203a, and an expansion device 206a. The logical unit 201a-1 is connected to the host computer 100 via the path 401-1. The logical unit 201a-2 is connected to the host computer 100 via the path 401-2. The virtual device 203a is partitioned into a plurality of storage extents 203a-1, 203a-2. One storage extent 203a-1 is mapped to the logical unit 202a-1 via the logical device 202a-1, and the other storage extent 203a-1 is mapped to the logical unit 202a-1 via the logical device 202a-1. The respective logical units 201a-1, 201a-2 are partial virtualizations of the virtual device 203a, and have a CVS configuration.

The expansion device 206a is a virtualization of the external volume 301, and is partitioned into a plurality of storage extents 206a-1, 206a-2. One storage extent 206a-1 is mapped to the storage extent 203a-1, and the other storage extent 206a-2 is mapped to the storage extent 203a-2.

The outline of processing for migrating data of the logical unit 201a-2 (migration source logical unit) in the storage system 130a (migration source logical storage) to the logical unit 201b (migration destination logical unit) in the storage system 130b (migration destination storage) is now explained.

The logical unit migration processing includes the following processing routine of (1) to (9).

(1) The storage system 130b defines a path 405 for externally connecting the external volume 301 and the storage system 130b, and creates an expansion device 206b for virtualizing the external volume 301 in the storage system 130b. The expansion device 206b is partitioned into a plurality of storage extents 206b-1, 206b-2. The storage capacity of the expansion device 206b is equivalent to the storage capacity of the external volume 301. The storage capacity of the storage extent 206b-2 is equivalent to the storage capacity of the logical unit 201a-2.

(2) The storage system 130b creates a virtual device 203b having a storage capacity that is the same as the storage capacity of the external volume 301 in the storage system 130b. The virtual device 203b is partitioned into a plurality of storage extents 203b-1, 203b-2. The storage capacity of the storage extent 203b-2 is equivalent to the storage capacity of the logical unit 201a-2.

(3) The storage system 130b defines a path 404 for externally connecting the logical unit 201a-2 and the storage system 130b, and creates an expansion device 206c for virtualizing the logical unit 201a-2 in the storage system 130b.

(4) The storage system 130b maps the expansion device 206c to the virtual device 203b (more specifically, to the storage extent 203b-2).

(5) The storage system 130b creates a logical device 202b having a logical configuration that is the same as the logical configuration of the logical device 202a-2 in the storage system 130b. The virtual device 203b (more specifically, the storage extent 203b-2) is mapped to the logical device 202b.

(6) The storage system 130b creates a logical unit 201b having a logical configuration that is the same as the logical configuration of the logical unit 201a-2 in the storage system 130b, and defines, a path 403 for connecting the host computer 100 and the logical unit 201b. The virtual device 202b is mapped to the logical unit 201b.

(7) The host computer 100 switches the path 401-2 to the path 403 as a path for accessing the external volume 301. Here, access from the host computer 100 to the logical unit 201a-2 is inhibited such as by deleting the path 401-2. Incidentally, path switching from the path 401-2 to the path 403 may also be conducted by the storage systems 130a, 130b, or the management server 110. Further, it is not necessarily the case that the path 401-2 needs to be deleted, and, for instance, the path 401-2 may be set as an alternate path (for instance, a path to be used during system failure) of the path 403, and the path 401-2 may be left as is with the path 401-2 in an invalid state.

As a result of the foregoing processing, not only is the logical unit 201b a virtualization of the logical unit 201a-2, it is also a partial virtualization of the external volume 301. Thus, the data I/O path from the host computer 100 to the logical unit 201a-2 during the logical unit migration processing will be path 403→storage hierarchy (LU/LDEV/DEV/EDEV) in the storage system 130b→path 404→storage hierarchy (LU/LDEV/VDEV/EDEV) in the storage system 130a→path 402→external volume 301.

(8) The storage system 130a sets the operation mode of the storage system 130a for destaging to the external volume 301 all dirty data accumulated in the disk cache of the storage system 130a to a cache through mode. Incidentally, the storage system 130a may autonomously set the operation mode to a cache through mode, or set the operation mode to a cache through mode based on an external command (for instance, from the storage system 130b, the host computer 100, or the management server 110).

(9) After destaging all dirty data accumulated in the disk cache of the storage system 130a to the external volume 301, the storage system 130b releases the mapping relation between the expansion device 206c and the virtual device 203b, and maps the expansion device 206b to the virtual device 203b. In addition, the storage system 130b deletes the path 404.

Incidentally, since a part of the external volume 301 will be shared by a plurality of storage systems 130a, 130b in the migration processing of a logical unit having a CVS configuration, it is necessary to exclusively control the external volume 301. The exclusive control of the external volume 301 may be executed by the external storage system 150, or a plurality of storage systems 130a, 130b may coordinate and execute such exclusive control.

Figure 36:
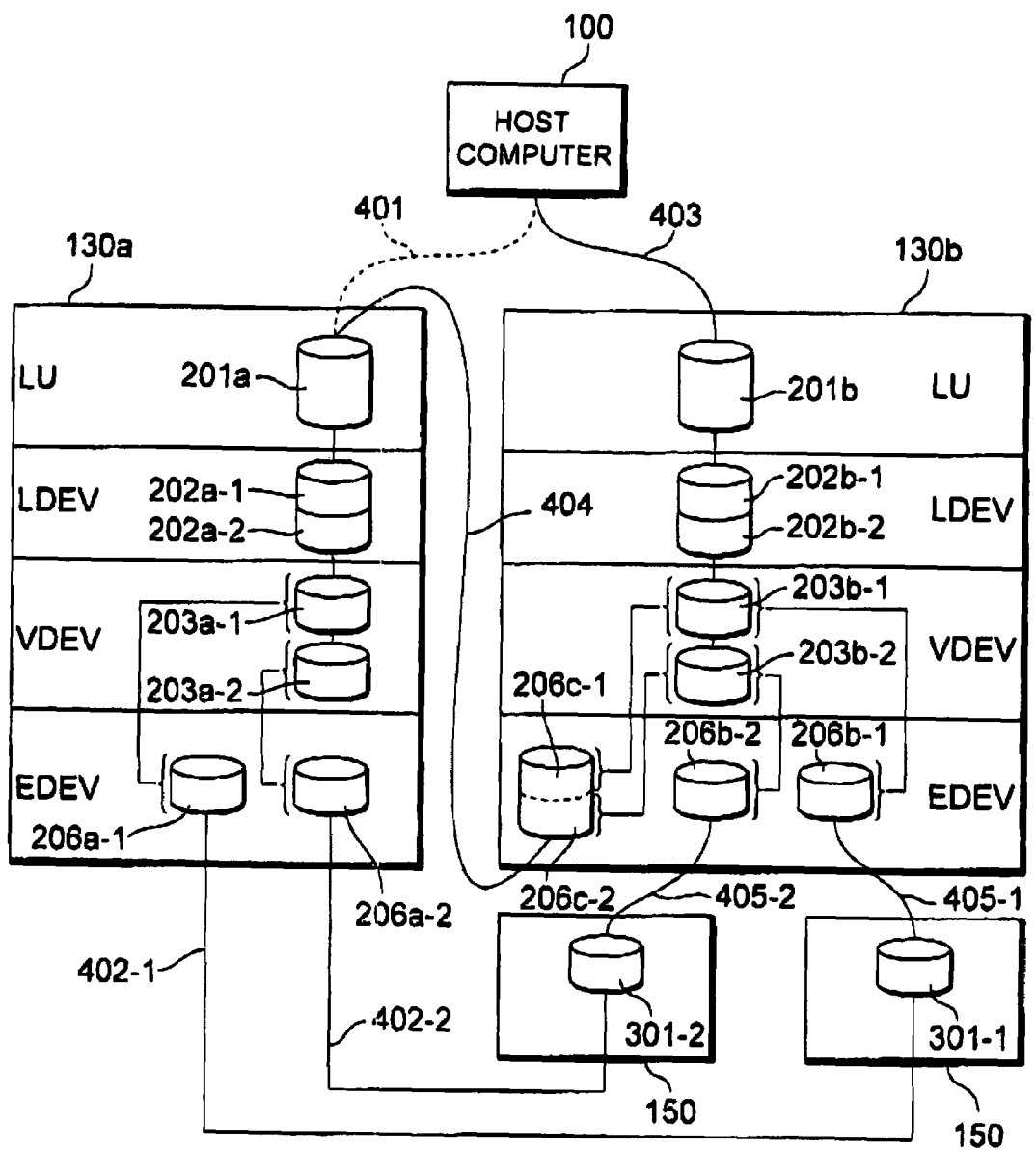
FIG. 36 is an explanatory diagram showing the outline of processing for migrating a logical unit having a LUSE configuration.

Outline of migration processing of a logical unit having a LUSE configuration is now explained with reference to FIG. 36.

The storage system 130a includes a logical unit 201a, logical devices 202a-1, 202a-2, virtual devices 203a-1, 203a-2, and expansion devices 206a-1, 206a-2. The logical unit 201a is connected to the host computer via the path 401. The logical unit 201a is a storage extent consolidating a plurality of logical devices 202a-1, 202a-2, and has a LUSE configuration. The expansion device 206a-1 is a virtualization of the external volume 301-1, and is mapped to the virtual device 203a-1. The virtual device 203a-1 is mapped to the logical device 202a-1. The expansion device 206a-2 is a virtualization of the external volume 301-2, and is mapped to the virtual device 203a-2. The virtual device 203a-2 is mapped to the logical device 202a-2.

The outline of processing for migrating data of the logical unit 201a (migration source logical unit) in the storage system 130a (migration source storage) to the logical unit 201b (migration destination logical unit) in the storage system 130b (migration destination storage) is now explained. The logical unit migration processing includes the following processing routine of (1) to (9).

(1) The storage system 130b defines paths 405-1, 405-2 for externally connecting the external volumes 301-1, 301-2 and the storage system 130b, and creates expansion devices 206b-1, 206b-2 for virtualizing the external volumes 301-1, 301-2 in the storage system 130b.

(2) The storage system 130b creates a virtual device 203b-1 having a storage capacity that is the same as the storage capacity of the external volume 301-1, and a virtual device 203b-2 having a storage capacity that is the same as the storage capacity of the external volume 301-2 in the storage system 130b.

(3) The storage system 130b defines a path 404 for externally connecting the logical unit 201a and the storage system 130b, and creates an expansion device 206c for virtualizing the logical unit 201a in the storage system 130b. The expansion device 206c is partitioned into a plurality of storage extents 206c-1, 206c-2.

(4) The storage system 130b maps the expansion device 206c to the virtual devices 203b-1, 203b-2 (more specifically, maps the storage extent 206c-1 to the virtual device 203b-1, and maps the storage extent 206c-2 to the virtual device 203b-2).

(5) The storage system 130b creates a logical device 202b-1 having a logical configuration that is the same as the logical configuration of the logical device 202a-1, and a logical device 202b-2 having a logical configuration that is the same as the logical configuration of the logical device 202a-2 in the storage system 130b. The virtual device 203b-1 is mapped to the logical device 202b-1, and the virtual device 203b-2 is mapped to the logical device 202b-2.

(6) The storage system 130b creates a logical unit 201b having a logical configuration that is the same as the logical configuration of the logical unit 201a in the storage system 130b, and defines a path 403 for connecting the host computer 100 and the logical unit 201b. The logical devices 202b-1, 202b-2 are mapped to the logical unit 201b.

(7) The host computer 100 switches the path 401 to the path 403 as a path for accessing the external volumes 301-1, 301-2. Here, access from the host computer 100 to the logical unit 201a is inhibited such as by deleting the path 401. Incidentally, path switching from the path 401 to the path 403 may also be conducted by the storage systems 130a, 130b, or the management server 110. Further, it is not necessarily the case that the path 401 needs to be deleted, and, for instance, the path 401 may be set as an alternate path (for instance, a path to be used during system failure) of the path 403, and the path 401 may be left as is with the path 401 in an invalid state.

As a result of the foregoing processing, not only is the logical unit 201b a virtualization of the logical unit 201a, it is also a virtualization of the external volumes 301-1, 301-2. Thus, the data I/O path from the host computer 100 to the logical unit 201a during the logical unit migration processing will be path 403→storage hierarchy (LU/LDEV/VDEV/EDEV) in the storage system 130b→path 404→storage hierarchy (LU/LDEV/VDEV/EDEV) in the storage system 130a→paths 402-1, 402-2→external volumes 301-1, 301-2.

(8) The storage system 130a sets the operation mode of the storage system 130a for destaging to the external volumes 301-1, 301-2 all dirty data accumulated in the disk cache of the storage system 130a to a cache through mode. Incidentally, the storage system 130a may autonomously set the operation mode to a cache through mode, or set the operation mode to a cache through mode based on an external command (for instance, from the storage system 130b, the host computer 100, or the management server 110).

(9) After destaging all dirty data accumulated in the disk cache of the storage system 130a to the external volumes 301-1, 301-2, the storage system 130b releases the mapping relation between the expansion device 206c and the virtual devices 203b-1,203b-2, maps the expansion device 206b-1 to the virtual device 203b-1, and maps the expansion device 206b-2 to the virtual device 203b-2. In addition, the storage system 130b deletes the path 404.

Figure 37:
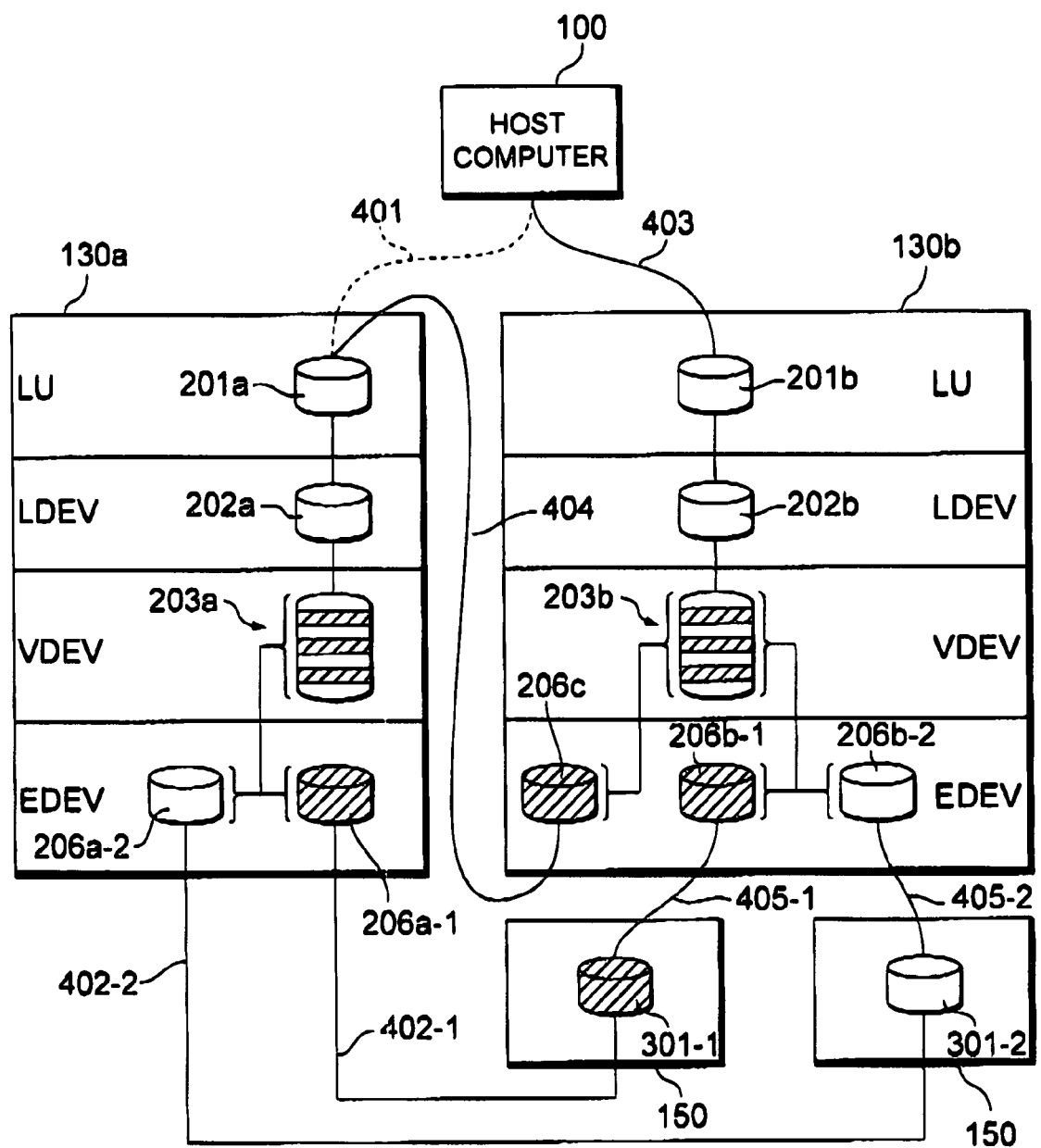
FIG. 37 is an explanatory diagram showing the outline of processing for migrating a logical unit having an external volume RAID configuration.

Outline of migration processing of a logical unit having an external volume RAID configuration is now explained with reference to FIG. 37.

The storage system 130a includes a logical unit 201a, a logical device 202a, a virtual device 203a, and expansion devices 206a-1, 206a-2. The logical unit 201a is connected to the host computer 100 via the path 401. The logical unit 201a is configured by applying the RAID configuration to a plurality of external volumes 301-1, 301-2, and virtualizing the external volumes 301-1, 301-2 into one storage extent. As the RAID configuration to be applied to the plurality of external volumes 301-1, 301-2, RAID 1 (mirroring) is illustrated in this embodiment. In the RAID 1 configuration, the external volume 301-1 is a primary volume, whereas the external volume 301-2 is a secondary volume (mirror volume). As the RAID configuration to be applied to the external volumes 301-1, 301-2, without limitation to RAID 1 described above, RAID 0, RAID 5, or RAID 6 may also be used. The expansion device 206a-1 is a virtualization of the external volume 301-1. The expansion device 206a-2 is a virtualization of the external volume 301-2. The virtual device 203a is configured by applying a RAID configuration to a plurality of expansion devices 206a-1, 206a-2 and virtualizing the expansion devices 206a-1, 206a-2 into one storage extent. The storage extent corresponding to the primary volume in the virtual device 203a is mapped to the logical device 202a. The logical device 202a is mapped to the logical unit 201a.

The outline of processing for migrating data of the logical unit 201a (migration source logical unit) in the storage system 130a (migration source storage) to the logical unit 201b (migration destination logical unit) in the storage system 130b (migration destination storage) is now explained. The logical unit migration processing includes the following processing routine of (1) to (9).

(1) The storage system 130b defines paths 405-1, 405-2 for externally connecting the external volumes 301-1, 301-2 and the storage system 130b, and creates expansion devices 206b-1, 206b-2 for virtualizing the external volumes 301-1, 301-2 in the storage system 130b.

(2) The storage system 130b creates a virtual device 203b for virtualizing the plurality of external volumes 301-1, 301-2 in the storage system 130b. When employing mirroring as the RAID configuration for virtualizing the plurality of external volumes 301-1, 301-2, the storage capacity of the virtual device 203b is equivalent to the total storage capacity of the plurality of external volumes 301-1, 301-2.

(3) The storage system 130b defines a path 404 for externally connecting the logical unit 201a and the storage system 130b, and creates an expansion device 206c for virtualizing the logical unit 201a in the storage system 130b.

(4) The storage system 130b maps the expansion device 206c to the virtual devices 203b (more specifically, to the storage extent corresponding to the primary volume in the virtual device 203b).

(5) The storage system 130b creates a logical device 202b having a logical configuration that is the same as the logical configuration of the logical device 202a in the storage system 130b. The storage extent corresponding to the primary volume in the virtual device 203b is mapped to the logical device 202b.

(6) The storage system 130b creates a logical unit 201b having a logical configuration that is the same as the logical configuration of the logical unit 201a in the storage system 130b, and defines a path 403 for connecting the host computer 100 and the logical unit 201b. The logical device 202 is mapped to the logical unit 201b.

(7) The host computer 100 switches the path 401 to the path 403 as a path for accessing the external volumes 301-1, 301-2. Here, access from the host computer 100 to the logical unit 201a is inhibited such as by deleting the path 401. Incidentally, path switching from the path 401 to the path 403 may also be conducted by the storage systems 130a, 130b, or the management server 110. Further, it is not necessarily the case that the path 401 needs to be deleted, and, for instance, the path 401 may be set as an alternate path (for instance, a path to be used during system failure) of the path 403, and the path 401 may be left as is with the path 401 in an invalid state.

As a result of the foregoing processing, not only is the logical unit 201b a virtualization of the logical unit 201a, it is also a virtualization of the external volumes 301-1, 301-2. Thus, the data I/O path from the host computer 100 to the logical unit 201a during the logical unit migration processing will be path 403→storage hierarchy (LU/LDEV/VDEV/EDEV) in the storage system 130b→path 404→storage hierarchy (LU/LDEV/VDEV/EDEV) in the storage system 130a→paths 402-1, 402-2→external volumes 301-1, 301-2.

(8) The storage system 130a sets the operation mode of the storage system 130a for destaging to the external volumes 301-1, 301-2 all dirty data accumulated in the disk cache of the storage system 130a to a cache through mode. Incidentally, the storage system 130a may autonomously sot the operation mode to a cache through mode, or set the operation mode to a cache through mode based on an external command (for instance, from the storage system 130b. the host computer 100, or the management server 110).

(9) After destaging all dirty data accumulated in the disk cache of the storage system 130a to the external volumes 301-1, 301-2, the storage system 130b releases the mapping relation between the expansion device 206c and the virtual device 203b, and maps the expansion devices 206b-1, 206b-2 to the virtual device 203b. In addition, the storage system 130b deletes the path 404.

Outline of migration processing of the VMA volume is now explained with reference to FIG. 38.

The storage system 130a includes a logical unit 201a, a logical device 202a, a virtual device 203a, and an expansion device 206a. The logical unit 201a is connected to the host computer 100 via the path 401. The logical device 202a is a VMA volume, and includes a user extent 202a-1 that is accessible from the host computer 100, and a management extent 202a-2 for storing management information. Management information, for instance, includes access attributes of the VMA volume. The user extent 202a-1 can be recognized by the host computer 100 by being allocated to the logical unit 201a. The management extent 202a-2 is not allocated to the logical unit 201a, and cannot be recognized by the host computer 100. The virtual device 203a has a user extent 203a-1 that is accessible from the host computer 100, and a management extent 203a-2 for storing management information. The expansion device 206a has a user extent 206a-1 that is accessible from the host computer 100, and a management extent 206a-2 for storing management information. The user extent 206a-1 in the expansion device 206a is a virtualization of the user extent 301-1 in the external volume 301. The management extent 206a-2 in the expansion device 206a is a virtualization of the management extent 301-2 in the external volume 301. The user extent 206a-1 is mapped to the user extent 203a-1. The management extent 206a-2 is mapped to the management extent 203a-2. The user extent 203a-1 is mapped to the user extent 202a-1. The management extent 203a-2 is mapped to the management extent 202a-2.

Incidentally, when the migration source storage system 130a is not storing management information in the external volume 301, and is storing management information in a disk cache or another memory in the storage system 130a, it is necessary to destage the management information to the external volume 301 as a prearrangement in executing the migration processing of the logical unit 201a.

The outline of processing for migrating data of the logical unit 201a (migration source logical unit) in the storage system 130a (migration source storage) to the logical unit 201b (migration destination logical unit) in the storage system 130b (migration destination storage) is now explained. The logical unit migration processing includes the following processing routine of (1) to (9).

(1) The storage system 130b defines a path 405 for externally connecting the external volume 301 and the storage system 130b, and creates an expansion device 206b for virtualizing the external volume 301 in the storage system 130b. The expansion device 206b includes a user extent 206b-1 that is accessible from the host computer 100, and a management extent 206b-2 for storing management information. The storage system 130b maps the management extent 301-2 to the management extent 206b-2.

(2) The storage system 130b creates a virtual device 203b for virtualizing the external volume 301 in the storage system 130b. The virtual device 203b has a user extent 203b-1 that is accessible from the host computer 100, and a management extent 203b-2 for storing management information. The storage system 130b maps the management extent 206b-2 to the management extent 203b-2.

(3) The storage system 130b defines a path 404 for externally connecting the logical unit 201a and the storage system 130b, and creates an expansion device 206c for virtualizing the logical unit 201a in the storage system 130b.

(4) The storage system 130b maps the expansion device 206c to the user extent 203b-1 in the virtual device 203b.

(5) The storage system 130b creates a logical device 202b having a logical configuration that is the same as the logical configuration of the logical device 202a in the storage system 130b. The logical device 202b has a user extent 202b-1 that is accessible from the host computer 100, and a management extent 202b-2 for storing management information. The user extent 203b-1 is mapped to the user extent 202b-1. The management extent 203b-2 is mapped to the management extent 202b-2.

(6) The storage system 130b creates a logical unit 201b having a logical configuration that is the same as the logical configuration of the logical unit 201a in the storage system 130b, and defines a path 403 for connecting the host computer 100 and the logical unit 201b. The user extent 202b-1 is mapped to the logical unit 201b.

(7) The host computer 100 switches the path 401 to the path 403 as a path for accessing the external volume 301. Here, access from the host computer 100 to the logical unit 201a is inhibited such as by deleting the path 401. Incidentally, path switching from the path 401 to the path 403 may also be conducted by the storage systems 130a, 130b, or the management server 110. Further, it is not necessarily the case that the path 401 needs to be deleted, and, for instance, the path 401 may be set as an alternate path (for instance, a path to be used during system failure) of the path 403, and the path 401 may be left as is with the path 401 in an invalid state.

As a result of the foregoing processing, not only is the logical unit 201b a virtualization of the logical unit 201a, it is also a virtualization of the user extent 301-1 in the external volume 301. Thus, the data I/O path from the host computer 100 to the logical unit 201a during the logical unit migration processing will be path 403→storage hierarchy (LU/LDEV/VDEV/EDEV) in the storage system 130b→path 404→storage hierarchy (LU/LDEV/VDEV/EDEV) in the storage system 130a→path 402→external volume 301.

Incidentally, since the storage system 130b is virtualizing the management extent 301-2 in the external volume 130 with the virtual device 203b, it is able to refer to the management information via the path 405. In order for the storage system 130a to refer to the management information in the external volume 130 via the path 402 during the migration processing of the logical unit 201a, it is necessary to set the writing from the management extent 203b-2 in the virtual device 203b to the management extent 301-2 in the external volume 301 to a cache through mode, and to constantly update the management information in the management extent 301-2. Update of the management information written in the management extent 301-2 in the external volume 301 is conducted by the migration target storage system 130b.

(8) The storage system 130a sets the operation mode of the storage system 130a for destaging to the external volume 301 all dirty data accumulated in the disk cache of the storage system 130a to a cache through mode. Incidentally, the storage system 130a may autonomously set the operation mode to a cache through mode, or set the operation mode to a cache through mode based on an external command (for instance, from the storage system 130b, the host computer 100, or the management server 110).

(9) After destaging all dirty data accumulated in the disk cache of the storage system 130a to the external volume 301, the storage system 130b releases the mapping relation between the expansion device 206c and the virtual device 203b, and maps the user extent 206b-1 in the expansion device 206b to the user extent 203b-1 in the virtual device 203b. In addition, the storage system 130b deletes the path 404.

Figure 38:
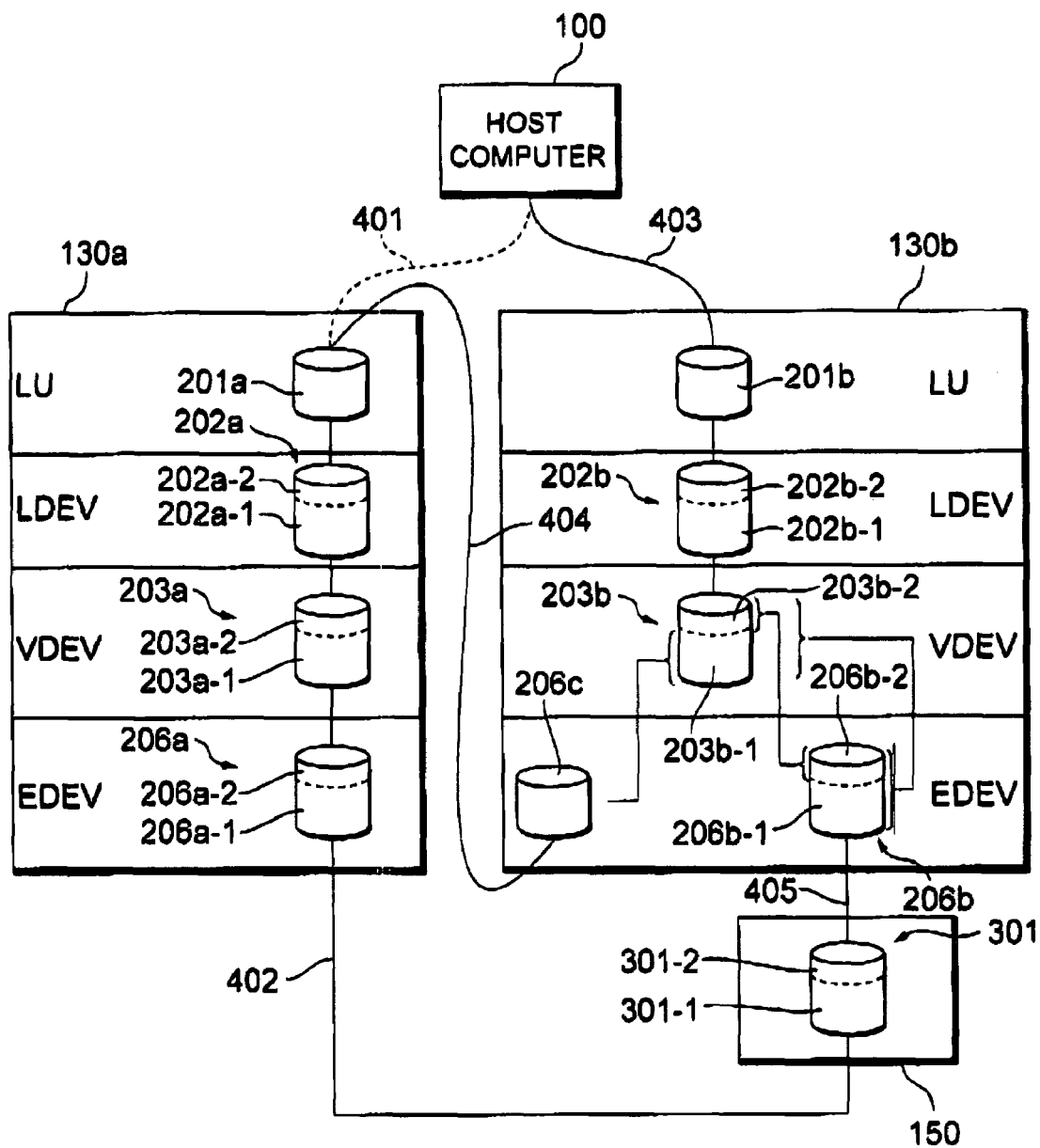
FIG. 38 is an explanatory diagram showing the outline of processing for migrating a logical unit having a VMA volume configuration.

Incidentally, the method shown in FIG. 38 is not limited to a case where the external volume 301 is a VMA volume, and it is possible to migrate the logical unit 201a via the foregoing processing routine of (1) to (9) even when the external volume 301 is a mainframe volume.

Another method of migration processing of the VMA volume is now explained with reference to FIG. 39.

The storage system 130a includes logical units 201a-1, 202a-1, a logical device 202a, a virtual device 203a, and an expansion device 206a. The logical unit 201a-1 is connected to the host computer 100 via the path 401, and is recognizable from the host computer 100. Meanwhile, the logical unit 201a-2 is not connected to the host computer 100, and cannot be recognized from the host computer 100. The logical unit 201a-2 is temporarily created while migrating the logical unit 201a-1 from the storage system 130a to the storage system 130b. The logical device 202a is a VMA volume, and has a user extent 202a-1 that is accessible from the host computer 100, and a management extent 202a-2 for storing management information. Management information, for instance, includes access attributes of the VMA volume. The user extent 202a-1 can be recognized by the host computer 100 by being allocated to the logical unit 201a. The management extent 202a-2 is allocated to the logical unit 201a-2, and cannot be recognized by the host computer 100. The virtual device 203a has a user extent 203a-1 that is accessible from the host computer 100, and a management extent 203a-2 for storing management information. The expansion device 206a has a user extent 206a-1 that is accessible from the host computer 100, and a management extent 206a-2 for storing management information. The user extent 206a-1 in the expansion device 206a is a virtualization of the user extent 301-1 in the external volume 301. The management extent 206a-2 in the expansion device 206a is a virtualization of the management extent 301-2 in the external volume 301. The user extent 206a-1 is mapped to the user extent 203a-1. The management extent 206a-2 is mapped to the management extent 203a-2. The user extent 203a-1 is mapped to the user extent 202a-1. The management extent 203a-2 is mapped to the management extent 202a-2.

The outline of processing for migrating data of the logical unit 201a (migration source logical unit) in the storage system 130a (migration source storage) to the logical unit 201b (migration destination logical unit) in the storage system 130b (migration destination storage) is now explained. The logical unit migration processing includes the following processing routine of (1) to (9).

(1) The storage system 130b defines a path 405 for externally connecting the external volume 301 and the storage system 130b, and creates an expansion device 206b for virtualizing the external volume 301 in the storage system 130b. The expansion device 206b includes a user extent 206b-1 that is accessible from the host computer 100, and a management extent 206b-2 for storing management information.

(2) The storage system 130b creates a virtual device 203b for virtualizing the external volume 301 in the storage system 130b. The virtual device 203b has a user extent 203b-1 that is accessible from the host computer 100, and a management extent 203b-2 for storing management information.

(3) The storage system 130b defines a path 404-1 for externally connecting the logical unit 201a-1 and the storage system 130b, defines a path 404-2 for externally connecting the logical unit 201a-2 and the storage system 130b, creates an expansion device 206c-1 for virtualizing the logical unit 201a-1, and creates an expansion device 206c-2 for virtualizing the logical unit 201a-2 in the storage system 130b.

(4) The storage system 130b maps the expansion device 206c-1 to the user extent 203b-1 in the virtual device 203b, and maps the expansion device 206c-2 to the management extent 203b-2 in the virtual device 203b.

(5) The storage system 130b creates a logical device 202b having a logical configuration that is the same as the logical configuration of the logical device 202a in the storage system 130b. The logical device 202b has a user extent 202b-1 that is accessible from the host computer 100, and a management extent 202b-2 for storing management information. The user extent 203b-1 is mapped to the user extent 202b-1. The management extent 203b-2 is mapped to the management extent 202b-2.

(6) The storage system 130b creates a logical unit 201b having a logical configuration that is the same as the logical configuration of the logical unit 201a-1 in the storage system 130b, and defines a path 403 for connecting the host computer 100 and the logical unit 201b. The user extent 202b-1 is mapped to the logical unit 201b.

(7) The host computer 100 switches the path 401 to the path 403 as a path for accessing the external volume 301. Here, access from the host computer 100 to the logical unit 201a-1 is inhibited such as by deleting the path 401. Incidentally, path switching from the path 401 to the path 403 may also be conducted by the storage systems 130a, 130b, or the management server 110. Further, it is not necessarily the case that the path 401 needs to be deleted, and, for instance, the path 401 may be set as an alternate path (for instance, a path to be used during system failure) of the path 403, and the path 401 may be left as is with the path 401 in an invalid state.

As a result of the foregoing processing, not only is the logical unit 201b a virtualization of the logical unit 201a-1, it is also a virtualization of the user extent 301-1 in the external volume 301. Thus, the data I/O path from the host computer 100 to the logical unit 201a during the logical unit migration processing will be path 403→storage hierarchy (LU/LDEV/VDEV/EDEV) in the storage system 130b→path 404-1→storage hierarchy (LU/LDEV/VDEV/EDEV) in the storage system 130a→path 402→external volume 301.

Incidentally, since the storage system 130a is virtualizing the management extent 301-1 in the external volume 130 with the virtual device 203a-1, it is able to refer to the management information via the path 402. In order for the storage system 130b to refer to the management information in the external volume 130 during the migration processing of the logical unit 201a, it merely needs to access the management extent 301-2 in the external volume 130 via the path 404-2 and the logical unit 201a-2. Update of the management information written in the management extent 301-2 in the external volume 301 is conducted by the migration target storage system 130a.

(8) The storage system 130a sets the operation mode of the storage system 130a for destaging to the external volume 301 all dirty data accumulated in the disk cache of the storage system 130a to a cache through mode. Incidentally, the storage system 130a may autonomously set the operation mode to a cache through mode, or set the operation mode to a cache through mode based on an external command (for instance, from the storage system 130b, the host computer 100, or the management server 110).

(9) After destaging all dirty data accumulated in the disk cache of the storage system 130a to the external volume 301, the storage system 130b releases the mapping relation between the expansion device 206c-1 and the user extent 203b-1, and releases the mapping relation between the expansion device 206c-2 and the management extent 203b-2. The storage system 130b further maps the user extent 206b-1 in the expansion device 206b to the user extent 203b-1, and maps the management extent 206b-2 to the management extent 203b-2. In addition, the storage system 130b deletes the path 404.

Figure 39:
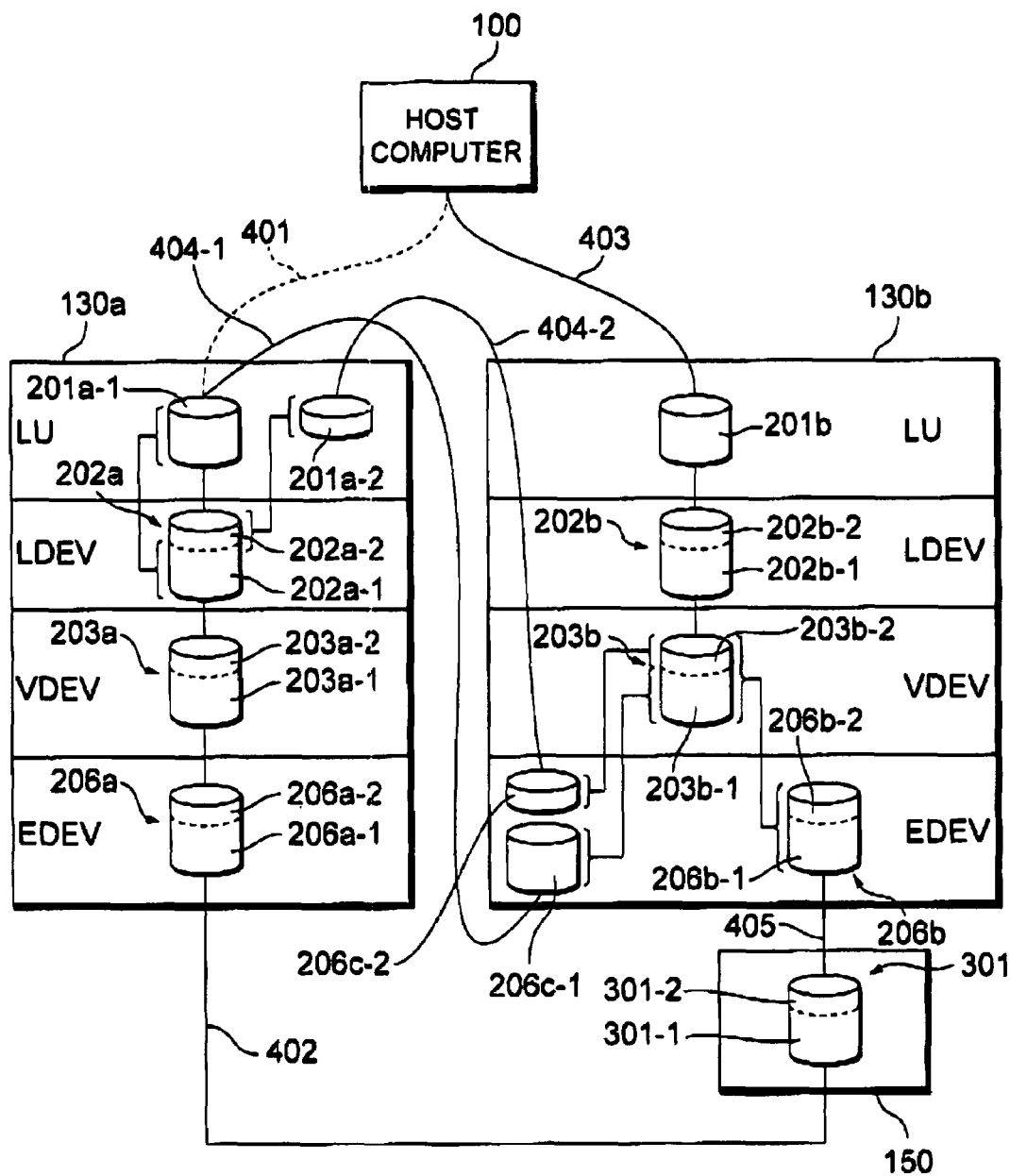
FIG. 39 is an explanatory diagram showing the outline of processing for migrating a logical unit having a VMA volume configuration.

Incidentally, the method shown in FIG. 39 is not limited to a case where the external volume 301 is a VMA volume, and it is possible to migrate the logical unit 201a-1 via the foregoing processing routine of (1) to (9) even when the external volume 301 is a mainframe volume.

The primary difference between the method shown in FIG. 38 and the method shown in FIG. 39 is as follows. With the method shown in FIG. 39, the migration target storage system 130b accesses the management extent 301-2 via the migration source storage system 130a, whereas with the method shown in FIG. 38, the migration target storage system 130b directly accesses the management extent 301-2. With the method shown in FIG. 39, the update of management information in the management extent 301-2 is executed by the migration source storage system 130a, whereas the with the method shown FIG. 38, the update of management information in the management extent 301-2 is executed by the migration target storage system 130b.

Figure 40:
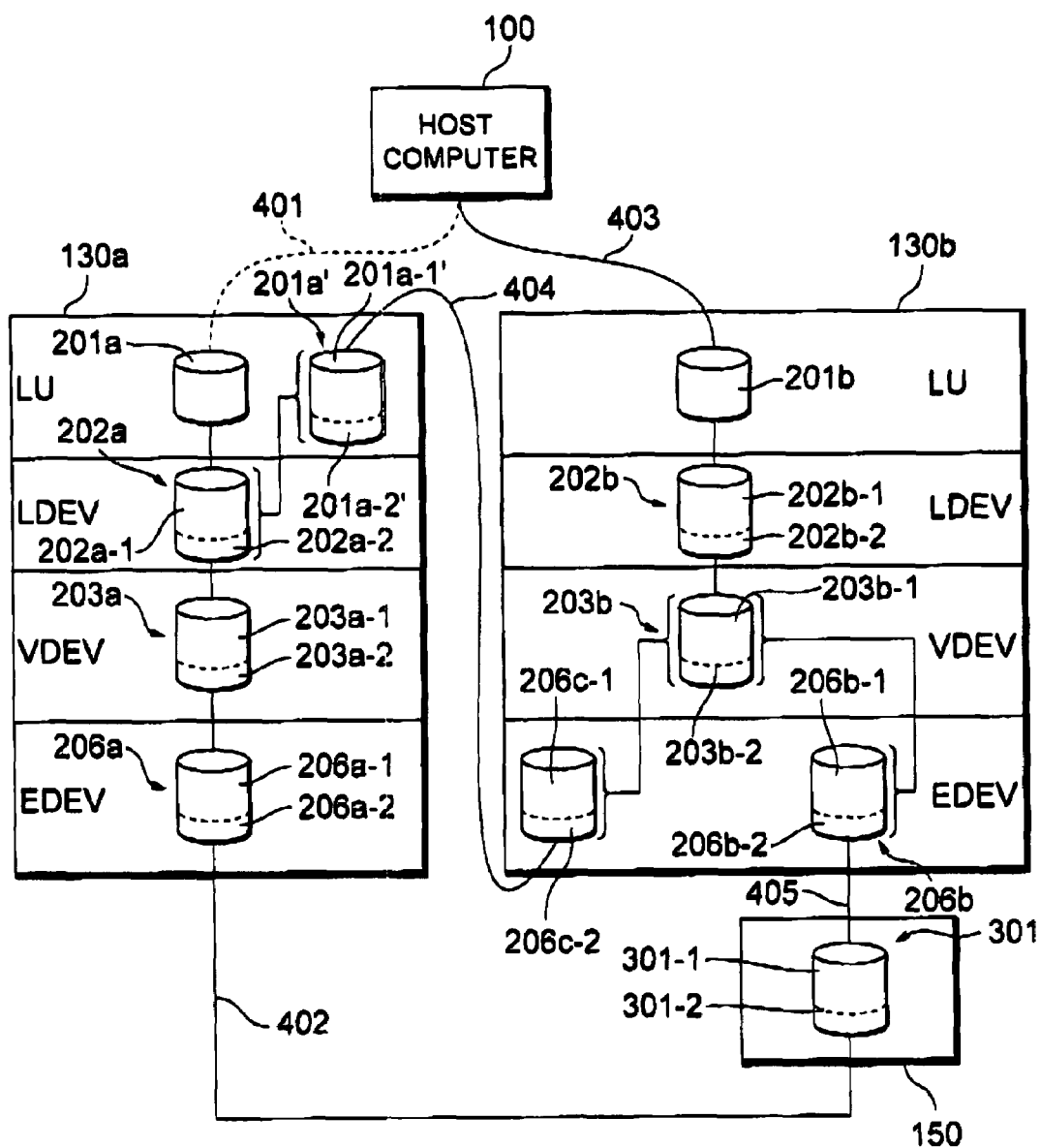
FIG. 40 is an explanatory diagram showing the outline of processing for migrating a logical unit having a mainframe volume configuration.

Another method of migration processing of the VMA volume is now explained with reference to FIG. 40.

The storage system 130a includes logical units 201a, 201a', a logical device 202a, a virtual device 203a, and an expansion device 206a. The logical unit 201a is connected to the host computer 100 via the path 401, and is recognizable from the host computer 100. Meanwhile, the logical unit 201a' is not connected to the host computer 100, and cannot be recognized from the host computer 100. The logical unit 201a' is temporarily created while migrating the logical unit 201a from the storage system 130a to the storage system 130b. The logical unit 201a' has a user extent 201a-1' and a management extent 201a-2'. The logical device 202a is a VMA volume, and has a user extent 202a-1 that is accessible from the host computer 100, and a management extent 202a-2 for storing management information. Management information, for instance, includes access attributes of the VMA volume. The user extent 202a-1 can be recognized by the host computer 100 by being allocated to the logical unit 201a. The user extent 202a-1 is also allocated to the user extent 201a-1' in the logical unit 201a'. The management extent 202a-2 is allocated to the management extent 201a-2' in the logical unit 201a'. The virtual device 203a has a user extent 203a-1 that is accessible from the host computer 100, and a management extent 203a-2 for storing management information. The expansion device 206a has a user extent 206a-1 that is accessible from the host computer 100, and a management extent 206a-2 for storing management information. The user extent 206a-1 in the expansion device 206a is a virtualization of the user extent 301-1 in the external volume 301. The management extent 206a-2 in the expansion device 206a is a virtualization of the management extent 301-2 in the external volume 301. The user extent 206a-1 is mapped to the user extent 203a-1. The management extent 206a-2 is mapped to the management extent 203a-2. The user extent 203a-1 is mapped to the user extent 202a-1. The management extent 203a-2 is mapped to the management extent 202a-2.

The outline of processing for migrating data of the logical unit 201a (migration source logical unit) in the storage system 130a (migration source storage) to the logical unit 201b (migration destination logical unit) in the storage system 130b (migration destination storage) is now explained. The logical unit migration processing includes the following processing routine of (1) to (9).

(1) The storage system 130b defines a path 405 for externally connecting the external volume 301 and the storage system 130b, and creates an expansion device 206b for virtualizing the external volume 301 in the storage system 130b. The expansion device 206b includes a user extent 206b-1 that is accessible from the host computer 100, and a management extent 206b-2 for storing management information.

(2) The storage system 130b creates a virtual device 203b for virtualizing the external volume 301 in the storage system 130b. The virtual device 203b has a user extent 203b-1 that is accessible from the host computer 100, and a management extent 203b-2 for storing management information.

(3) The storage system 130b defines a path 404 for externally connecting the logical unit 201a' and the storage system 130b, and creates an expansion device 206c for virtualizing the logical unit 201a' in the storage system 130b. The expansion device 206c has a user extent 206c-1 that is accessible from the host computer 100, and a management extent 206c-2 for storing management information.

(4) The storage system 130b maps the user extent 206c-1 in the expansion device 206c-1 to the user extent 203b-1 in the virtual device 203b, and maps the management extent 206c-2 in the expansion device 206c-2 to the management extent 203b-2 in the virtual device 203b.

(5) The storage system 130b creates a logical device 202b having a logical configuration that is the same as the logical configuration of the logical device 202a in the storage system 130b. The logical device 202b has a user extent 202b-1 that is accessible from the host computer 100, and a management extent 202b-2 for storing management information. The user extent 203b-1 is mapped to the user extent 202b-1. The management extent 203b-2 is mapped to the management extent 202b-2.

(6) The storage system 130b creates a logical unit 201b having a logical configuration that is the same as the logical configuration of the logical unit 201a in the storage system 130b, and defines a path 403 for connecting the host computer 100 and the logical unit 201b. The user extent 202b-1 is mapped to the logical unit 201b.

(7) The host computer 100 switches the path 401 to the path 403 as a path for accessing the external volume 301. Here, access from the host computer 100 to the logical unit 201a-1 is inhibited such as by deleting the path 401. Incidentally, path switching from the path 401 to the path 403 may also be conducted by the storage systems 130a, 130b, or the management server 110. Further, it is not necessarily the case that the path 401 needs to be deleted, and, for instance, the path 401 may be set as an alternate path (for instance, a path to be used during system failure) of the path 403, and the path 401 may be left as is with the path 401 in an invalid state.

As a result of the foregoing processing, not only is the logical unit 201b a virtualization of the logical unit 201a, it is also a virtualization of the user extent 301-1 in the external volume 301. Thus, the data I/O path from the host computer 100 to the logical unit 201a during the logical unit migration processing will be path 403→storage hierarchy (LU/LDEV/VDEV/EDEV) in the storage system 130b→path 404→storage hierarchy (LU/LDEV/VDEV/EDEV) in the storage system 130a→path 402→external volume 301.

Incidentally, since the storage system 130a is virtualizing the management extent 301-1 in the external volume 130 with the virtual device 203a-1, it is able to refer to the management information via the path 402. In order for the storage system 130b to refer to the management information in the external volume 130 during the migration processing of the logical unit 201a, it merely needs to access the management extent 301-2 in the external volume 130 via the path 404 and the logical unit 201a'. Update of the management information written in the management extent 301-2 in the external volume 301 is conducted by the migration target storage system 130a.

(8) The storage system 130a sets the operation mode of the storage system 130a for destaging to the external volume 301 all dirty data accumulated in the disk cache of the storage system 130a to a cache through mode. Incidentally, the storage system 130a may autonomously set the operation mode to a cache through mode, or set the operation mode to a cache through mode based on an external command (for instance, from the storage system 130b, the host computer 100, or the management server 110).

(9) After destaging all dirty data accumulated in the disk cache of the storage system 130a to the external volume 301, the storage system 130b releases the mapping relation between the expansion device 206c and the virtual device 203b, and maps the expansion device 206c to the virtual device 203b. More specifically, the storage system 130b maps the user extent 206b-1 in the expansion device 206b to the user extent 203b-1 in the virtual device 203b, and maps the management extent 206b-2 in the expansion device 206b to the management extent 203b-2 in the virtual device 203b. In addition, the storage system 130b deletes the path 404.

Figure 41:
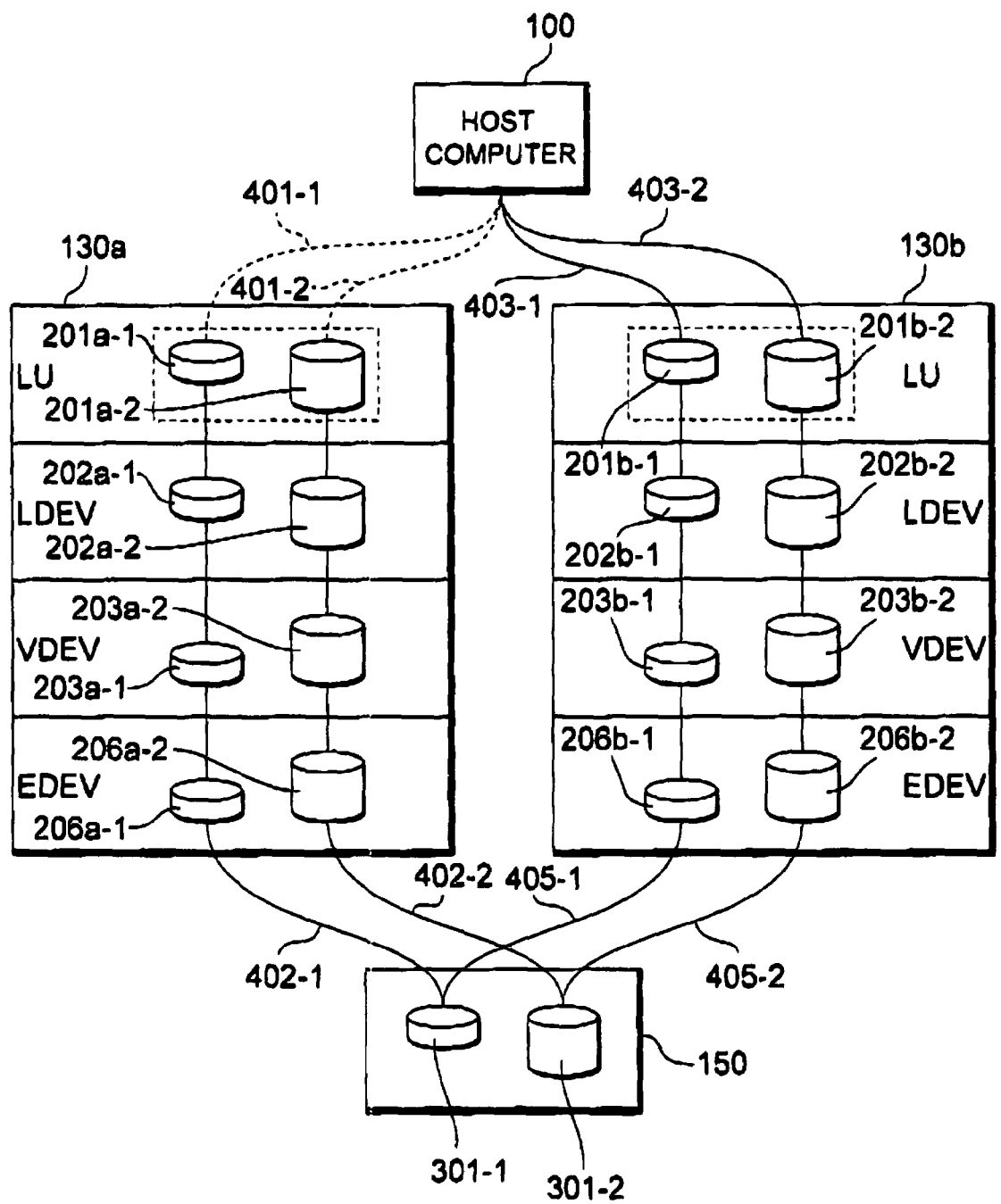
FIG. 41 is an explanatory diagram showing the outline of processing for migrating a plurality of logical units.

Outline of processing for migrating a plurality of logical units is now explained with reference to FIG. 41.

The storage system 130a includes a plurality of logical units 201a-1, 201a-2, a plurality of logical devices 202a-1, 202a-2, a plurality of virtual devices 203a-1, 203a-2, and a plurality of expansion devices 206a-1, 206a-2. The expansion device 206a-1 is a virtualization of the external volume 301-1, and is connected to the external storage system 150 via the path 402-1. The expansion device 206a-1 is mapped to the virtual device 203a-1. The virtual device 203a-1 is mapped to the logical device 202a-1. The logical device 202a-1 is mapped to the logical unit 201a-1. The logical unit 201a-1 is a virtualization of the external volume 301-1, and is connected to the host computer 100 via the path 401-1.

Meanwhile, the expansion device 206a-2 is a virtualization of the external volume 301-2, and is connected to the external storage system 150 via the path 402-2. The expansion device 206a-2 is mapped to the virtual device 203a-2. The virtual device 203a-2 is mapped to the logical device 202a-2. The logical device 202a-2 is mapped to the logical unit 201a-2.

The logical unit 201a-2 is a virtualization of the external volume 301-2, and is connected to the host computer 100 via the path 401-2.

Now, in order to migrate a plurality of logical units 201a-1, 201a-2 from the storage system 130a to the storage system 130b in the foregoing configuration, as with the processing routines described above, the storage system 130b creates a plurality of logical units 201b-1, 201b-2 to be migrated. The logical unit 201b-1 is connected to the host computer via the path 403-1. The logical unit 201b-2 is connected to the host computer 100 via the path 403-2. In addition, the storage system 130b creates a plurality of expansion devices 206c-1, 206c-2, a plurality of virtual devices 203b-1, 203b-2, and a plurality of logical devices 202b-1, 202b-2 for virtualizing the plurality of logical units 201a-1, 201a-2 of the migration source. The expansion device 206c-1 virtualizes the logical unit 201a-1 during the migration processing of the logical unit 201a-1 on the one hand, and connects to the external volume 301-1 via the path 405-1 and virtualizes the external volume 301-1 after the migration processing of the logical unit 201a-1 (more specifically, after completing the destaging of dirty data written in the virtual device 203a-1). The expansion device 206c-2 virtualizes the logical unit 201a-2 during the migration processing of the logical unit 201a-2 on the one hand, and connects to the logical unit 201a-2 via the path 405-2 and virtualizes the external volume 301-2 after the migration processing of the logical unit 201a-2 (more specifically, after completing the destaging of dirty data written in the virtual device 203a-2).

Incidentally, a command for migrating a plurality of logical units may be given from the management server 110 (refer to FIG. 2) to the respective storage systems 130a, 130b, or from the host computer 100 to the respective storage systems 130a, 130b.

Details regarding the logical unit migration processing are now explained with reference to FIG. 42 to FIG. 46.

Figure 42:
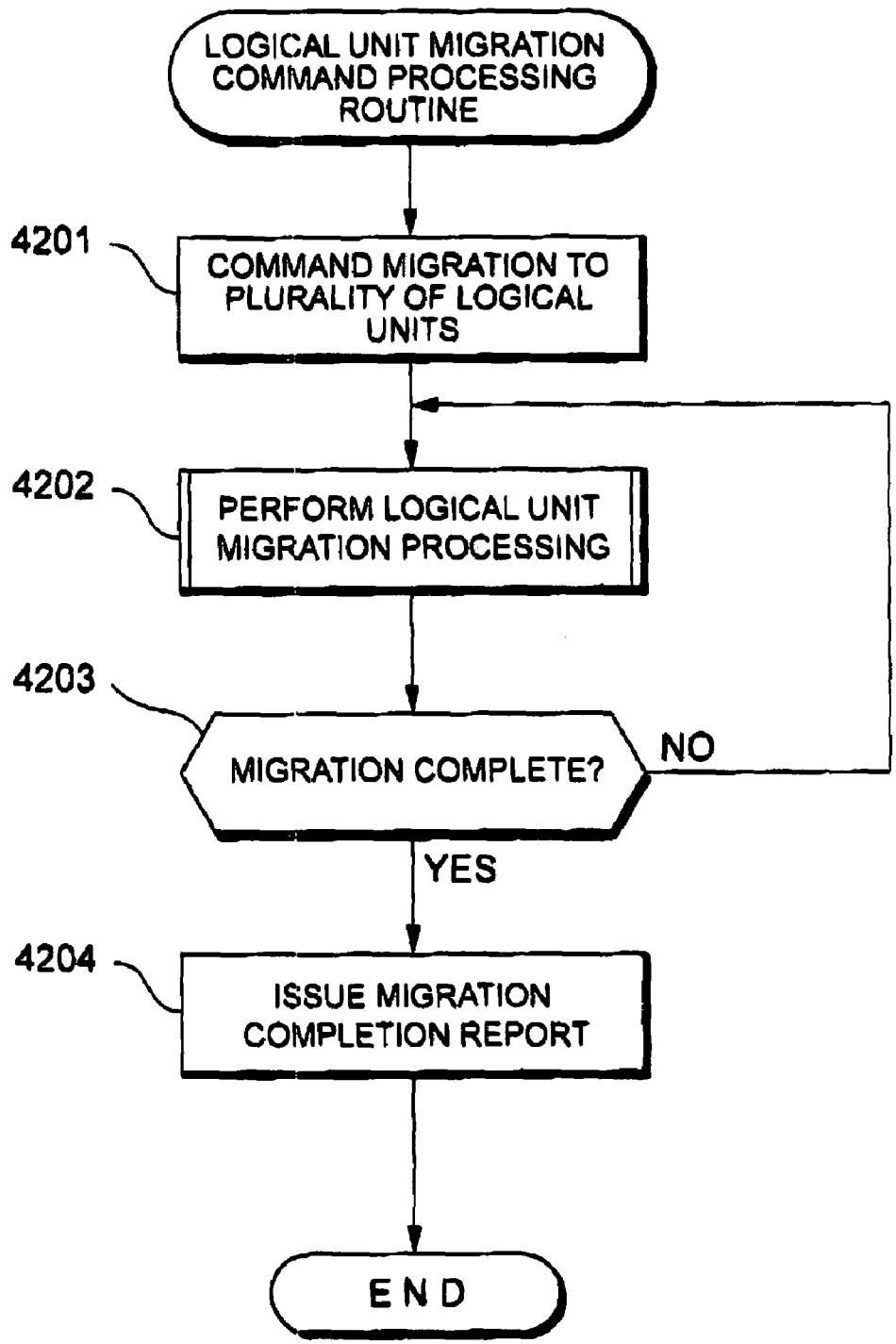
FIG. 42 is an explanatory diagram showing the logical unit migration command processing routine.

FIG. 42 shows the logical unit migration command processing routine. The logical unit migration command processing routine is executed with the logical unit migration command processing program 241 in the management server 110.

The management server 110 gives a command to the storage system 130a (migration source storage) and the storage system 130b (migration destination storage) for migrating one or more logical units (step 4201). Here, the storage administrator operating the management server 110 may give the logical unit migration command to the respective storage systems 130a, 130b, or the management software in the management server 110 may give the logical unit migration command to the respective storage systems 130a, 130b. Incidentally, the logical unit migration command may also be given from the host computer 100 to the respective storage systems 130a, 130b.

When the respective storage systems 130a, 130b receive the logical unit migration command, they execute processing for migrating the designated logical units (step 4202).

When the migration of certain logical units among all designated logical units is incomplete (step 4203; NO), the respective storage systems 130a, 130b execute the logical unit migration processing (step 4202).

When the migration of all designated logical units is complete (step 4203; YES), the respective storage systems 130a, 130b issue a migration completion report to the management server 110 (step 4204). Incidentally, when the logical unit migration command is given from the host computer 100 to the respective storage systems 130a, 130b. the respective storage systems 130*a*, 130*b* issue a migration completion report to the host computer 100.

Figure 43:
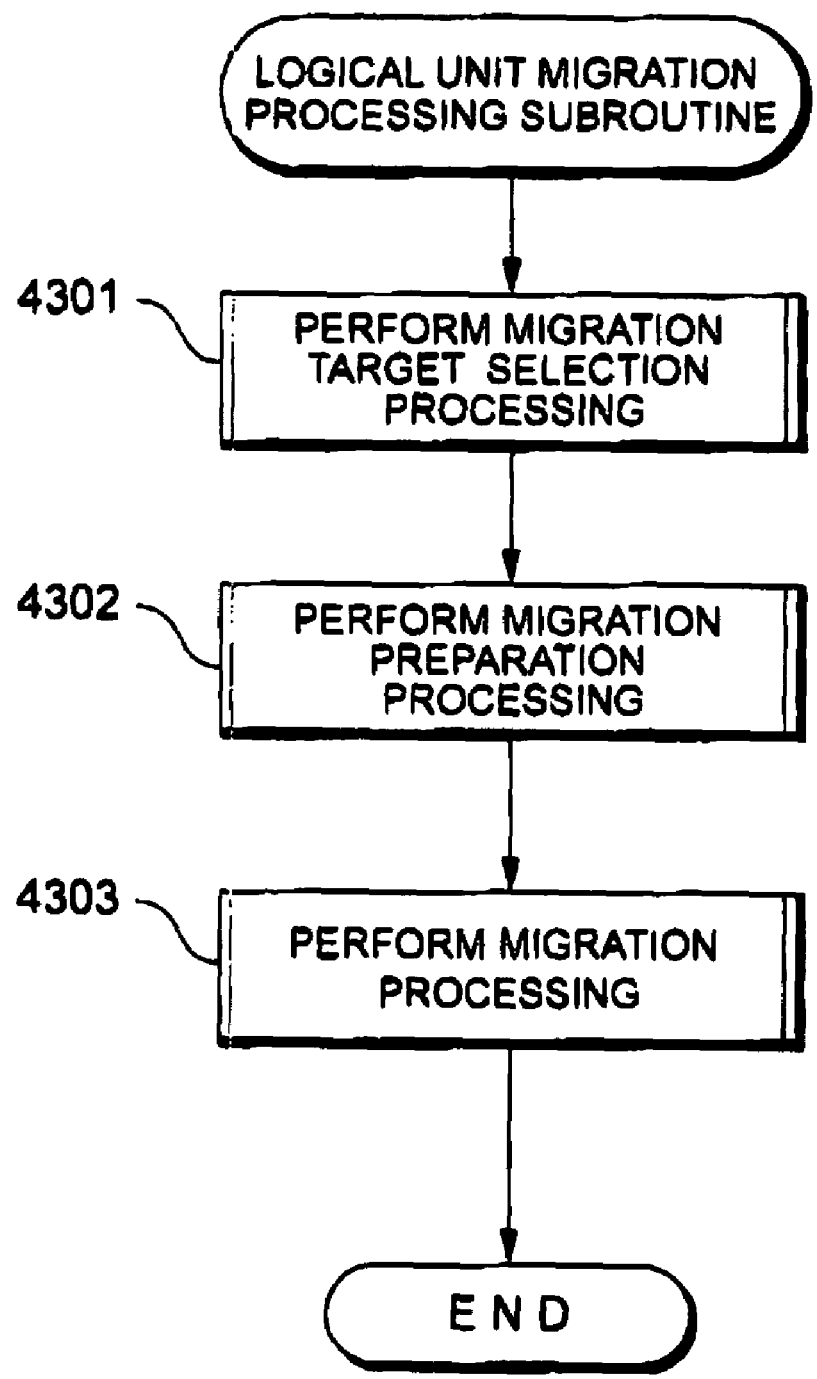
FIG. 43 is an explanatory diagram showing the logical unit migration processing subroutine.

FIG. 43 shows the logical unit migration processing subroutine. The logical unit migration processing subroutine is executed with the logical unit migration processing program 222 in the storage system 130.

When the logical unit migration processing subroutine is activated, the respective storage systems 130*a*, 130*b* execute the migration target selection processing (step 4301), the migration preparation processing (step 4302), and the migration processing (step 4303).

Figure 44:
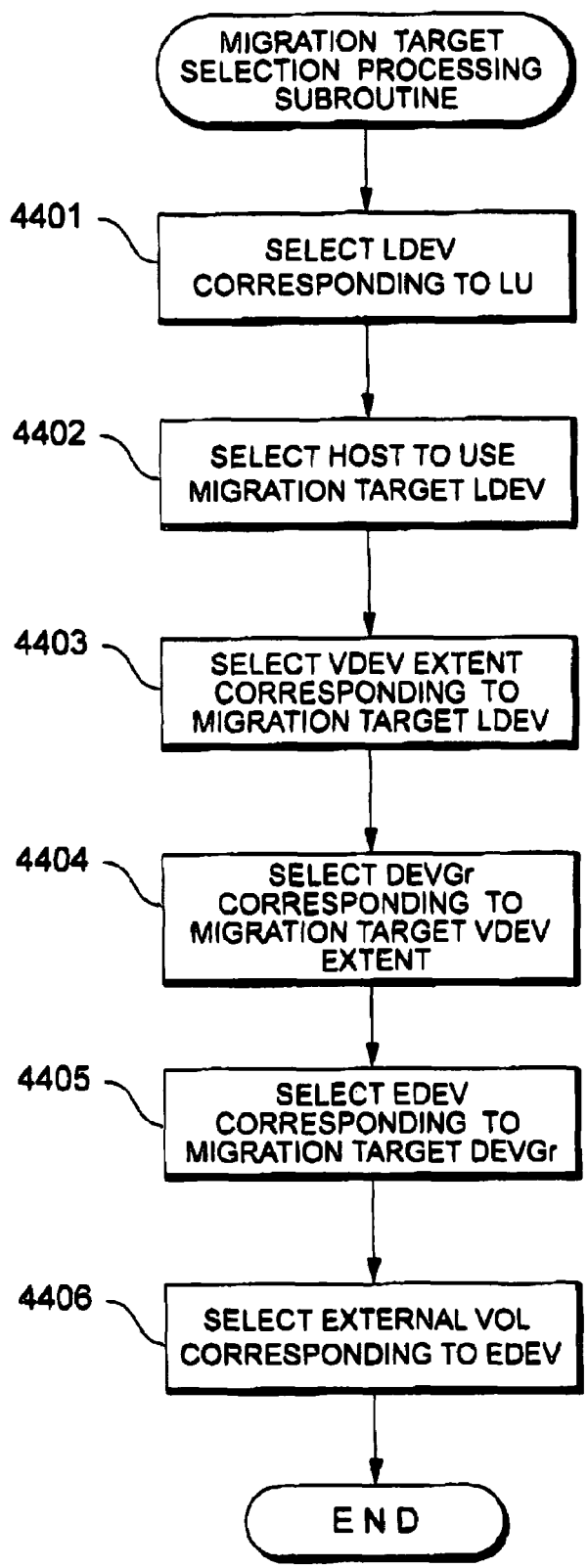
FIG. 44 is an explanatory diagram showing the migration target selection processing subroutine.

FIG. 44 shows the migration target selection processing subroutine. When the migration target selection processing subroutine is activated, the storage system 130*a* selects a logical device (logical device to be migrated) corresponding to the logical unit to be migrated (stop 4401). For instance, in a LUSE configuration, a plurality of logical devices are selected for one logical unit.

Subsequently, the storage system 130*a* selects all host computers 100 to use the logical device to be migrated (step 4402). For example, in addition to the host computers 100 belonging to the same host group, the host computers 100 belonging to other host groups are also selected.

The storage system 130*a* thereafter selects a VDEV extent (VDEV extent to be migrated) corresponding to the logical device to be migrated (step 4403). The VDEV extent may correspond to a part of one virtual device, or may correspond to a plurality of virtual devices. For example, in a CVS configuration, a part of the virtual device is selected as the VDEV extent corresponding to the logical device to be migrated. Meanwhile, in a VDEV consolidated configuration, a plurality of virtual devices are selected as the VDEV extent corresponding to the logical device to be migrated.

Subsequently, the storage system 130*a* selects a device group (device group to be migrated) corresponding to the VDEV extent to be migrated (step 4404). The device group may correspond to a part of one VDEV extent, or may correspond to a plurality of VDEV extents. For example, in a VDEV discrete configuration, a plurality of device groups are selected as the device group corresponding to the VDEV extent to be migrated.

The storage system 130*a* thereafter selects an expansion device (expansion device to be migrated) corresponding to the device group to be migrated (step 4405). The expansion device may correspond to a part of one device group, or may correspond to a plurality of device groups. For example, when certain storage extents of one expansion device are allocated to a certain device group, and the remaining storage extents are allocated to another device group, a part of the expansion device is selected as the expansion device corresponding to the device group to be migrated. Meanwhile, in an external volume RAID configuration, a plurality of expansion devices are selected as the expansion device corresponding to the device group to be migrated.

Subsequently, the storage system 130*a* selects an external volume corresponding to the expansion device to be migrated (step 4406).

As a result of the foregoing processing, it is possible to respectively select a logical device corresponding to the logical unit to be migrated, a virtual device corresponding to such logical device, a device group corresponding to such virtual device, an expansion device corresponding to such device group, and an external volume corresponding to such expansion device.

Figure 45:
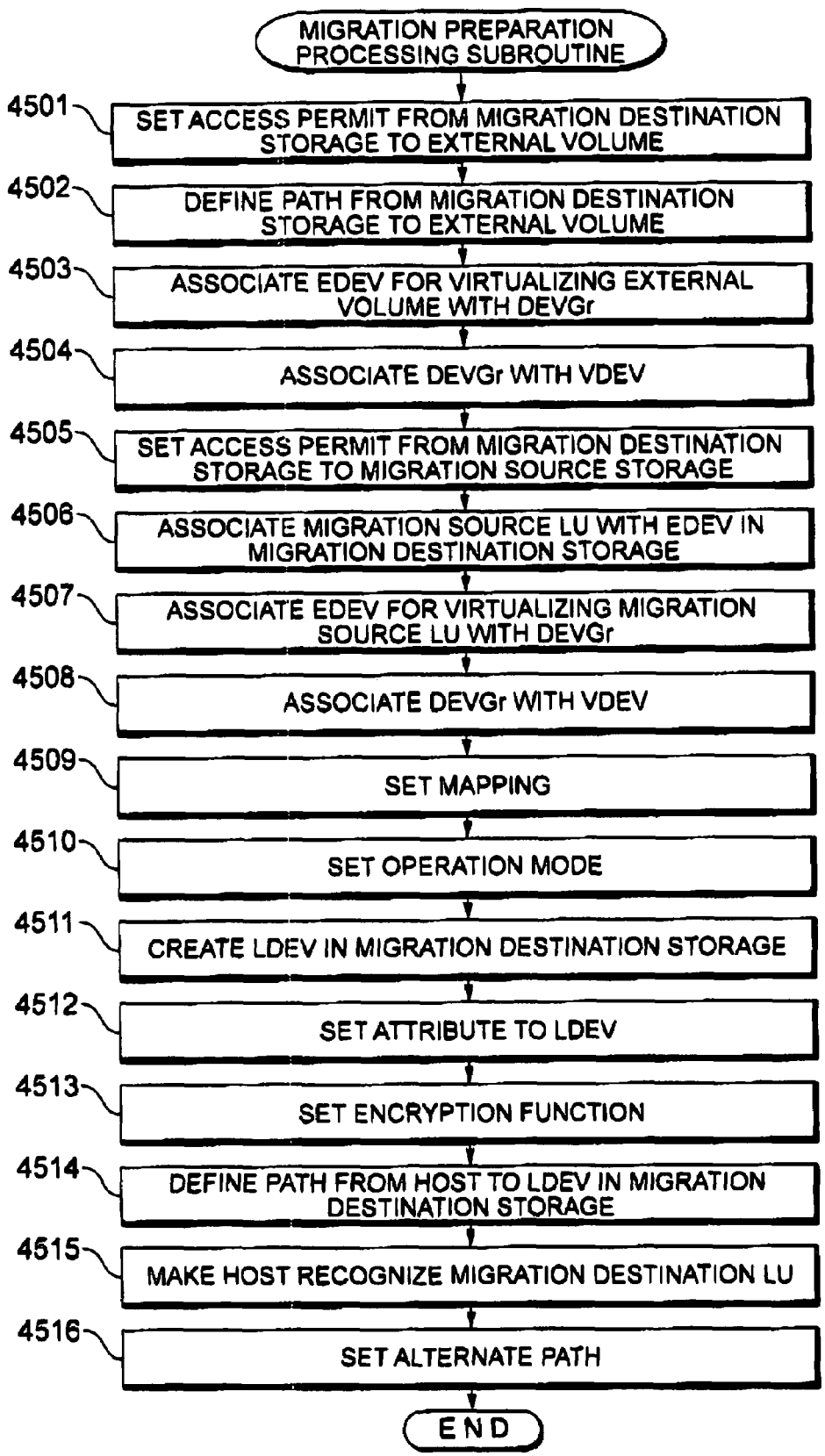
FIG. 45 is an explanatory diagram showing the migration preparation processing subroutine.

FIG. 45 shows the migration preparation processing subroutine. When the migration preparation processing subroutine is activated, the storage system 130*a* sets an access permit from the storage system 130*b* to the external volume (step 4501).

The storage system 130*b* defines a path for connecting from the storage system 130*b* to the external volume, and creates a first expansion device (corresponds to the expansion device 206*b* in FIG. 1) for virtualizing the external volume in the storage system 130*b* (step 4502).

The storage system 130*b* associates the first expansion device in the storage system 130*b* with the device group in the storage system 130*b* (step 4503). For example, in an external volume RAID configuration, a plurality of first expansion devices are associated with one device group.

The storage system 130*b* associates the device group, which is associated with the first expansion device in the storage system 130*b*, with the virtual device in the storage system 130*b* (step 4504).

The storage system 130*a* sets an access permit from the storage system 130*b* to the migration source logical unit in the storage system 130*a* (step 4505).

The storage system 130*b* associates a second expansion device (corresponding to the expansion device 206*c* of FIG. 1) in the storage system 130*b* with the logical unit to become the migration target in the storage system 130*a* (step 4506).

For example, when the logical unit to be migrated has an external volume RAID configuration, the second expansion device in the storage system 130*b* is associated with a part (excluding the storage extents storing parity data and mirror data) of the virtual device in the storage system 130*a*.

For example, when the logical unit to be migrated has a CVS configuration, the second expansion device in the storage system 130*b* is associated with a part of the virtual device in the storage system 130*a*.

For example, when the logical unit to be migrated has a LUSE configuration, the second expansion device in the storage system 130*b* is associated with a plurality of virtual devices in the storage system 130*a*.

For example, when the logical unit to be migrated is a VMA volume, the second expansion device in the storage system 130*b* is associated with a part (user extent) of the virtual device in the storage system 130*a*.

The storage system 130*b* associates the second expansion device in the storage system 130*b* with the device group in the storage system 130*b* (step 4507).

The storage system 130*b* associates the device group, which is associated with the second expansion device in the storage system 130*b*, with the virtual device in the storage system 130*b* (step 4508).

For example, when the logical unit to be migrated has an external volume RAID configuration, the second expansion device in the storage system 130*b* is associated with a part (excluding the storage extents storing parity data and mirror data) of the virtual device in the storage system 130*b*.

For example, when the logical unit to be migrated has a CVS configuration, the second expansion device in the storage system 130*b* is associated with a part of the virtual device in the storage system 130*b*.

For example, when the logical unit to be migrated has a LUSE configuration, the second expansion device in the storage system 130*b* is associated with a plurality of virtual devices in the storage system 130*b*.

For example, when the logical unit to be migrated is a VMA volume, the second expansion device in the storage system 130*b* is associated with a part (user extent) of the virtual device in the storage system 130*b*.

The storage system 130*b* invalidates the mapping relation between the device group in the storage system 130*b* associated with the first expansion device and the virtual device in the storage system 130*b*, and activates the mapping relation between the device group in the storage system 130*b* associated with the second expansion device and the virtual device in the storage system 130*b* (step 4509).

The storage system 130*b* sets the operation mode of the storage system 130*b* to a cache through mode, and sets the operation mode of the storage system 130*a* to a write after mode (step 4510).

The storage system 130*b* creates a logical unit to be migrated in the storage system 130*b* (step 4511).

The storage system 130*b* sets access attributes to the logical unit to be migrated (step 4512). As the access attributes, for instance, there are settings relating to the host group and settings relating to the alternate path.

The storage system 130*b* releases the function of encrypting data written from the storage system 130*b* into the external volume (step 4513). Data written in the external volume during the logical unit migration processing is encrypted with the migration source storage system 130*a*.

The storage system 130*b* defines a path for connecting the logical unit to be migrated and the host computer 100 (step 4514). When there are a plurality of logical units to be migrated, a path is defined for connecting the respective logical units to be migrated and the host computer 100.

The storage system 130*b* makes the host computer 100 recognize the logical unit to be migrated (step 4515). When there are a plurality of host computers 100 to use the logical unit to be migrated, the respective host computers 100 are made to recognize the logical unit to be migrated.

The storage system 130*b* sets a path for connecting the logical unit to be migrated and the host computer 100 as an alternate path of a path for connecting the migration source logical unit and the host computer 100 (step 4516).

Figure 46:
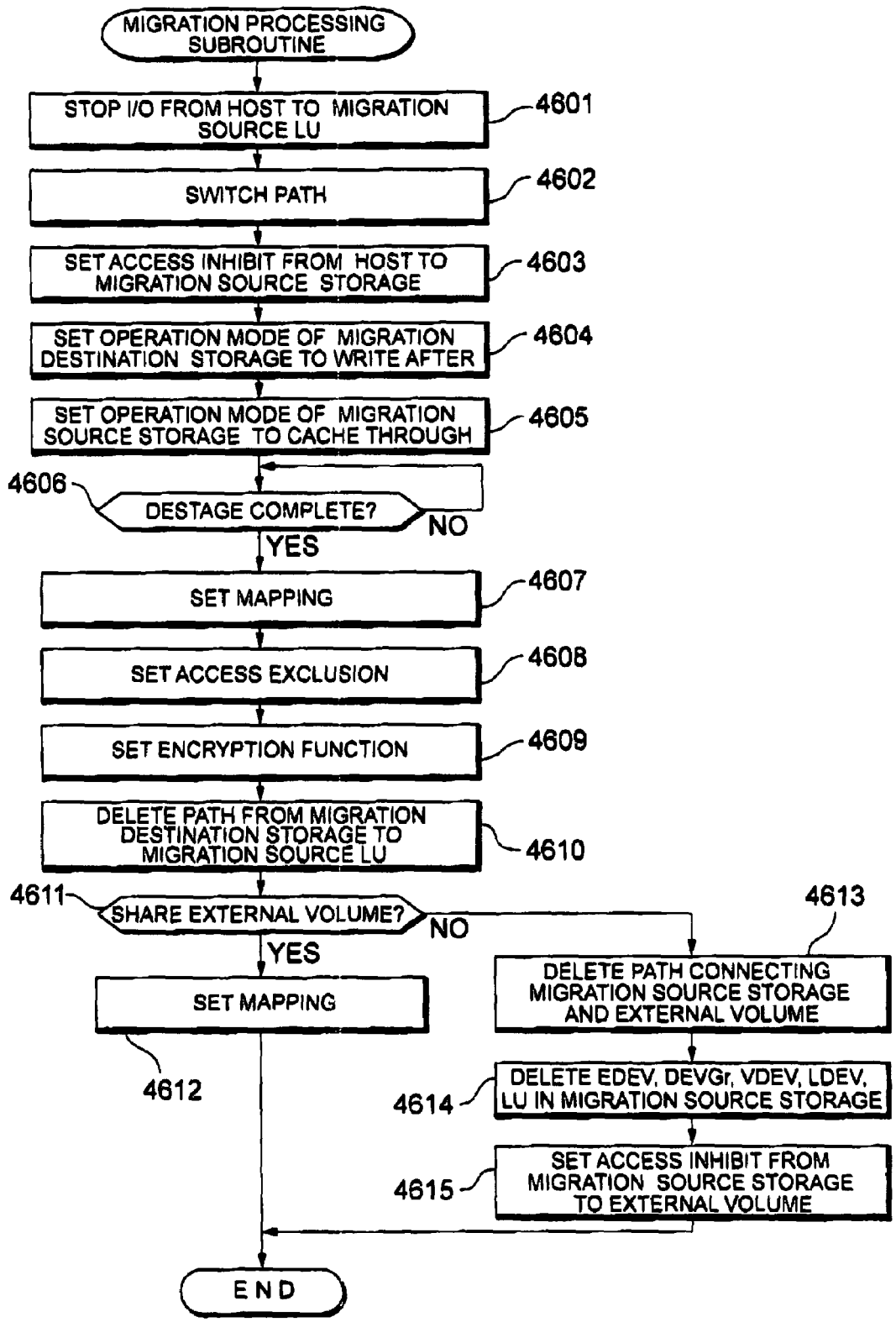
FIG. 46 is an explanatory diagram showing the migration processing subroutine.

FIG. 46 shows the migration processing subroutine. When the migration processing subroutine is activated, the host computer 100 halts the I/O request of the migration source logical unit (step 4601). The storage system 130*a* may also inhibit the I/O request from the host computer 100. When there are a plurality of host computers 100 using the migration source logical unit, the I/O request from the respective host computers 100 to the migration source logical unit is halted or inhibited.

The host computer 100 switches the path for connecting to the migration source logical unit to the path for connecting to the logical unit to be migrated, and deletes the path for connecting to the migration source logical unit (step 4602). When there are a plurality of host computers 100 using the migration source logical unit, the respective host computers 100 simultaneously execute path switching.

The migration source storage system 130*a* inhibits the access from the host computer 100 (step 4603).

The migration target storage system 130*b* releases the cache through mode as the operation mode of the storage system 130*b*, and sets the operation mode to the write after mode (step 4604).

The migration source storage system 130*a* releases the write after mode as the operation mode of the storage system 130*a*, and sets the operation mode to the cache through mode (step 4605).

After destaging all dirty data accumulated in the disk cache of the migration source storage system 130*a* to the external volume (step 4606: YES), the migration target storage system 130*b* invalidates the mapping relation between the device group in the storage system 130*b* associated with the second expansion device and the virtual device in the storage system 130*b*, and activates the mapping relation between the device group in the storage system 130*b* associated with the first expansion device and the virtual device in the storage system 130*b* (step 4607).

The storage system 130*b* permits access from the storage system 130*b* to the external volume on the one hand, and sets the inhibition of access from the storage system 130*a* to the external volume (access exclusive setting) (step 4608).

The storage system 130*b* activates the function for encrypting the data to be written in the external volume (step 4609).

The storage system 130*b* deletes a path for connecting the second expansion device in the storage system 130*b* and the migration source logical unit in the storage system 130*a* (step 4610).

When sharing the external volume with the migration source storage system 130*a* and the migration target storage system 130*b* (for instance, when the migration source logical unit has a CVS configuration) (step 4611; YES), the migration source storage system 130*a* invalidates the mapping relation between the logical unit after the migration processing and the virtual device in the storage system 130*a* (step 4612).

When the external volume is not to be shared with the migration source storage system 130*a* and the migration target storage system 130*b* (step 4611; NO), the storage system 130*a* deletes the path for connecting the storage system 130*a* and the external volume (step 4613).

The migration source storage system 130*a* deletes the expansion device created in the storage system 130*a* for virtualizing the external volume, the device group associated with such expansion device, the virtual device associated with such device group, the logical device associated with such virtual device, the logical unit associated with such logical device, and all paths connecting such logical unit and the host computer 100 (step 4614).

The external storage system 150 inhibits access from the storage system 130*a* to the external volume (step 4615).

Figure 47:
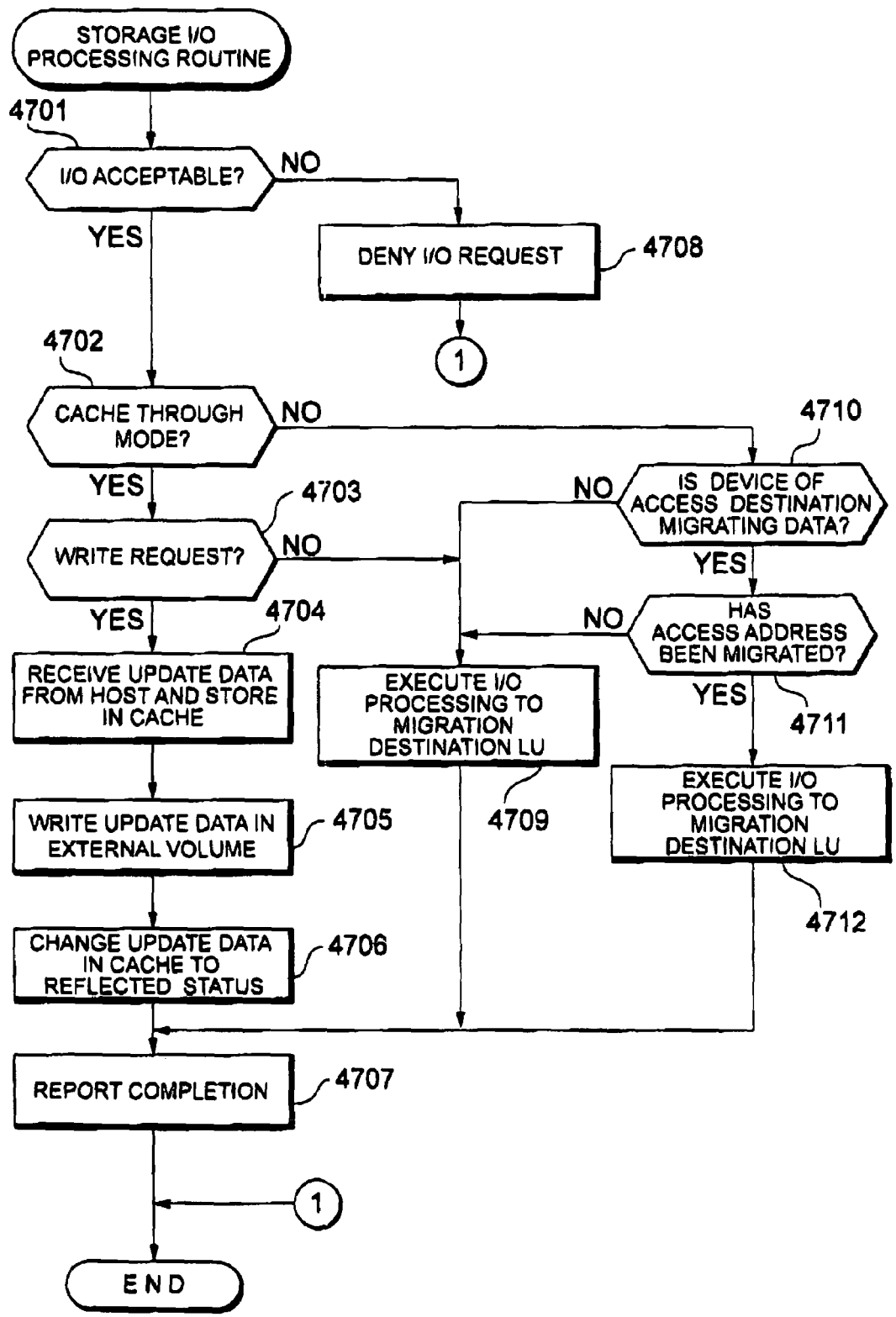
FIG. 47 is an explanatory diagram showing the storage I/O processing routine.

FIG. 47 shows the storage I/O processing routine. The storage I/O processing routine is executed with the storage I/O processing program 221.

The storage system 130 that received an I/O request from the host computer 100 refers to the logical device management information 603, and confirms the access right of the host computer 100 (step 4701).

When the host computer 100 does not have an access right (step 4701; NO), the storage system 130 denies the I/O request (step 4708).

When the host computer 100 has an access right (step 4701; YES), the storage system 130 refers to the logical device management information 603 and determines whether a cache through mode is set (step 4702).

When the operation mode of the storage system 130 is a cache through mode (step 4702; YES), and the I/O request from the host computer 100 is a write request (step 4703; YES), the storage system 130 writes the data received from the host computer 100 in the disk cache 134 (step 4704).

Thereafter, the storage system 130 writes data in the external volume (step 4705), updates the management information of cache data to destage complete (step 4706), and issues a write completion report to the host computer 100 (step 4707).

When the operation mode of the storage system 130 is not a cache through mode (step 4702; NO), the storage system 130 determines whether the logical unit of the access destination is being migrated (step 4710).

When the logical unit of the access destination is not being migrated (step 4710; NO), the storage system 130 executes I/O processing to the migration source logical unit (step 4709), and issues a write completion report to the host computer 100 (step 4707).

Meanwhile, when the logical unit of the access destination is being migrated (step 4710; YES), the storage system 130 determines whether the migration of the storage extent corresponding to the access address is complete (step 4711).

When the migration of the storage extent corresponding to the access address is incomplete (step 4711; NO), the storage system 130 executes I/O processing to the migration source logical unit (step 4709), and issues a write completion report to the host computer 100 (step 4707).

When the migration of the storage extent corresponding to the access address is complete (step 4711; YES), the storage system 130 executes I/O processing to the logical unit of the migration destination (step 4712), and issues a write completion report to the host computer 100 (step 4707).

Figure 48:
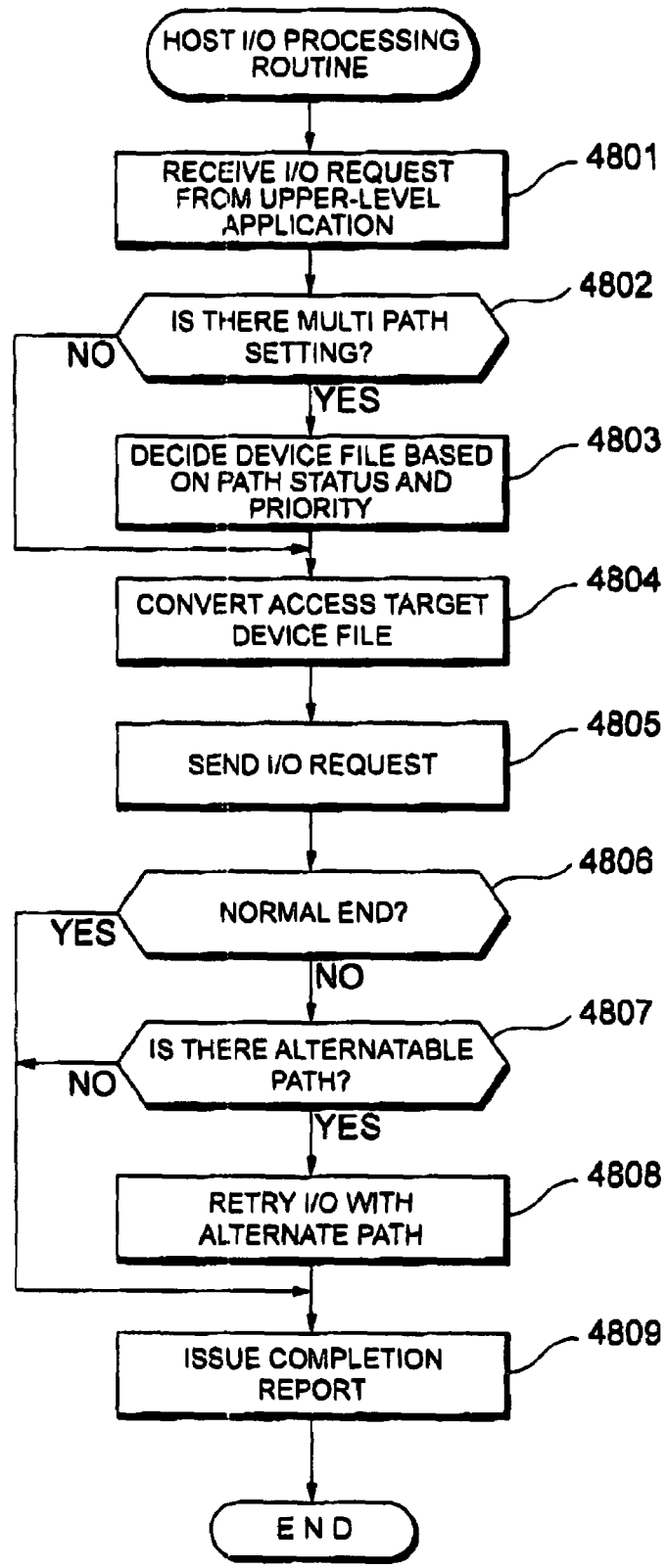
FIG. 48 is an explanatory diagram showing the host I/O processing routine.

FIG. 48 shows the host I/O processing routine. The host I/O processing routine is executed with the host I/O processing program 261 in the host computer 100.

The host computer 100 receives an I/O request to the device file corresponding to the logical unit of the storage system 130 from the application program executed in the host computer 100 (step 4801).

The host computer 100 refers to the device path management information 251, and determines whether a plurality of paths (multi path) are set in the device file of the access destination (step 4802).

When a plurality of paths are not set (step 4802; NO), the host computer 100 proceeds to the processing at step 4804 with the designated device file as the access target.

When a plurality of paths are set (step 4802; YES), the host computer 100 decides the device file to be accessed based on the status of the respective paths and the priority of I/O sorting (step 4803).

Subsequently, the host computer 100 converts the device file to be accessed and calculates the identifier and LUN of the storage system 130 and the port 131 (step 4804).

The host computer 100 sends an I/O request to the storage system 130 of the access destination (step 4805).

When the I/O processing ends normally (step 4806; YES), the host computer 100 issues an I/O processing completion report to the application program (step 4809).

When the I/O processing does not end normally (step 4806; NO), the host computer 100 checks the existence of an alternate path (step 4807).

When there is an alternate path (step 4807; YES), the host computer 100 reissues the I/O processing request to the storage system 130 by way of the alternate path (step 4808), and issues an I/O processing completion report to the application program (step 4809).

When there is no alternate path (step 4807; NO), the host computer 100 issues an I/O processing completion report to the application program (step 4809).

Figure 49:
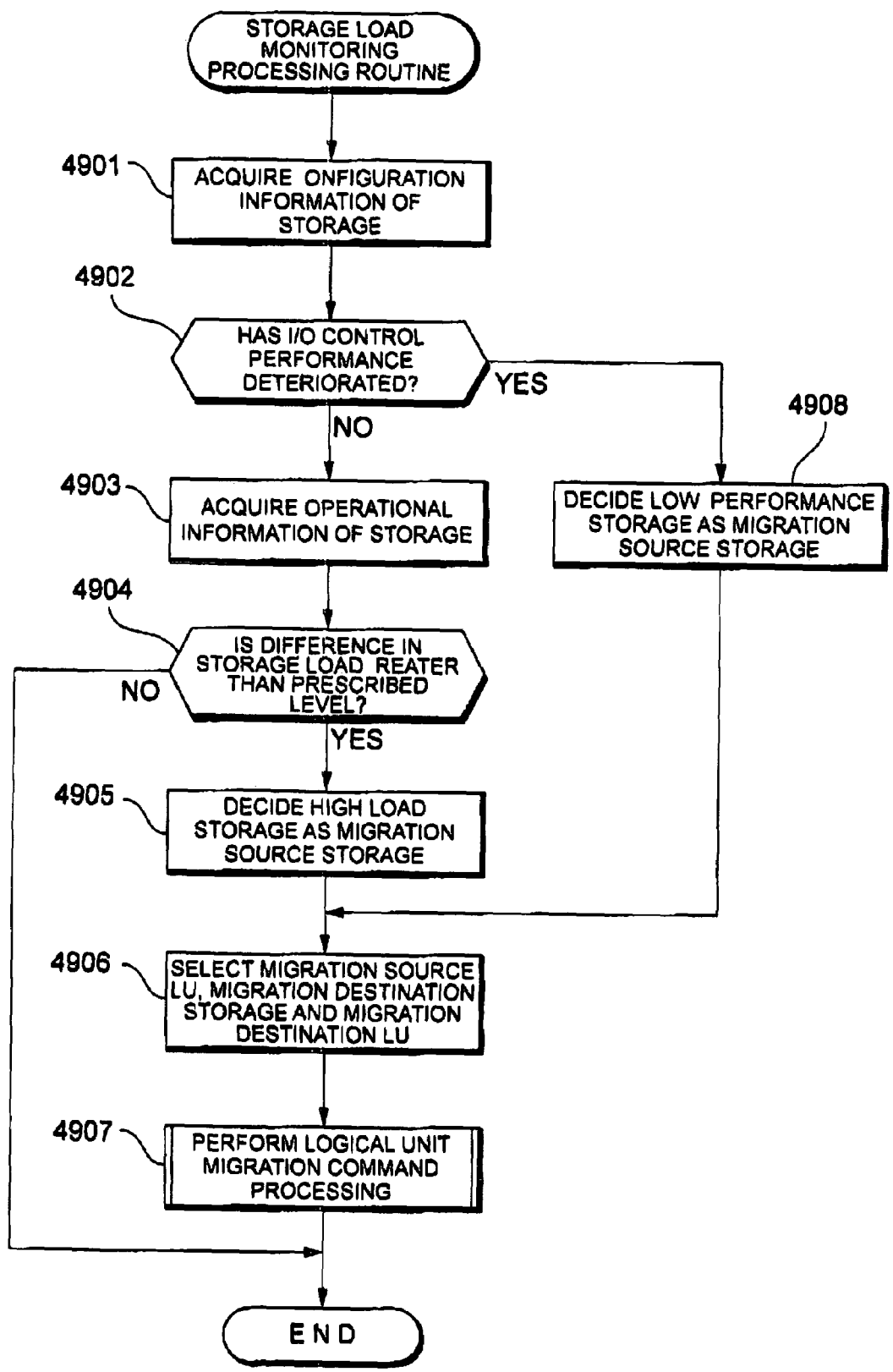
FIG. 49 is an explanatory diagram showing the storage load monitoring processing routine.

FIG. 49 shows the storage load monitoring processing routine. The storage load monitoring processing routine is executed for the purpose of checking the load of the respective storage systems 130, and migrating a logical unit in the storage system 130 in a high load status or performance deterioration status to another storage system 130. The storage load monitoring processing routine is executed with the storage load monitoring program 242 in the management server 110.

The management server 110 periodically acquires the configuration information of the storage system 130 by way of the IP network 175 (step 4901), and checks whether there is a malfunction in the configuration of the respective storage systems 130 (step 4902).

When the I/O processing performance of a certain storage system 130 deteriorates due to a failure in the disk cache 134 or the control processor 132 (step 4902), the management server 110 decides the storage system 130 encountering performance deterioration as the migration source storage system 130a (step 4908).

When a storage system 130 encountering performance deterioration cannot be detected (step 4902, NO), the management server 110 periodically acquires operational information such as the I/O frequency from the respective storage systems 130 to the respective logical devices, and utilization ratio of the respective control processors 132 or the disk cache 134 (step 4903).

When the difference in the I/O load between the respective storage system 130 is above a prescribed level (step 4904; YES), the management server 110 decides the storage system 130 of a high load status as the migration source storage 130a (step 4905).

The management server 110 selects a logical to become the migration source in relation to the migration source storage 130a selected at step 4905 or step 4908, selects the migration target storage 130b and selects the logical unit to be migrated (step 4906), and commands the storage systems 130a, 130b to migrate the logical unit (step 4907).

As a result of monitoring the load of the respective storage systems 130 configuring the computer system 500 with the storage load monitoring processing routine, when a failure occurs in a certain storage system 130 due to the malfunction of the disk cache 134 or the control processor 132, or the I/O processing performance of the storage system 130 deteriorates due to some reason, it is possible to maximize the I/O processing performance of the overall computer system 500 by switching the control role of the external volume to a storage system 130 in a normal status or low load status.

Another method of the logical unit migration processing is now explained with reference to FIG. 50 to FIG. 54.

Figure 50:
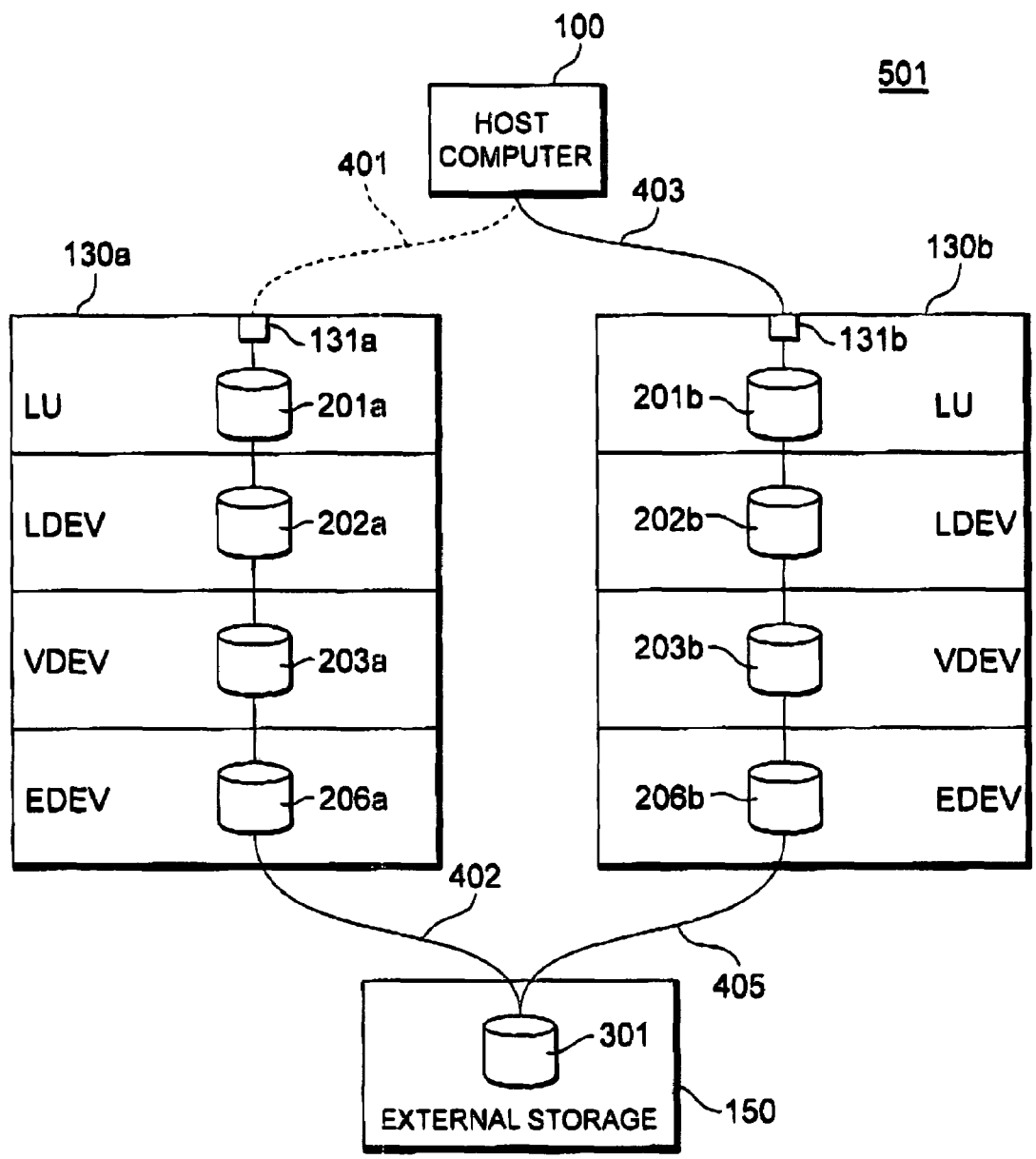
FIG. 50 is an explanatory diagram showing another method of performing logical unit migration processing.

FIG. 50 shows the system configuration of a computer system 501. The computer system 501 has a host computer 100, storage systems 130a, 130b, and an external storage system 150. The systems which are the same as those shown in FIG. 1 are given the same reference numeral, and the detailed explanation thereof is omitted.

The operation mode of the storage system 130a is set to a cache through mode, and data to be stored in the external volume 301 is constantly kept up to date. The host computer 100 is able to migrate the logical unit 201a to the logical unit 201b by merely switching the access path from the path 401 to the path 403 without having to switch the mapping of the devices.

Incidentally, when the operation mode of the storage system 130a is set to a write after mode, the I/O request from the host computer 100 to the storage system 130a is temporarily halted, and the dirty data accumulated in the disk cache of the storage system 130a is destaged to the external volume 301. Thereafter, the host computer 100 is able to migrate the logical unit 201a to the logical unit 201b by merely switching the access path from the path 401 to the path 403 without having to switch the mapping of the devices.

Figure 51:
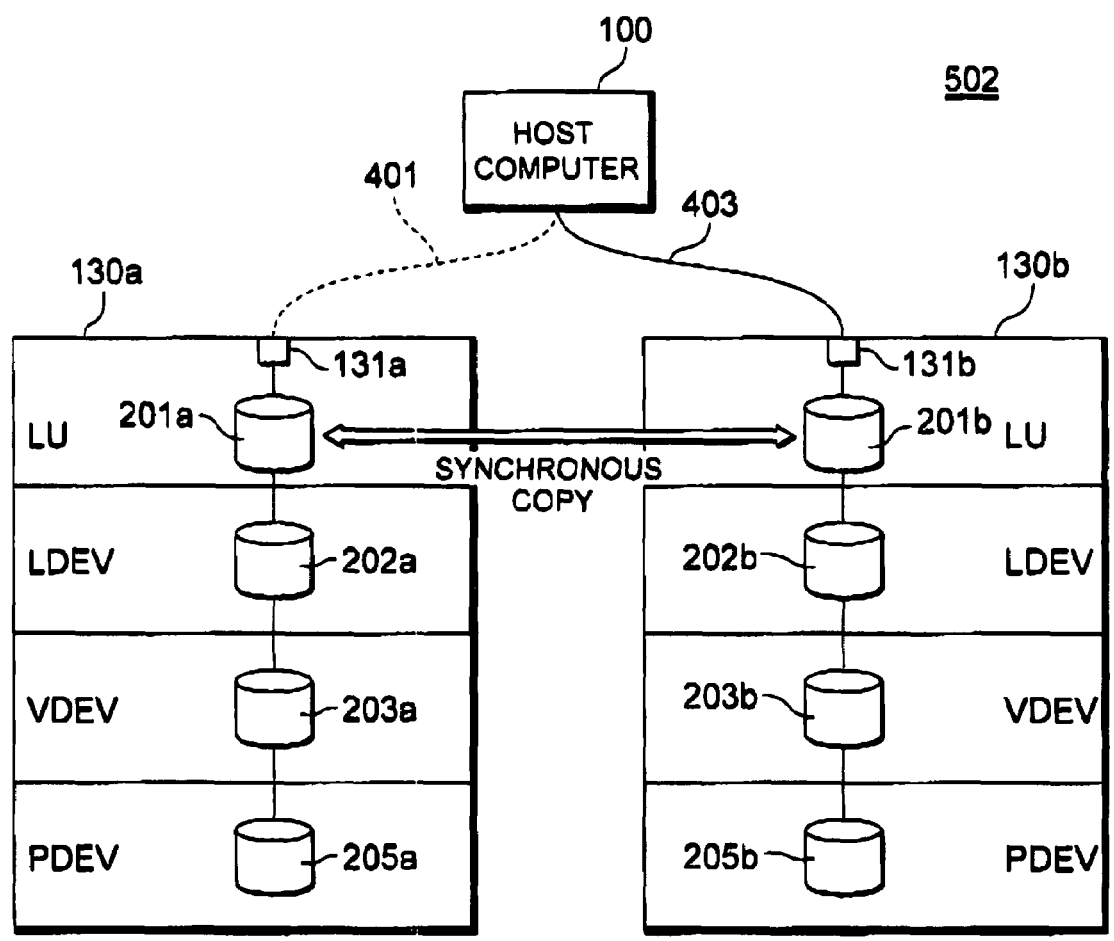
FIG. 51 is an explanatory diagram showing another method of performing logical unit migration processing.

FIG. 51 shows the system configuration of a computer system 502. The computer system 502 has a host computer 100, and storage systems 130a, 130b. The storage system 130a has a physical device 205a associated with a storage resource having a real storage extent such as a disk drive, and virtualizes the physical device 205a as the logical unit 201a via the respective storage hierarchies (PDEV/VDEV/LDEV/LU). Meanwhile, the storage system 130b has a physical device 205b associated with a storage resource having a real storage extent such as a disk drive, and virtualizes the physical device 205b as the logical unit 201b via the respective storage hierarchies (PDEV/VDEV/LDEV/LU). The logical unit 201*b* is scheduled to become the migration destination of the logical unit 201*a*.

In the computer system 502, a copy pair for performing synchronous copy between the migration source logical unit 201*a* and the migration target logical unit 201*b* is set. By setting a copy pair like this, data written from the host computer 100 to the logical unit 201*a* (actually the disk cache) is written in the logical unit 201*b* actually the disk cache) by way of a path (not shown) on the storage network, and a write completion report is thereafter issued to the host computer 100.

When a failure occurs in the storage system 130*a*, the host computer 100 is able to migrate the logical unit 201*a* to the logical unit 201*b* merely by switching the access path from the path 401 to the path 403 without having to switch the mapping of the devices.

Figure 52:
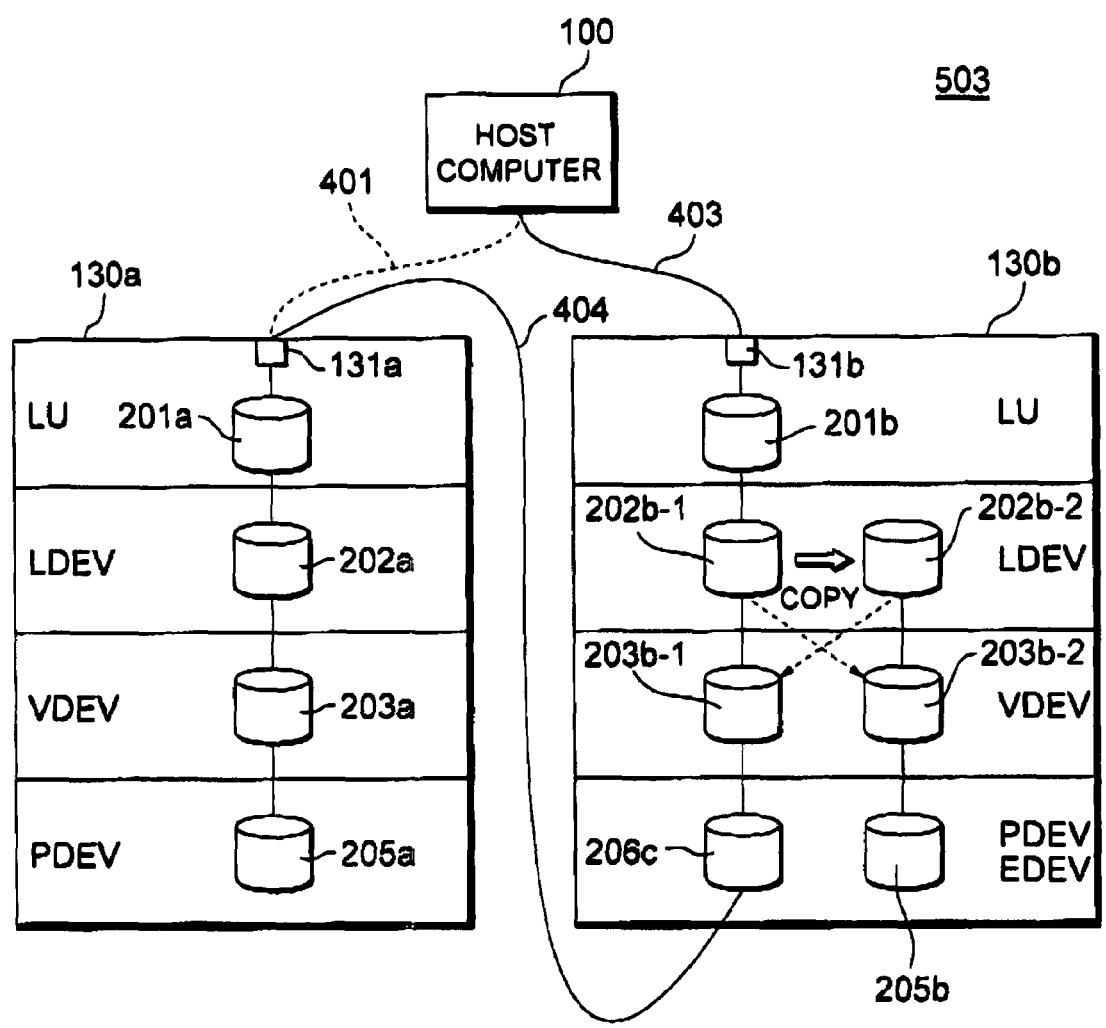
FIG. 52 is an explanatory diagram showing another method of performing logical unit migration processing.

FIG. 52 shows the system configuration of a computer system 503. The computer system 503 has a host computer 100, and storage systems 130*a*, 130*b*. The systems which are the same as those shown in FIG. 51 are given the same reference numeral, and the detailed explanation thereof is omitted.

The outline of processing for migrating data of the logical unit 201*a* (migration source logical unit) in the storage system 130*a* (migration source storage) to the logical unit 201*b* (migration destination logical unit) in the storage system 130*b* (migration destination storage) is now explained. The logical unit migration processing includes the following processing routine of (1) to (9).

(1) The storage system 130*b* defines a path 404 for externally connecting the migration source logical unit 201*a* and the migration target storage system 130*b*, and creates an expansion device 206*b* for virtualizing the logical unit 201*a* in the storage system 130*b*.

(2) The storage system 130*b* creates virtual devices 203*b*-1, 203*b*-2 having a logical configuration that is the same as the logical configuration of the virtual device 203*a* in the storage system 130*b*.

(3) The storage system 130*b* creates logical devices 202*b*-1, 202*b*-2 having a logical configuration that is the same as the logical configuration of the logical device 202*a* in the storage system 130*b*.

(4) The storage system 130*b* maps the expansion device 206*b* to the virtual device 203*b*-1, and further maps the physical device 205*b* to the virtual device 203*b*-2.

(5) The storage system 130*b* maps the virtual device 203*b*-1 to the logical device 202*b*-1, and further maps the virtual device 203*b*-2 to the logical device 202*b*-2.

(6) The storage system 130*b* creates a logical unit 201*b* having a logical configuration that is the same as the logical configuration of the logical unit 201*a* in the storage system 130*b*, and defines a path 403 for connecting the host computer 100 and the logical unit 201*b*. The logical device 202*b*-1 is mapped to the logical unit 201*b*.

(7) The host computer 100 switches the access path from the path 401 to the path 403. Here, access from the host computer 100 to the logical unit 201*a* is inhibited such as by deleting the path 401. Incidentally, path switching from the path 401 to the path 403 may also be conducted by the storage systems 130*a*, 130*b*, or the management server 110. Further, it is not necessarily the case that the path 401 needs to be deleted, and, for instance, the path 401 may be set as an alternate path (for instance, a path to be used during system failure) of the path 403, and the path 401 may be left as is with the path 401 in an invalid state.

(8) The storage system 130*b* copies the logical device 202*b*-1 to the logical device 202*b*-2. As a result of the foregoing processing, it is possible to synchronize the physical device 205*a* and the physical device 205*b*.

Incidentally, the data I/O path from the host computer 100 to the storage system 130*b* during the logical unit migration processing will be path 403→storage hierarchy (LU/LDEV/VDEV/EDEV) in the storage system 130*b*→path 404→storage hierarchy (LU/LDEV/VDEV/PDEV) in the storage system 130*a*.

(9) If the storage system 130*b* is able to synchronize the physical device 205*a* and the physical device 205*b*, it releases the mapping relation between the virtual device 203*b*-2 and the logical device 202*b*-2, and maps the virtual device 203*b*-2 to the logical device 202*b* 1. Further, the storage system 130*b* releases the mapping relation between the virtual device 203*b*-1 and the logical device 202*b*-1, and maps the virtual device 203*b*-1 to the logical device 202*b*-2. Further, the storage system 130*b* deletes the path 404.

Figure 53:
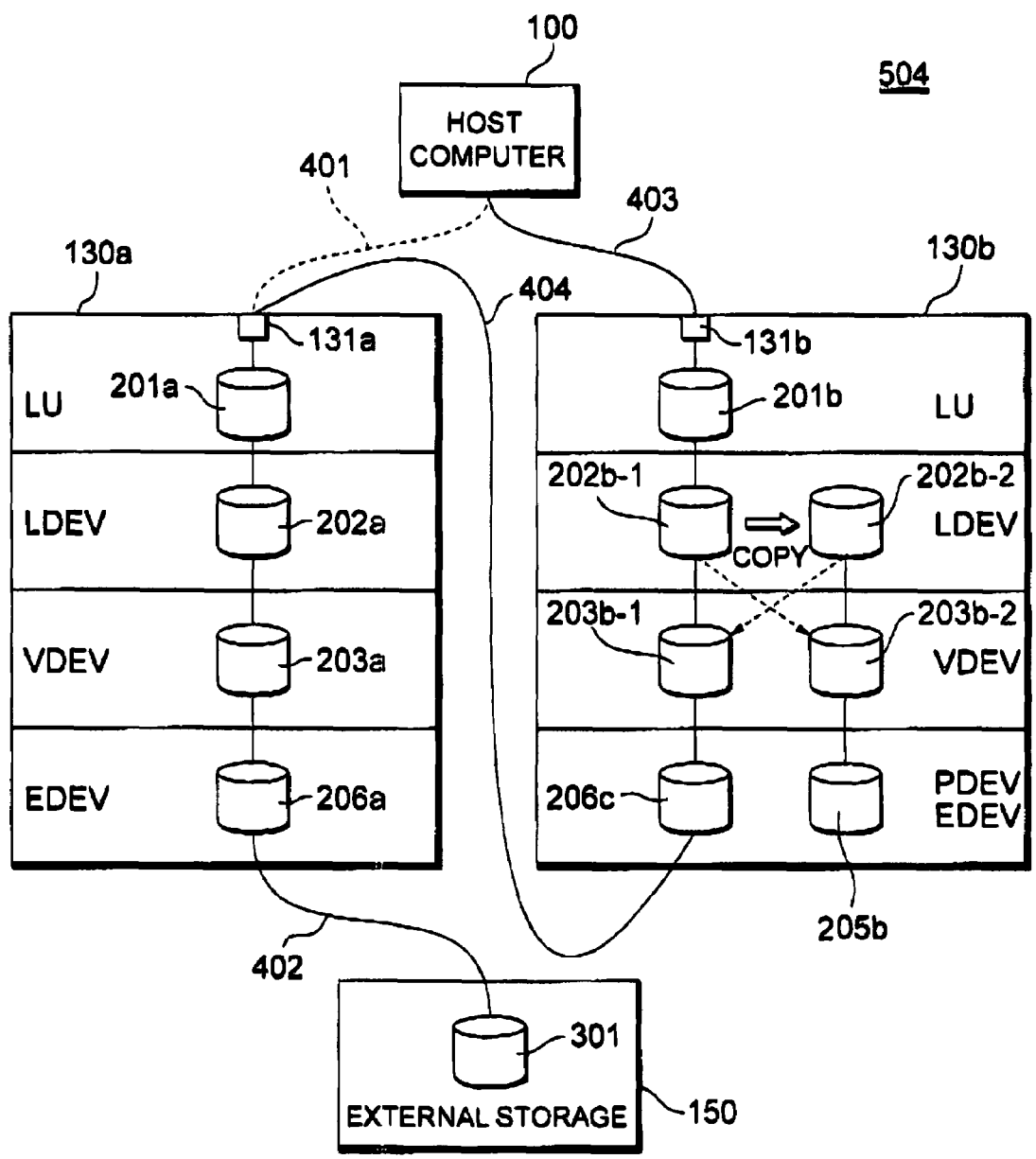
FIG. 53 is an explanatory diagram showing another method of performing logical unit migration processing.

FIG. 53 shows the system configuration of a computer system 504. The computer system 504 has a host computer 100, storage systems 130*a*, 130*b*, and an external storage system 150. The systems which are the same as those shown in FIG. 52 are given the same reference numeral, and the detailed explanation thereof is omitted.

The primary difference between the computer system 504 and the foregoing computer system 503 is as follows. In other words, the storage system 130*a* has an expansion device 206*a* in substitute for the physical device 205*a*. The expansion device 206*a* is a virtual storage extent for virtualizing the external volume 301. The logical unit migration processing routine to be executed by the computer system 504 is the same as the logical unit migration processing routine to be executed by the computer system 503.

Figure 54:
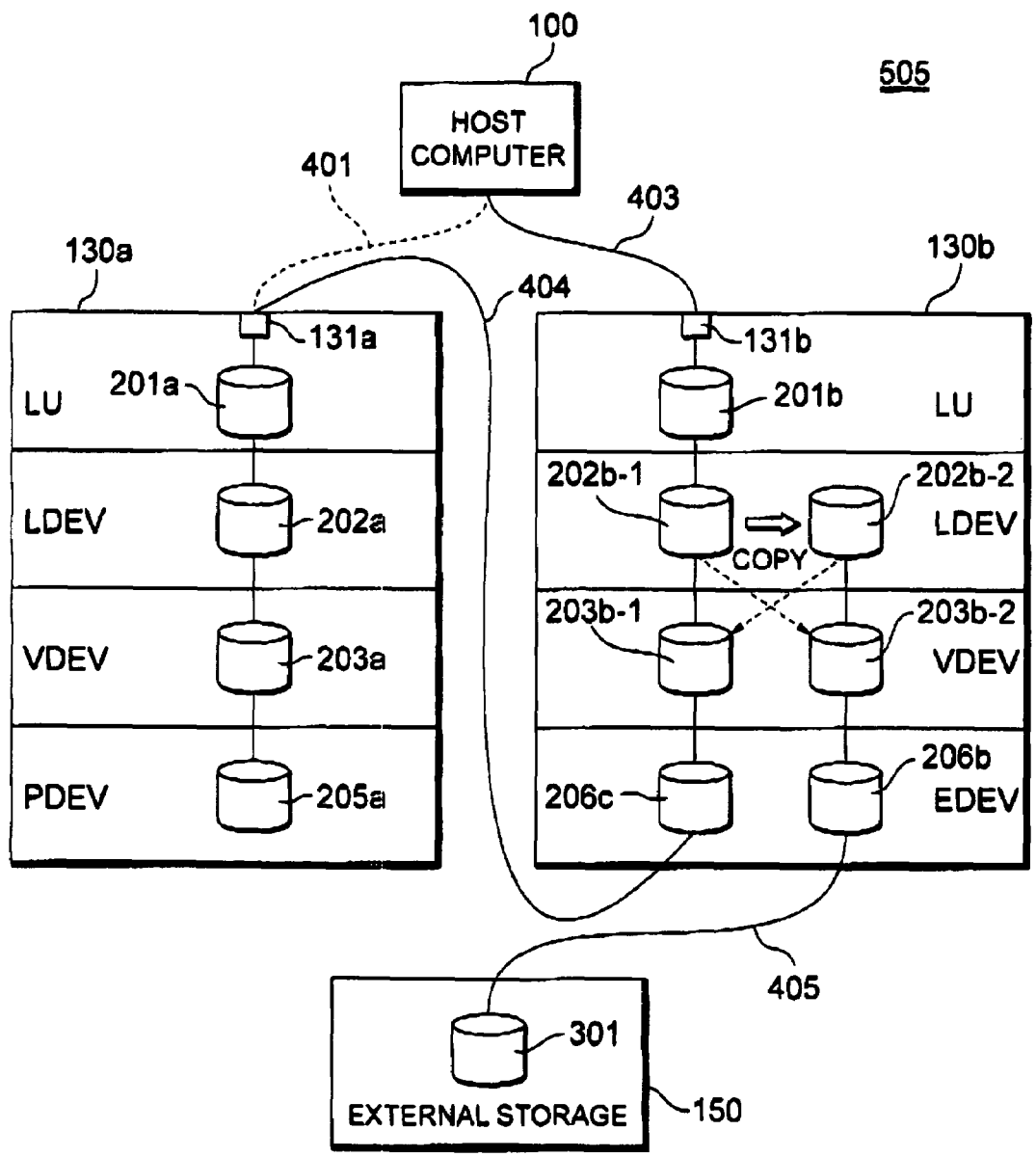
FIG. 54 is an explanatory diagram showing another method of performing logical unit migration processing.

FIG. 54 shows the system configuration of a computer system 505. The computer system 505 has a host computer 100, storage systems 130*a*, 130*b*, and an external storage system 150. The systems which are the same as those shown in FIG. 52 are given the same reference numeral, and the detailed explanation thereof is omitted.

The primary difference between the computer system 505 and the foregoing computer system 503 is as follows. In other words, the storage system 130*a* has an expansion device 206*c* in substitute for the physical device 205*a*. The expansion device 206*c* is a virtual storage extent for virtualizing the external volume 301. The logical unit migration processing routine to be executed by the computer system 505 is the same as the logical unit migration processing routine to be executed by the computer system 503.

The computer systems 506, 507 having a function of migrating a part of the logical unit from the migration source storage to the migration destination storage is now explained with reference to FIG. 55 and FIG. 56.

Figure 55:
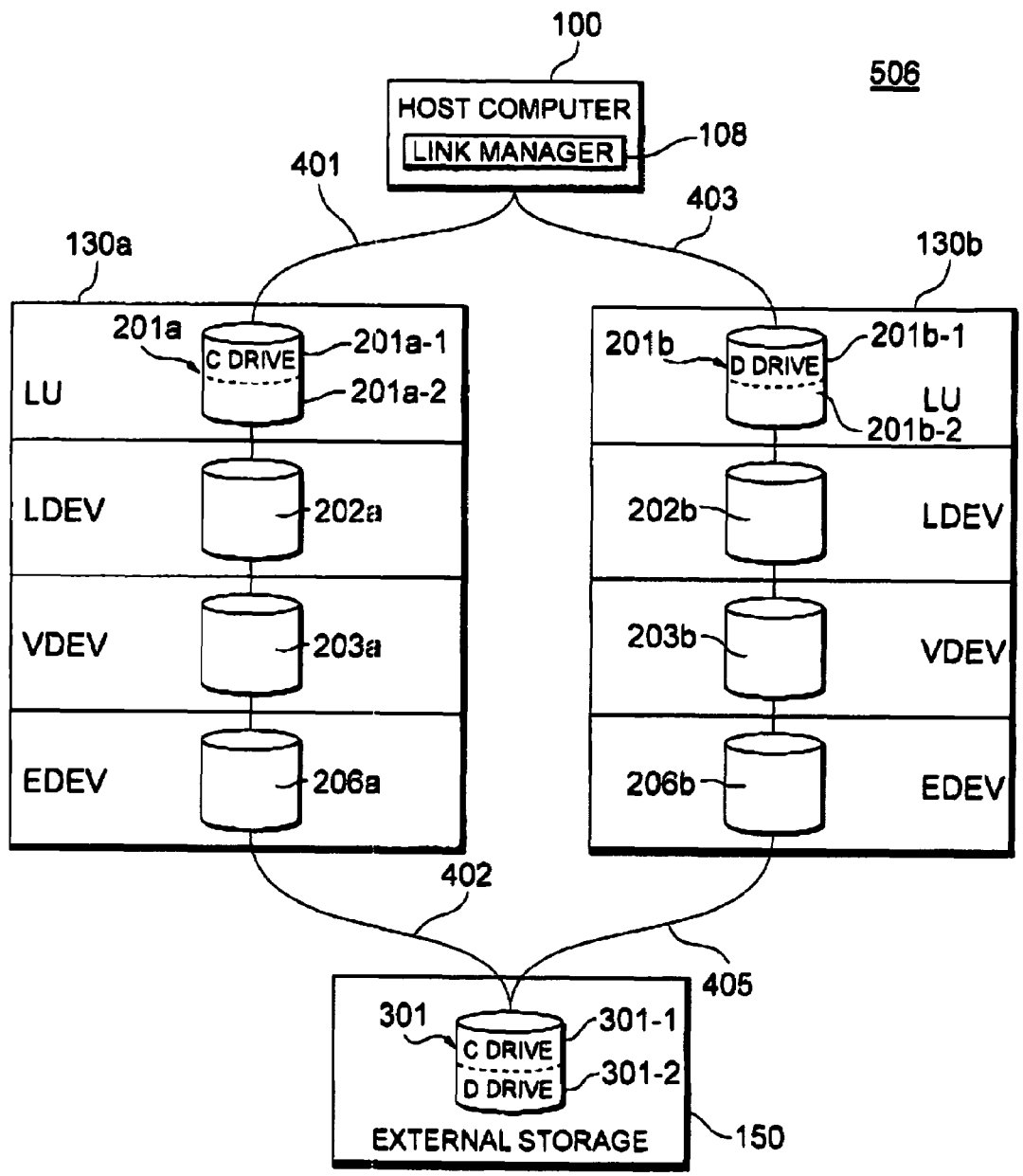
FIG. 55 is an explanatory diagram showing the outline of processing for migrating a part of the logical unit.

FIG. 55 shows the system configuration of a computer system 506. The computer system 506 has a host computer 100, storage systems 130*a*, 130*b*, and an external storage system 150. The systems which are the same as those shown in FIG. 1 are given the same reference numeral, and the detailed explanation thereof is omitted.

The external volume 301 is partitioned into a plurality of storage extents 301-1, 301-2. The respective storage extents 301-1, 301-2 are partitions for partitioning the external volume 301. An independent file system can be created in the respective storage extents 301-1, 301-2. For example, the storage extent 301-1 corresponds to the C drive, and the storage extent 301-2 corresponds to the D drive.

The logical unit 201a provided by the storage system 130a to the host computer 100 via the path 401 is a virtualization of the external volume 301, and is partitioned into a plurality of storage extents 201a-1, 201a-2. The storage extent 201a-1 is a virtualization of the storage extent 301-1. The storage extent 201a. 2 is a virtualization of the storage extent 301-2.

Further, in order to migrate a part (for example, storage extent 201a-2 corresponding to the D drive) of the logical unit 201a from the storage system 130a to the storage system 130b, the logical unit 201a is migrated from the storage system 130a to the storage system 130b based on a routine that is the same as the foregoing processing routine of (1) to (9). The logical information of the logical unit 201b created in the storage system 130b is the same as the logical configuration of the logical unit 201a. In other words, the logical unit 201b provided by the storage system 130b to the host computer 100 via the path 403 is a virtualization of the external volume 301, and is partitioned into a plurality of storage extents 201b-1, 201b-2. The storage extent 201b-1 is a virtualization of the storage extent 301-1. The storage extent 201b-2 is a virtualization of the storage extent 301-2.

Here, by setting the system configuration of the computer system 506 to inhibit access from the host computer 100 to the storage extent 201a-2 and inhibit access from the host computer 100 to the storage extent 201b-1, it will be possible to migrate a part of the logical unit 201a from the storage system 130a to the storage system 130b.

Incidentally, it is necessary to inhibit access from the storage system 130a to the storage extent 301-2, and inhibit access from the storage system 130b to the storage extent 301-1.

The link manager 108 in the host computer 100 switches the path according to the access destination. For instance, the link manager 108 selects the path 401 when the host computer 100 is to access the C drive, and selects the path 403 when the host computer 100 is to access the D drive.

Figure 56:
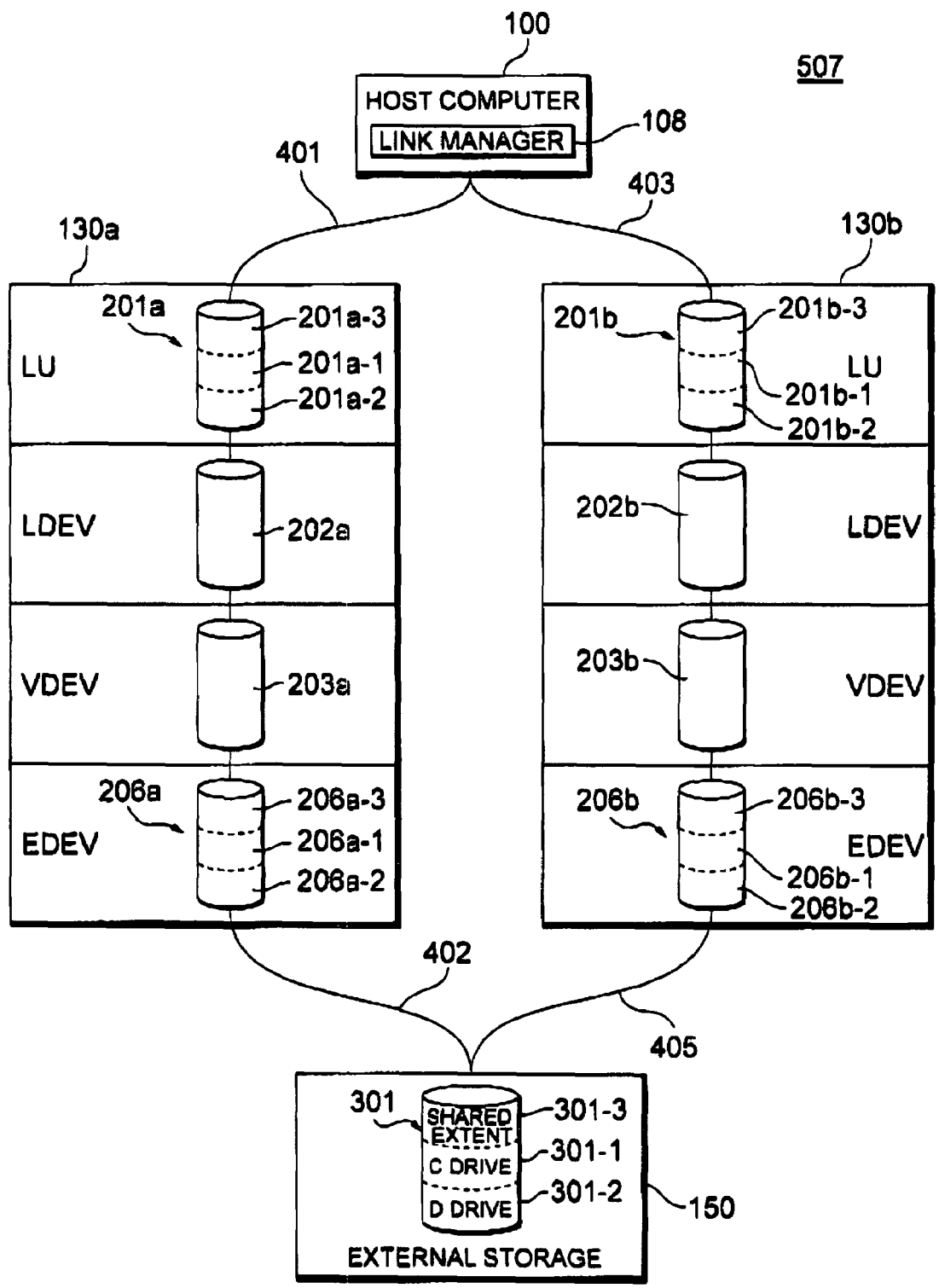
FIG. 56 is an explanatory diagram showing the outline of processing for migrating a part of the logical unit.

FIG. 56 shows the system configuration of a computer system 507. The computer system 507 has a host computer 100, storage systems 130a, 130b, and an external storage system 150. The systems which are the same as those shown in FIG. 55 are given the same reference numeral, and the detailed explanation thereof is omitted.

The basic system configuration of the computer system 507 is roughly the same as the system configuration of the computer system 506, and differences of the two will be mainly explained. The external volume 301 is partitioned into a plurality of storage extents 301-1, 301-2, 301-3. The storage extent 301-3 is a shared extent virtualized with the respective logical units 201a a, 201b. The storage extent 201a-3 of the logical unit 201a is a virtualization of the storage extent 301-3 of the external volume 301. Further, the storage extent 201b-3 of the logical unit 201b is a virtualization of the storage extent 301-3 of the external volume 301.

The host computer 100 has two paths as the access path to the storage extent 301-3 as a shared extent of the external volume 301, namely, a path for access via the logical unit 201a, and a path for access via the logical unit 201b. The storage extent 301-3, for instance, stores important data upon the host computer 100 performing business activities. Since the host computer 100 has a plurality of paths for accessing the storage extent 301-3, even if a failure occurs to one of the paths, it will still be able to access the storage extent 301-3 by way of the other path.

Three systems for virtualizing the storage extent 301-3 as a shared extent of the external volume 301 with a plurality of logical units 201a, 201b are now explained.

(1) First System

The operation mode of the respective storage systems 130a, 130b is set to a cache through mode. When the host computer 100 writes data in the storage extent 301-3 as a shared extent of the external volume 301 via the logical unit 201a or the logical unit 201b, a write completion report is issued to the host computer 100 after the data in the storage extent 301-3 is updated. Since data to be stored in the storage extent 301-3 is constantly kept up to date, even if the host computer 100 accesses the shared extent of the external volume 301 via the logical unit 201a, or even if the host computer 100 accesses the shared extent of the external volume 301 via the logical unit 201b, there will be no inconsistent data in the shared extent.

(2) Second System

A copy pair for bidirectionally performing synchronous copy between the storage extent 201a-3 of the logical unit 201a and the storage extent 201b-3 of the logical unit 201b is set. As a result of this setting, when the host computer 100 updates the data in the storage extent 201a-3 of the logical unit 201a in order to update the data of the storage extent 301-3 as the shared extent of the external volume 301, the data in the storage extent 201b-3 of the logical unit 201b is similarly updated. Further, when the host computer 100 updates the data in the storage extent 201b-3 of the logical unit 201b, data in the storage extent 201a-3 of the logical unit 201a is similarly updated.

(3) Third System

The storage extent 206a-3 corresponding to the shared extent among the storage extents of the expansion device 206a for virtualizing the external volume 301 is associated with the storage extent 201a-3 of the logical unit 201a, and is also associated with the storage extent 201b-3 of the logical unit 201b. Similarly, the storage extent 206b-3 corresponding to the shared extent among the storage extents of the expansion device 206b for virtualizing the external volume 301 is associated with the storage extent 201b-3 of the logical unit 201b, and is also associated with the storage extent 201a-3 of the logical unit 201a. Like this, by bidirectionally applying the external connecting technology, when the host computer 100 updates the data in the storage extent 201a-3 of the logical unit 201a, the data in the storage extent 201b-3 of the logical unit 201b is similarly updated. Further, when the host computer 100 updates the data in the storage extent 201b-3 of the logical unit 201b, the data in the storage extent 201a-3 of the logical unit 201a is similarly updated.

Incidentally, in the third system, it is necessary to differentiate the host access and the access via external connection in order to avoid endless loop processing.

Like this, when the external volume 301 is virtualized with a plurality of logical units, a configuration may be adopted where a certain storage extent configuring the external volume 301 is accessible via a certain logical unit, and another storage extent (shared extent) is accessible via a plurality of logical units. Synchronous copy or asynchronous copy may be applied to a storage extent corresponding to a shared extent among the respective storage extents of a plurality of logical units.

The computer systems 508, 509 that have a slightly different system configuration of the computer system 500 from the perspective of high availability are now explained with reference to FIG. 57 and FIG. 58.

Figure 57:
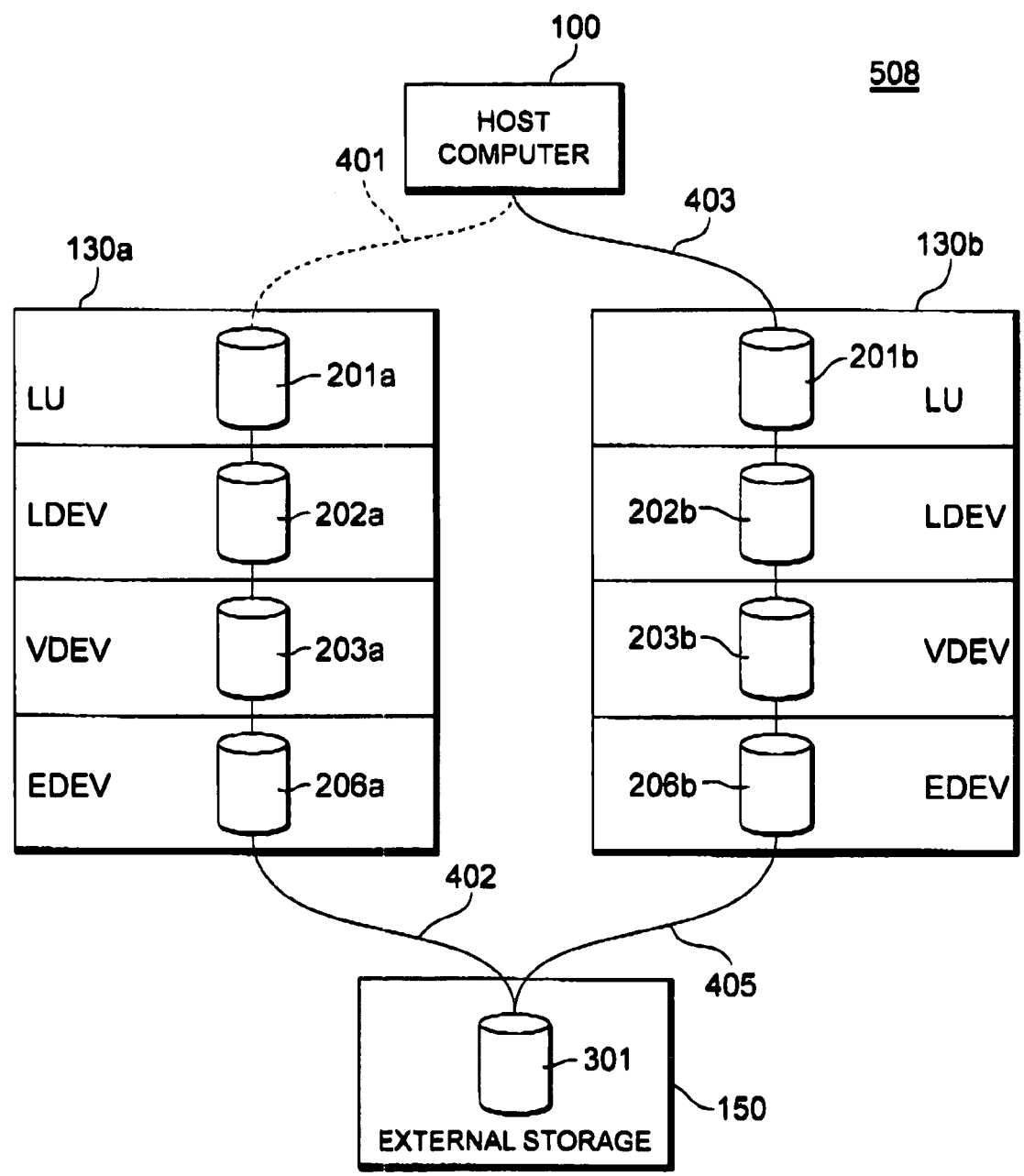
FIG. 57 is a system configuration of the high-availability computer system.

FIG. 57 shows the system configuration of a computer system 508. The computer system 508 has a host computer 100, storage systems 130a, 130b, and an external storage system 150. The host computer 100, the storage systems 130a, 130b, and the external storage system 150 are mutually connected via a storage network (not shown) such as an FC-SAN. The storage system 130a functions as a preferred system (operational system), and the storage system 130b functions as an alternate system (standby system). The storage systems 130a, 130b share the external volume 301 in the external storage system 150.

The storage system 130a has a plurality of storage hierarchies (logical unit 201a, logical device 202a, virtual device 203a, and expansion device 206a) for virtualizing the external volume 301. The expansion device 206a is a virtualization of the external volume 301, and is connected to the external storage system 150 via the path 402. The expansion device 206a is mapped to the virtual device 203a. The virtual device 203a is mapped to the logical device 202a. The logical device 202a is mapped to the logical unit 201a. The logical unit 201a is connected to the host computer 100 via the path 401. The operation mode of the storage system 130a is set to a cache through mode, and the external volume 301 constantly stores latest data accompanying the host access.

Meanwhile, the storage system 130b has a plurality of storage hierarchies (logical unit 201b, logical device 202b, virtual device 203b, and expansion device 206b) for virtualizing the external volume 301. The expansion device 206b is a virtualization of the external volume 301, and is connected to the external storage system 150 via the path 405. The expansion device 206b is mapped to the virtual device 203b. The virtual device 203b is mapped to the logical device 202b. The logical device 202b mapped to the logical unit 201b. The logical unit 201b is connected to the host computer 100 via the path 403. The path 403 is in an alternate path relation with the path 401. The operation mode of the storage system 130b may be a cache through mode, or a write after mode.

Incidentally, in the foregoing system configuration, when a failure occurs in the preferred storage system 130a, the host computer 100 switches the path 401 to the path 403, and issues an I/O request to the alternate storage system 130b. Since the operation mode of the storage system 130a is set to a cache through mode as described above, the disk cache in the storage system 130a does not contain data that has not been destaged to the external volume 301. Thus, when the host computer 100 detects that a failure has occurred in the preferred storage system 130a, is it able to immediately switch the destination of issuing the I/O request to the alternate storage system 130b.

Figure 58:
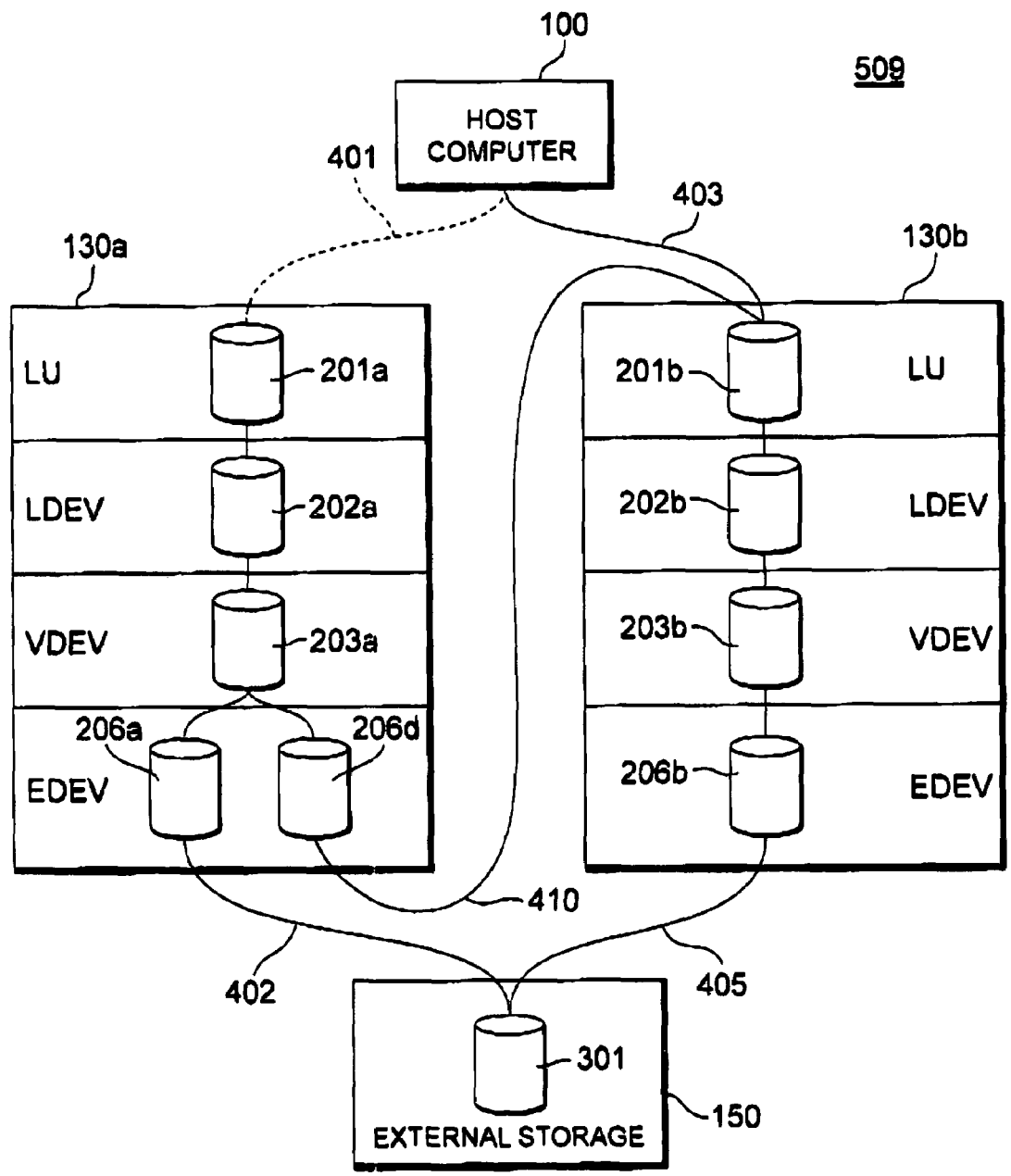
FIG. 58 is a system configuration of the high-availability computer system.

FIG. 58 shows the system configuration of a computer system 509. The computer system 509 has a host computer 100, storage systems 130a, 130b, and an external storage system 150. The systems which are the same as those shown in FIG. 57 are given the same reference numeral, and the detailed explanation thereof is omitted.

The storage system 130a has a plurality of storage hierarchies (logical unit 201a, logical device 202a, virtual device 203a, and expansion devices 206a, 206d) for virtualizing the external volume 301. The expansion device 206a is a virtualization of the external volume 301, and is connected to the external storage system 150 via the path 402. The expansion device 206a is a virtualization of the logical unit 201b, and is connected to the storage system 130b via the path 410. The expansion devices 206a, 206d are mapped to the virtual device 203a. The virtual device 203a is mapped to the logical device 202a. The logical device 202a is mapped to the logical unit 201a. The logical unit 201a is connected to the host computer 100 via the path 401.

Meanwhile, the storage system 130b has a plurality of storage hierarchies (logical unit 201b, logical device 202b, virtual device 203b, and expansion device 206b) for virtualizing the external volume 301. The expansion device 206b is a virtualization of the external volume 301, and is connected to the external storage system 150 via the path 405. The expansion device 206b is mapped to the virtual device 203b. The virtual device 203b is mapped to the logical device 202b. The logical device 202b mapped to the logical unit 201b. The logical unit 201b is connected to the host computer 100 via the path 403. The path 403 is in an alternate path relation with the path 401.

The three systems for increasing the availability of the computer system 509 are now explained.

(1) First System

The respective operation modes of the preferred storage system 130a and the alternate storage system 130b are set to a cache through mode. Then, the data I/O path from the host computer 100 to the logical unit 201a will be path 401→storage hierarchy (LU/LDEV/VDEV/EDEV) in the storage system 130a→path 410→storage hierarchy (LU/LDEV/VDEV/EDEV) in the storage system 130b→path 405→external volume 301. Nevertheless, as a path for performing read access from the host computer 100 to the logical unit 201a, for instance, a path that will be path 401→storage hierarchy (LU/LDEV/VDEV/EDEV) in the storage system 130a→path 402→external volume 301 may be employed.

According to the first system, since the external volume 301 will constantly store latest data accompanying the host access, even if a failure occurs in the preferred storage system 130a, the host computer 100 will be able to immediately use the alternate storage system 130b by immediately switching from the path 401 to the path 403.

(2) Second System

The data I/O operation between the logical unit 201a in the preferred storage system 130a and the logical unit 201b in the alternate storage system 130b is set to a cache through mode. In other words, data written from the host computer 100 to the logical unit 201a (actually the disk cache) is written in the logical unit 201b (actually the disk cache) by way of the path 401 from the storage hierarchy (LU/LDEV/VDEV/EDEV) in the storage system 130a, and a write completion report is thereafter issued to the host computer 100. Meanwhile, the data I/O operation between the logical unit 201a in the preferred storage system 130a and the external volume 301 is set to a write after mode. In other words, data written from the host computer 100 to the logical unit 201a (actually the disk cache) is destaged to the external volume 301 after a write completion report is issued to the host computer 100.

While the preferred storage system 130a is operating normally, only the storage system 130a will have an access right to the external volume 301, and the alternate storage system 130b will not have an access right to the external volume 301. When the storage system 130b receives from the storage system 130a a notice to the effect that the storage system 130a wrote data in the external volume 301, the storage system 130b deletes the data written from the storage system 130a in the logical unit 201b (actually the disk cache).

According to the second system, in addition to the preferred storage system 130a, the alternate storage system 130b is also able to retain the dirty data that is not destaged to the external volume 301. Thus, when a failure occurs in the preferred storage system 130a, the alternate storage system 130b is able to keep the data stored in the external volume 301 up to date by acquiring an access right to the external volume 301 and destaging the dirty data to the external volume 301. After updating the data stored in the external volume 301 to the latest state, the host computer 100 is able to issue an I/O request to the alternate storage system 130b by switching from the path 401 to the path 403.

(3) Third System

A copy pair for performing synchronous copy is formed between the logical unit 201a in the preferred storage system 130a and the logical unit 201b in the alternate storage system 130b. As a result of setting a copy pair as described above, data written from the host computer 100 to the logical unit 201a (actually the disk cache) is written in the logical unit 201b (actually the disk cache) by way of a path (not shown) on the storage network, and a write completion report is thereafter issued to the host computer 100. Meanwhile, the data I/O operation between the logical unit 201a in the preferred storage system 130a and the external volume 301 is set to a write after mode. In other words, data written from the host computer 100 to the logical unit 201a (actually the disk cache) is destaged to the external volume 301 after a write completion report is issued to the host computer 100.

While the preferred storage system 130a is operating normally, only the storage system 130a will have an access right to the external volume 301, and the alternate storage system 130b will not have an access right to the external volume 301. When the storage system 130b receives from the storage system 130a a notice to the effect that the storage system 130a wrote data in the external volume 301, the storage system 130b deletes the data written from the storage system 130a in the logical unit 201b (actually the disk cache). This is the same as in the second system.

According to the third system, in addition to the preferred storage system 130a, the alternate storage system 130b is also able to retain the dirty data that is not destaged to the external volume 301. Thus, when a failure occurs in the preferred storage system 130a, the alternate storage system 130b is able to keep the data stored in the external volume 301 up to date by acquiring an access right to the external volume 301 and destaging the dirty data to the external volume 301. After updating the data stored in the external volume 301 to the latest state, the host computer 100 is able to issue an I/O request to the alternate storage system 130b by switching from the path 401 to the path 403.

Figure 59:
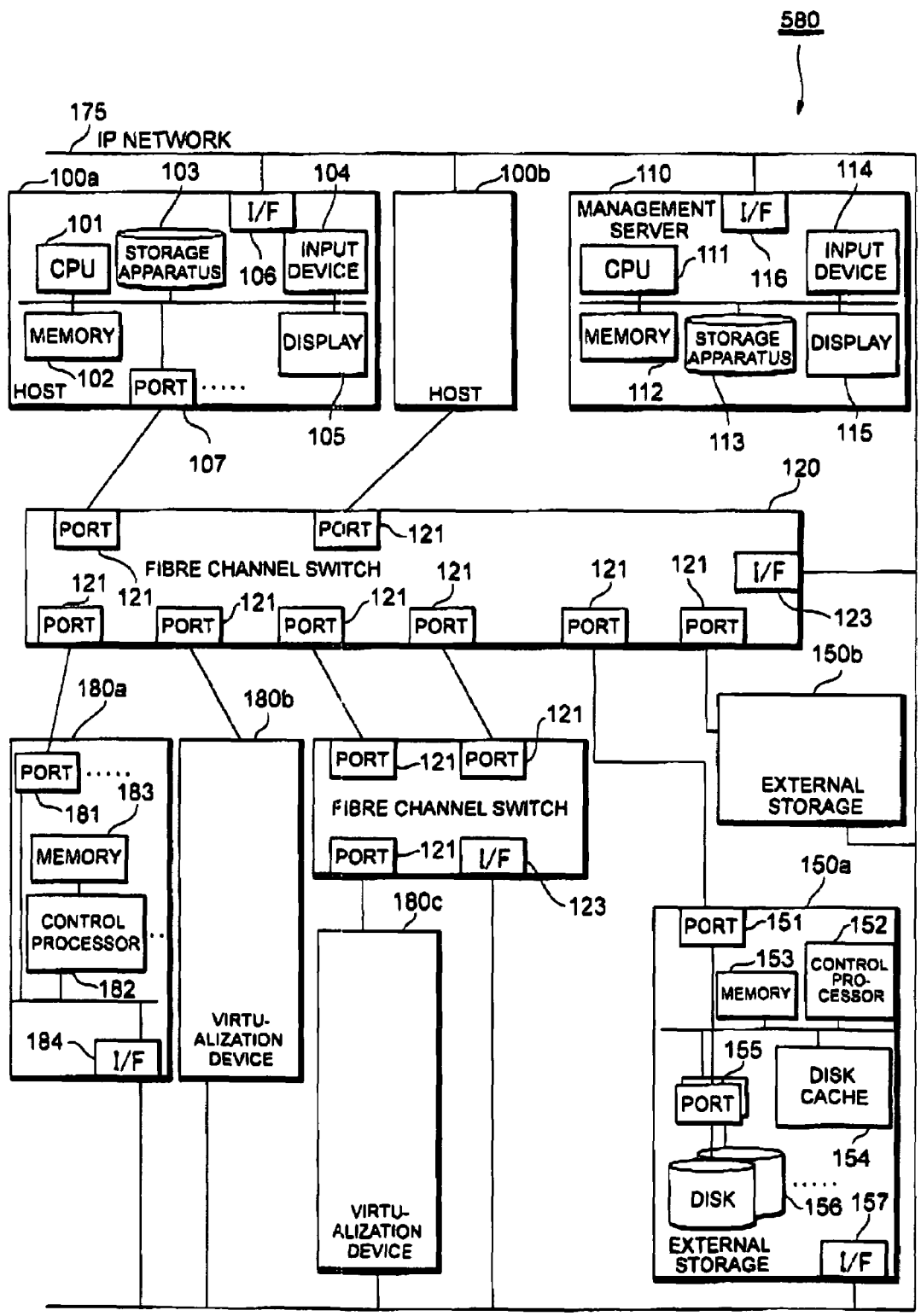
FIG. 59 is a system configuration of the high-availability computer system.

FIG. 59 shows the system configuration of a computer system 580 as a modified example of the present embodiment. The computer system 580, has a system configuration of replacing the storage systems 130a, 130b with the virtualization devices 180a, 180b, 180c in the system configuration of the computer system 500 (refer to FIG. 2). For the convenience of explanation, the virtualization devices 180a, 180b, 180c are collectively referred to as a virtualization device 180. The virtualization device 180 has a port 181 for connection to the fibre channel switch 120 via the storage network, a controller processor 182 for controlling the processing of virtualizing the external volume 301, a memory 182 for storing control programs and the like of executing the control processor 182, and a port 184 for connecting to the management server 110 via the IP network 175. The virtualization device 180, for example, is an exclusive virtualization device or a virtualization with a function for virtualizing the switch storage resource. The virtualization device 180 has a function for providing to the host computer 100 a logical unit configured by virtualizing the external volume 301.

The computer system 580, for example, is able to migrate a logical unit, which is provided by the virtualization device 180a to the host computer 100, to the virtualization device 180b. Outline of the logical unit migration processing from the virtualization device 180a to the virtualization device 180b is roughly the same as the processing contents described above. Nevertheless, since the virtualization device 180 does not have a disk cache for temporarily storing data written in the external volume 301, not only is it not necessary to set the operation mode of the virtualization device 180 to a cache through mode, it is not necessary to wait for the destaging from the virtualization device 180 to the external volume 301 to be complete. It is possible to complete the migration processing merely by succeeding the attributes set in the logical unit provided by the migration source virtualization device 180a to the host computer 100 in the logical unit provided by the migration target virtualization device 180b to the host computer 100.

We claim:

1. A computer system, comprising:
   a host computer;
   an external storage system having an external volume;
   a first storage system having a first expansion device configured by virtualizing said external volume, and a first logical unit configured by virtualizing said first expansion device and recognizable from said host computer; and
   a second storage system having a second expansion device configured by virtualizing said external volume, and a second logical unit configured by virtualizing said second expansion device and recognizable from said host computer,
   wherein said second storage system having a third expansion device configured by virtualizing said first logical unit via a path which externally connects said first logical unit and said third expansion device.

2. The computer system according to claim 1, wherein said external storage system controls the exclusive access of either said first or second storage system regarding the respective storage extents configuring said external volume.

3. The computer system according to claim 2, wherein said host computer executes path switching for connecting to a storage system having an access right regarding the respective storage extents configuring said external volume.

4. The computer system according to claim 1, wherein said external volume includes a shared extent to be accessed from both said first and second storage systems.

5. A computer system, comprising:
   a host computer;
   an external storage system having an external volume;
   a first storage system having a first expansion device configured by virtualizing said external volume, and a first logical unit configured by virtualizing said first expansion device via an intermediate storage hierarchy so as to become recognizable from said host computer; and
   a second storage system connectable to said host computer and said external storage system;
   wherein, upon receiving a command to migrate said first logical unit from said first storage system to said second storage system, said second storage system creates a second expansion device for virtualizing said external volume in said second storage system, creates a third expansion device for virtualizing said first logical unit in said second storage system, defines a path for connecting said first logical unit and said third expansion device, creates a second logical unit configured by virtualizing said third expansion device via an intermediate storage hierarchy in said second storage system so as to become recognizable from said host computer, and sets a path for connecting said second logical unit and said host computer as an alternate path of a path for connecting said first logical unit and said host computer;
   wherein said host computer, by way of said alternate path, accesses said external volume from said second logical unit via an intermediate storage hierarchy in said second storage system, a path connecting said first and said second storage system, said first logical unit, and an intermediate storage hierarchy in said first storage system; and wherein, when all data written from said host computer to said second logical unit is written in said external volume, said second storage system releases the relation between said third expansion device and said second logical unit, and associates said second expansion device with said second logical unit.

6. The computer system according to claim 5,
wherein said first storage system further has a disk cache for temporarily storing data to be read from and written into said first logical volume; and
wherein, upon receiving a command to migrate said first logical unit from said first storage system to said second storage system, said first storage system sets the operation mode of said first storage system to a cache through mode.

7. The computer system according to claim 5, wherein the intermediate storage hierarchy in said first storage system includes a virtual device for virtualizing said first expansion device, and said first logical unit is configured by virtualizing a part of said virtual device.

8. The computer system according to claim 7, wherein said first storage system is inhibited from accessing the storage extent corresponding to a part of said virtual device among the storage extents configuring said external volume.

9. The computer system according to claim 5, wherein the intermediate storage hierarchy in said first storage system includes a logical device for virtualizing said first expansion device, and said first logical unit is configured by consolidating and virtualizing a plurality of logical devices.

10. The computer system according to claim 5, wherein the intermediate storage hierarchy in said first storage system includes a virtual device for virtualizing said expansion device by applying a RAID configuration to the storage extent of said first expansion device, and said first logical unit is configured by virtualizing a part of said virtual device.

11. The computer system according to claim 5,
wherein said external volume includes a first storage extent for storing user data to be read and written by said host computer, and a second storage extent for storing management information of said first logical unit;
wherein the intermediate storage hierarchy in said first storage system includes a logical device for virtualizing said first expansion device;
wherein said logical device includes a first storage extent for virtualizing said first storage extent of said external volume, and a second storage extent for virtualizing said second storage extent of said external volume; and
said first logical unit is configured by virtualizing said first storage extent of said logical device.

12. The computer system according to claim 11, wherein said second storage system sets said management information stored in said second storage extent of said external volume as attribute information of said second logical unit.

13. The computer system according to claim 5, wherein a plurality of first logical units are migrated from said first storage system to said second storage system.

14. The computer system according to claim 5, wherein a part of said first logical unit is migrated from said first storage system to said second storage system.

15. The computer system according to claim 14, wherein said first logical unit stores a plurality of file systems, and a part of said logical unit is one or more file systems among said plurality of file systems.

16. The computer system according to claim 14, wherein said external storage system exclusively accepts the access from said second storage system regarding a storage extent corresponding to a part of said first logical unit among the storage extents configuring said external volume, and exclusively accepts the access from said first storage system regarding a storage extent corresponding to portions excluding a part of said first logical unit among the storage extents configuring said external volume.

17. The computer system according to claim 16, wherein said host computer executes path switching for connecting to a storage system having an access right regarding the respective storage extents configuring said external volume.

18. The computer system according to claim 5, wherein the function for encrypting data to be written by said second storage system in said third expansion device is set up as OFF, and the function for encrypting data to be written by said first storage system in said first expansion device is set up as ON.

19. A computer system, comprising:
a host computer;
an external storage system having an external volume;
a plurality of first storage systems having a first expansion device configured by virtualizing said external volume, and a first logical unit configured by virtualizing said first expansion device via an intermediate storage hierarchy so as to become recognizable from said host computer;
a second storage system connectable to said host computer and said external storage system; and
a management server to be connected to said first and said second storage systems;
wherein said management server sets a storage system subject to failure or performance deterioration among said plurality of first storage systems as a migration source storage system, sets said first logical unit of said migration source storage system as a migration source logical unit, and sets said second storage system as a migration destination storage system;
wherein said migration destination storage system creates a second expansion device for virtualizing said external volume in said migration destination storage system, creates a third expansion device for virtualizing said migration source logical unit in said migration destination storage system, defines a path for connecting said migration source logical unit and said third expansion device, creates a migration destination logical unit configured by virtualizing said third expansion device via an intermediate storage hierarchy in said migration destination storage system so as to become recognizable from said host computer, and sets a path for connecting said migration destination logical unit and said host computer as an alternate path of a path for connecting said migration source logical unit and said host computer;
wherein said host computer, by way of said alternate path, accesses said external volume from said migration destination logical unit via an intermediate storage hierarchy in said migration destination storage system, a path connecting said migration destination storage system and said migration source storage system, said migration source logical unit, and an intermediate storage hierarchy in said migration source storage system; and
wherein, when all data written from said host computer to said migration destination logical unit is written in said external volume, said second storage system releases the relation between said third expansion device and said migration destination logical unit, and associates said second expansion device with said migration destination logical unit.

20. A computer system, comprising:

a host computer;

an external storage system having an external volume;

a first storage system having a first expansion device configured by virtualizing said external volume, and a first logical unit configured by virtualizing said first expansion device via an intermediate storage hierarchy so as to become recognizable from said host computer; and a second storage system having a second expansion device configured by virtualizing said external volume, and a second logical unit configured by virtualizing said second expansion device via an intermediate storage hierarchy so as to become recognizable from said host computer;

wherein said first expansion device is configured by virtualizing said second logical unit;

wherein a path for connecting said second logical unit and said host computer is set as an alternate path of a path for connecting said first logical unit and said host computer;

wherein said host computer access said external volume from said first logical unit via an intermediate storage hierarchy in said first storage system, a path connecting said first and said second storage systems, said second logical unit, and an intermediate storage hierarchy in said second storage system; and wherein, when all data written from said host computer to said first logical unit is written in said external volume, said host computer accesses said second logical unit by way of said alternate path.

* * * * *